April 12, 1960 F. P. GOHOREL 2,932,695

AUTOMATIC TELEPHONE SYSTEMS

Filed Jan. 25, 1956 18 Sheets-Sheet 1

Inventor
F. P. GOHOREL
By Robert Harding Jr.
Attorney

Inventor
F. P. GOHOREL
By Robert Harding Jr.
Attorney

April 12, 1960 F. P. GOHOREL 2,932,695

AUTOMATIC TELEPHONE SYSTEMS

Filed Jan. 25, 1956 18 Sheets-Sheet 3

Inventor

F. P. GOHOREL

By Robert Harding Jr.

Attorney

April 12, 1960 F. P. GOHOREL 2,932,695

AUTOMATIC TELEPHONE SYSTEMS

Filed Jan. 25, 1956 18 Sheets-Sheet 4

Inventor
F. P. GOHOREL
By Robert Harding Jr.
Attorney

April 12, 1960 F. P. GOHOREL 2,932,695

AUTOMATIC TELEPHONE SYSTEMS

Filed Jan. 25, 1956 18 Sheets-Sheet 5

Inventor
F. P. GOHOREL
By Robert Harding Jr.
Attorney

April 12, 1960

F. P. GOHOREL 2,932,695

AUTOMATIC TELEPHONE SYSTEMS

Filed Jan. 25, 1956

18 Sheets-Sheet 6

Inventor
F. P. GOHOREL
By Robert Harding Jr.
Attorney

April 12, 1960 F. P. GOHOREL 2,932,695

AUTOMATIC TELEPHONE SYSTEMS

Filed Jan. 25, 1956 18 Sheets-Sheet 7

Inventor

F. P. GOHOREL

By Robert T. Harding Jr.

Attorney

April 12, 1960 F. P. GOHOREL 2,932,695

AUTOMATIC TELEPHONE SYSTEMS

Filed Jan. 25, 1956 18 Sheets-Sheet 8

Inventor
F. P. GOHOREL
By Robert Harding Jr.
Attorney

Inventor
F. P. GOHOREL
By Robert Harding Jr.
Attorney

Inventor
F. P. GOHOREL
By Robert Harding Jr.
Attorney

Inventor
F. P. GOHOREL
By Robert Harding Jr.
Attorney

April 12, 1960 F. P. GOHOREL 2,932,695

AUTOMATIC TELEPHONE SYSTEMS

Filed Jan. 25, 1956 18 Sheets-Sheet 12

Inventor
F. P. GOHOREL
By Robert Harding
Attorney

Inventor
F. P. GOHOREL
By Robert Harding Jr.
Attorney

Inventor
F. P. GOHOREL
By Robert Harding Jr.
Attorney

April 12, 1960 F. P. GOHOREL 2,932,695

AUTOMATIC TELEPHONE SYSTEMS

Filed Jan. 25, 1956 18 Sheets-Sheet 15

Inventor
F. P. GOHOREL
By Robert Harding Jr.
Attorney

April 12, 1960 F. P. GOHOREL 2,932,695

AUTOMATIC TELEPHONE SYSTEMS

Filed Jan. 25, 1956 18 Sheets-Sheet 16

Inventor
F. P. GOHOREL
By Robert Harding Jr.
Attorney

April 12, 1960 F. P. GOHOREL 2,932,695

AUTOMATIC TELEPHONE SYSTEMS

Filed Jan. 25, 1956 18 Sheets-Sheet 17

Inventor

F. P. GOHOREL

By [signature]

Attorney

Inventor
F. P. GOHOREL
By Robert Harding Jr.
Attorney

United States Patent Office 2,932,695 Patented Apr. 12, 1960

2,932,695

AUTOMATIC TELEPHONE SYSTEMS

Fernand Pierre Gohorel, Antony, France, assignor to International Standard Electric Corporation, New York, N.Y., a corporation of Delaware Application January 25, 1956, Serial No. 561,327

Claims priority, application France March 9, 1955

14 Claims. (Cl. 179—18)

This invention relates to improvements in automatic telephone systems and particularly in translator registers that receive the number dialed by the calling party, translate it and send the various selective combinations required for the routing of the call.

In order to route a call it is often necessary to translate the office code received, in the case of an outgoing call, in order to direct the outgoing selector of the calling exchange and the selectors in the various transit exchanges and, in the case of a local call, in order to direct the local selectors, which are not necessarily arranged on a decimal basis. Considering that translators are complex and expensive devices, there is interest in shortening their holding time and hence their number.

One of the features of the invention is to provide arrangements in the register for discriminating the office code corresponding to local calls and for determining in that case the selective combinations required for the routing of the call, without necessitating the intervention of a translator.

Generally, the routing of an outgoing call requires the translation of a definite number of digits of the number dialed by the calling subscriber (code characterizing the called exchange or network); the seizure of the translator by the register will therefore be effected only after said digits have been received, in order to prevent useless locking of the translator. In certain special cases it may be necessary, either for determining the route or for determining the tolls, to translate a certain number of supplementary digits making up said number.

Another feature of the invention is that, following the rception of a certain definite number of digits of the number dialed, the register is connected to a translator and sends it said digits, said translator then determining the selective combinations required for the routing of the call, arrangements being provided to allow the translator to send the register a special signal where one or more supplementary digits are required for determination of the tolls, this having the effect of causing the register to release said translator and to seize a translator again upon the reception of said supplementary digits.

Another feature of the invention is that, when the number of digits received at the translator can determine neither the route nor the tolls, the translator sends the register a signal that causes the latter to release the translator, a translator being seized again only when the register has received the supplementary digit or digits that allow determining the route and the tolls.

In the case of a call originating from an exchange located ahead and intended for the exchange under consideration, it may happen that said exchange will receive only that portion of the code that is required for local selections, the circuits routing such calls being generally called "partial number" circuits.

Another feature of the invention is that, upon reception of a call coming from a partial number circuit and intended for a subscriber served by the exchange under consideration, a special signal is sent to said register by the equipment associated with said circuit, arrangements being provided in said register to switch out the unused memories and to ensure reception of the portion of the code at the appropriate memories, said register itself providing the control of the routing and ringing operations without requiring the intervention of a translator.

When a call passes in transit through the exchange under consideration, the entire number dialed by the calling party can be received, the translations required for the routing of the call from said exchange onward being made in this very same exchange. The circuits receiving such calls are known as "complete number circuits."

Another feature of the invention is that, when the register is connected to the incoming equipment associated with a complete number circuit, a special signal characterizing the nature of said circuit is sent by said equipment to the register, the reception of this signal by the register causing it to control, after a given number of digits have been registered, the seizure of a translator, which then determines the signals required for the routing of the call.

Subscribers connected to a national network are generally divided into a plurality of areas. Within each of these areas a numbering scheme is provided using a code characterizing the called exchange or network and a numerical portion intended to make the selection of the called subscriber within said exchange or said network. For calls between two subscribers of one and the same area, it suffices to dial this code and this numerical portion or, in other words, the "office" code. On the other hand, for a call between two different areas, a "toll access" code characterizing national calls is dialed first, then an "area" code, followed by the "office" code described above.

Another feature of the invention is that, when the register receives the "toll access" code, it releases the memories used for the reception of said code and, if need be, switches in supplementary memories, in order to be able to receive the complete code characterizing the called subscriber within the national network, said register then seizing the translator following the reception of a given number of digits by sending it a suitable signal intended to control the translations required for the routing of national calls, this allowing using the same translators as for regional calls.

Special service calls are generally effected by dialing codes having a limited number of digits and always starting with the same digit.

Another feature of the invention is to use, for the translation of a special service number, two routing relays, one of them translating the first digit, common to all the special services, the other translating the second digit, denoting the category of the calling subscriber, the two digits translated being thereupon sent to the register, whereupon the call can be routed in a direction determined by the category of the calling subscriber.

Another feature of the invention is that, when the number of an absentee subscriber is dialed, the register receives form said subscriber's equipment a suitable signal that makes it release the seized selection chain and seize a translator, said translator then sending the register the signals that will cause the calling subscriber to be connected to an operator.

Another feature of the invention is that, when an absentee subscriber makes a call, a category signal is sent from said subscriber's equipment to the register, the reception of this signal by said register controlling the seizure of a translator and the transfer of the absentee calling subscriber to an operator regardless of the number dialed by said subscriber.

It may happen that traffic is heavy between two exchanges and that it is desirable in that case to provide arrangements that will allow shortening the time required to establish connections.

Another feature of the invention is that, when the register receives the first digit of a number corresponding to a given direction, it itself controls the routing of the call to the next exchange and is then connected to a translator following the reception of a given number of digits, the seizure of this translator allowing the register to be supplied tolls information on the connection being established, arrangements being provided to release the chain partially established in case the number dialed does not correspond to the direction thus chosen.

When additional digits are to be sent to the translator, in order to allow it to bring about determination of the tolls, special arrangements must be made in order to limit the number of translating relays to be provided, this number increasing rapidly with the number of digits to be translated.

Another feature of the invention is that, when the determination of the tolls requires the translation of an additional digit, a device for decoding said additional digit and the contacts of the routing relay that has already translated the preceding digits or of an auxiliary relay associated to determine said codes are used in combination.

Various other features of the invention will become apparent from the following description, given as a non-limitative example with reference to the accompanying drawing, in which.

Figure 1:
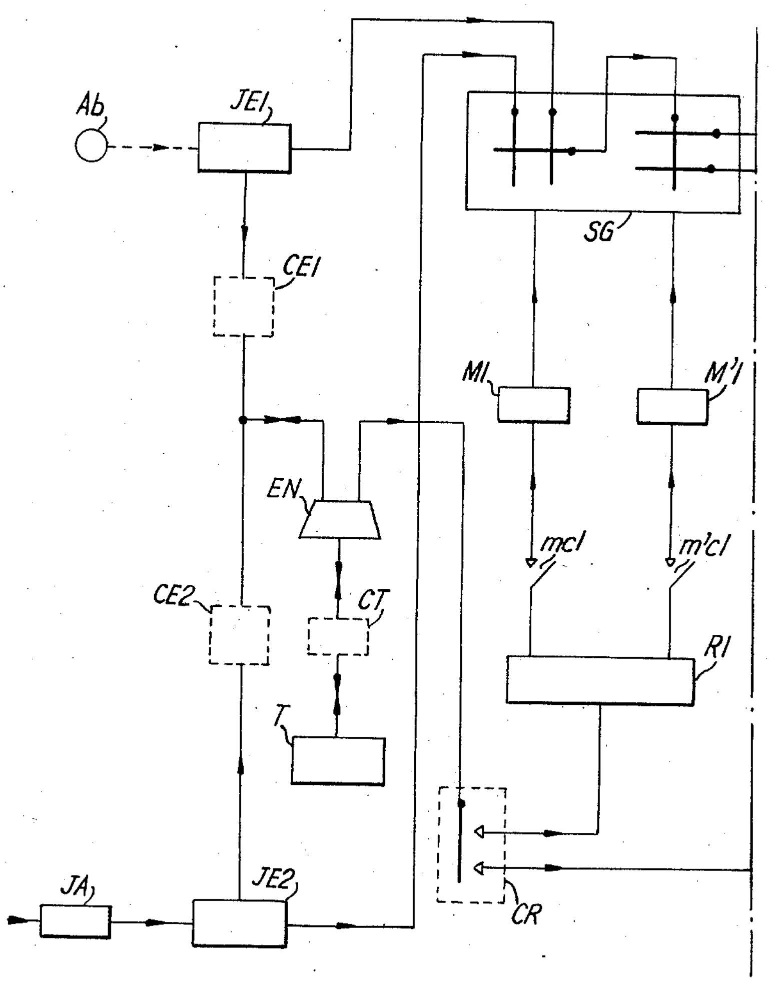
Fig. 1 is a circuit diagram used to explain the general operation of the system.
Figures 1A, 10:
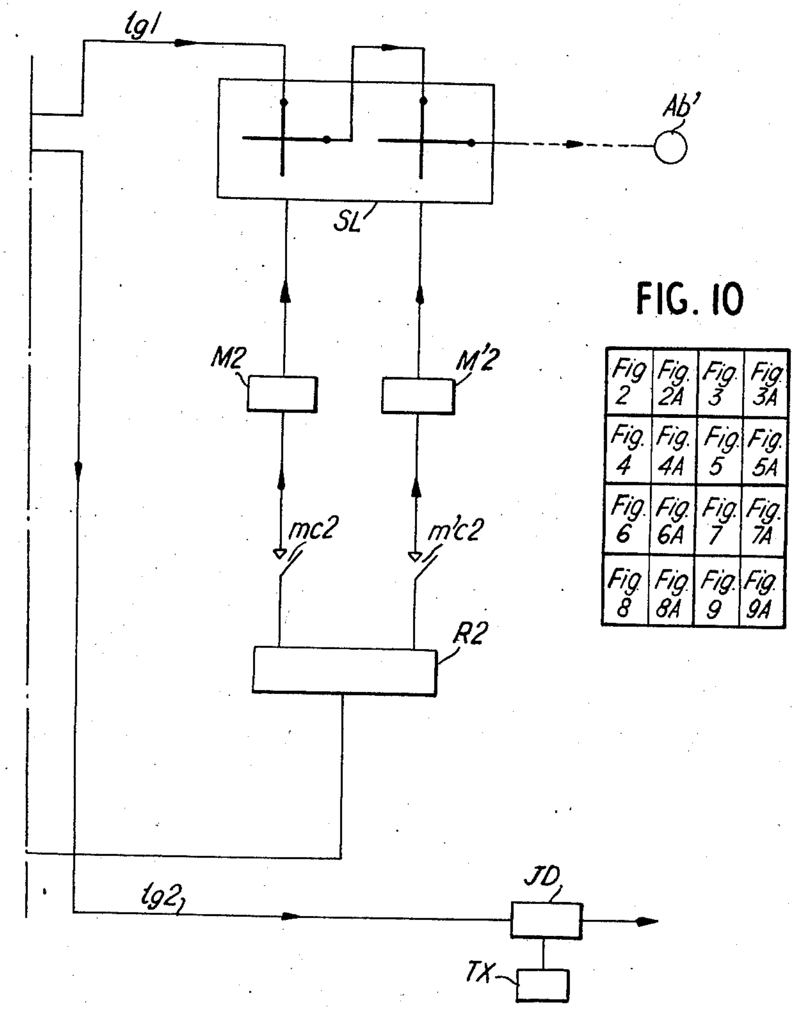
Fig. 10 shows how to associate Figs. 2 to 9.

The general operation of the system will now be described with reference to Fig. 1.

Throughout what follows, the term "connector" shall mean a set of members arranged at the end of a circuit or of a line and intended to effect the connection between the circuit or the line and a special equipment of an exchange.

In the description that follows there will be discussed in succession the case of a call involving a local connection and that of a call involving an area connection. Various special cases, particularly involving national calls and calls to special services, will then be examined.

It will be assumed that the automatic switchboard involved serves a certain number of subscribers divided up into groups. A group selecting means selects the group comprising the called subscriber, a line selecting means selecting the called subscriber from among all those comprised in the group involved.

The case of a local call will be discussed first. When a calling subscriber A*b* (Fig. 1) removes his handset, he finds himself connected, in accordance with a known method, to a register connector JE*l* having access to at least one free register. This connector is thereupon connected to a register EN through a register finder CE*l*.

When the register is in a position to receive the dial pulses, it sends the dialing tone to subscriber A*b*. When the subscriber hears this tone, he may start to dial the called subscriber's number.

In the case of local and area calls, the number is made up of two different portions:

(1) An "office" code, characterizing the subscriber's exchange or group;

(2) A numerical portion, characterizing the subscriber within the exchange or the group.

The pulses sent out by the calling subscriber's dial are received by a pulse counter comprising a certain number of relays and forming part of register EN. When the sending of the pulses corresponding to a given digit ends, a certain number of metering relays are energized and then send information in coded form to special registering relays that memorize thet digit just dialed by the calling party. The pulse counter thereupon homes and is ready to receive the pulse train corresponding to the next digit.

The registering relays corresponding to the code have a certain number of contacts used in three decoding pyramids, each comprising one incoming wire and two outgoing wires. One of the outgoing wires of one pyramid can be connected to the incoming wire of the next pyramid by means of a jumper. The translation of certain special codes is thus obtained and particularly of those corresponding to a local connection, the reception of such codes being characterized by the energization of a special relay. It follows from this that the register itself discriminates local calls from area calls following the reception of the number code.

The control of the operations involved in the selection of the called subscriber will be effected in two stages:

(1) Control of the group selection operations that will allow choosing the line selecting means to which the called subscriber is connected;

(2) Control of the line selection operation that will allow selecting the called subscriber within the line selecting means to which said subscriber is connected.

Considering that a local call is involved, determination of the tolls and of the number of digits to be sent out again is superfluous.

Arrangements are provided to allow direct control, from the registering relays, of the group selection operations and subsequently of the line selection operations without the need of switching in a translator.

As soon as it discriminates the local nature of the wanted connection and it is in possession of the elements required for controlling the group selection operations, the register is connected to a group selection receiver R1 through a receiver connector CR.

The register sends that receiver in coded form the selective combinations required for controlling the group selection operations.

Receiver R1 thereupon receives, through register EN and receiver connector CR, an identity signal coming from the group selecting means SG seized by the calling subscriber. Once it has received that signal, receiver R1 is connected to one of the two markers M1 or M'1 serving group selecting means SG, through contacts *mc*1 or *m'c*1 of multi-contact relays individual to said receivers and to said markers.

The selective combinations required for controlling the group selection operations are thereupon sent in code form from receiver R1 to marker M1 for example.

Group selecting means SG then selects, under the control of marker M1, a free trunk *lg*1 giving access to the line selecting means SL to which the called subscriber is connected and connects itself to that line. Marker M1 immediately sends a suitable signal to register EN to indicate that the group selection has ended, whereupon it releases. Upon receiving this signal, the register in turn releases receiver R1.

When the calling subscriber has dialed the full number of the called subscriber, the register is connected to a line selection receiver R2 through receiver connector CR.

As regards the line selection, it will be noted that line selecting means SL serves only a specific subscriber group. Therefore, it is not necessary to send receiver R2 a signal identifying said line selecting means SL.

Considering that it has received and registered the called subscriber's number, register EN knows the identity of the line selecting means SL to which the called subscriber is connected and consequently can send directly to line selection receiver R2 an identity signal characterizing said line selecting means.

Line selection receiver R2 is connected to one of the two markers M2, M'2 serving line selecting means SL over contacts *mc*2 or *m'c*2. Receiver R2, which has received in coded form from register EN the selective combination required for selecting the line, then sends said combination to marker M2 for example.

The line selection is accomplished under the control of marker M2. When it has been effected, marker M2 sends the register a special signal, as in the case of the group selection, and then releases. Upon receiving that signal, register EN releases receiver R2 and receiver connector CR and then in turn releases itself.

Called subscriber A*b'* is rung if he is free and, upon his answering, the connection is established through register connector JE*l*, group selecting means SG and line selecting means SL.

The case of an area connection requiring the use of translator T will now be described. After removing his handset, calling subscriber A*b* is connected to a register EN through means identical with those previously described. When the calling subscriber has dialed the code of the called subscriber's number and that code has been registered in register EN, the latter discriminates the area nature of said connection.

The register thereupon is marked calling on the banks of translator connectors CT. As soon as a free translator T has been found, register EN is connected to it through translator connector CT.

The register then sends the translator, in coded form, the code of the called subscriber's number. This code is received at translation relays that through a suitable arrangement of their windings and of their contacts cause the energization of a special relay. This relay then sends the register in code form the information required for controlling the group selection operations, for determining the number of digits to be sent out over the outgoing circuit and for the tolls to be charged to the calling subscriber.

That translated information is received in the register at relays that memorize it. These relays thereupon control the group selection operations in a manner identical with the one previously described.

When these group selection operations have ended, the group selecting means is connected to a line *lg*2 associated with an outgoing connector JD giving access to the wanted direction.

Inasmuch as the wanted connection is to a distant exchange, there is no line selection operation. When outgoing connector JD receives the invitation-to-send signal from the distant exchange, the register sends the outgoing connector the pulse trains required for the selection at said distant exchange.

Control of the sending of pulse trains to the outgoing connector is provided by a group of scanning relays whose energizing windings are successively brought under the control of registering relays by means of a chain of directing relays that advance one step after each pulse train. The starting position of the chain of relays depends essentially on the number of digits to be sent to the distant exchange.

When the sending of the pulse trains corresponding to all or part of the called subscriber's number has ended, register sends toll pulses to the meter TX associated with the outgoing connector. The establishment of the connection is effected thereupon in accordance with a known method. The register releases.

It may happen that the routing of an area call requires the translation of more digits than contained in the code of the call number. Such for example is the case of calls requiring the translation of a supplementary digit for determining the tolls or those requiring the translation of a supplementary digit for determining the route and the tolls.

In the first case, provision is made, following the translation of the digits of the call number's code, for the simultaneous energization of two route relays: a main route relay and an auxiliary toll relay. The main route relay sends the register all the information required for controlling the group selection operations and for determining the number of digits to be sent to the distant exchange. The auxiliary route relay is inoperative at the moment under consideration. In addition to the route information it sends the register, the above route relay sends the register a special signal telling it that the translator needs a supplementary digit for complete determination of the elements required for the routing of the call involved.

Arrangements are provided to prevent the starting of the group selection operations until the register has received all the information required for the routing of the call.

In the present case, the register that has just received the information concerning the route but not the information concerning the tolls on the wanted connection cannot therefore control the starting of the group selection operations. The register however memorizes the information it has just received. The translator releases.

When the register has received the next digit, it again calls in a translator and is connected to it. It sends it the tone corresponding to the information required for the routing of the call. A main route relay and an auxiliary route relay energize. These relays further are the same as those previously mentioned, but the translator with which they are associated need not however be the same as the one first seized by the register in the course of establishing the present connection. The main route relay again sends the register route information; however, this produces no effect, since the register has memorized said information, which it had already received when it was first connected to a translator. The auxiliary toll relay, however, thanks to the supplementary digit received by the translator, allows determination of the toll information sent to the register. The latter then controls the routing of the call in accordance with a method already described.

In the second case, that is, in the case requiring the translation of a supplementary digit for determining the route and the tolls, the reception by the translator of the code of the called subscriber's number does not involve the energization of a route relay but is characterized by the sending of a special signal to the register telling it that a supplementary digit is needed for determining the route and the tolls corresponding to the desired connection. The translator releases and, when the register receives the supplementary digit, it again brings in a translator and sends it the number's code and the supplementary digit. A route relay then energizes and sends the register in coded form the route and toll information needed for the routing of the call.

For certain area calls it may happen that the translator needs an additional supplementary digit for determining the route and toll information required for the routing of the call. In that case, following the reception of the first supplementary digit the translator sends the register a second signal. This signal is different from the one first sent the register when the translator called for a first supplementary digit. Owing to this, the register itself can provide discrimination of the number of supplementary digits required by the translator. The translator releases after sending the register this second information. When the register receives this supplementary digit, it again brings in a translator and sends it the number's code plus two supplementary digits.

The translation operations then follow in accordance with a method already described.

If following the reception of the code of a call number the translator itself can determine that two supplementary digits are required for determining the information needed for the routing of the call, it so tells the register by sending it the special polarity just mentioned above. It follows from this that said register will bring a translator in again only after receiving a second supplementary digit.

It is possible to associate with area connections calls coming from a circuit intended for a subscriber of the exchange involved and calls coming from a circuit intended for a satellite of the exchange involved, used in this case as a connecting office.

Depending upon operating requirements, therefore, two modes of operation can be provided for the register.

When a call coming from a circuit is intended for a subscriber of the exchange involved, incoming connector JA (Fig. 1) is so told and characterizes this circumstance by applying a characteristic potential to a so-called discrimination wire. A register EN is connected to incoming connector JA in accordance with a known method through a register connector JE2 and a register finder CE2. Thanks to the special polarity applied to the abovementioned discrimination wire, the register is told of the nature of the calling party and of the destination of the call. The same as for local calls, arrangements are provided to prevent the register from being connected to a translator, since in this case the register itself controls the group selection and line selection operations. The digits received in the case of such a connection are only those making up the numerical portion of the called subscriber's number. In order to register these digts at the proper registering relays, the registering relays for the digits making making up the call number's code are eliminated. When the register has received all the digits of the numerical portion, it controls the group selection and line selection operations in accordance with a method identical with the one described in connection with local calls.

When a subscriber makes a call intended for a satellite of the connecting office involved, the register at the originating exchange sends the connecting office the numerical portion of said subscriber's call number plus a certain number of digits of that number's code. The register at the connecting office must therefore register the received digits at the proper registering relay sets and, because of this, arrangements are provided to allow eliminating the first registering relay sets, corresponding to the digits not sent by the register at the originating exchange. When the register is connected to the translator, it sends it a special signal telling it that the translation to be made concerns a call passing in transit through the exchange involved and that therefore only part of the digits making up the call number's code will be sent it. The translator receives these digits at the translating relay sets corresponding to the places that they would normally have had if the code had been sent in whole by the register at the originating exchange. The translator then translates the code digit or digits it has just received. If the translation of a supplementary digit is required, it releases and is immediately seized again by the register in accordance with a method already described.

It may happen that the exchange involved is used as a transit office for toll calls. In that case, the incoming circuit sends the register at said transit office the full number of the called subscriber. Incoming connector JA applies a special polarity to the above-mentioned discrimination wire, thus telling the register that a transit call is involved. The sequence of operations then develops as in the case of an area call. However, no toll pulses are sent, since it is a question of a call passing in transit through the exchange under consideration.

The routing will now be described in the case of a so-called "national" call.

The number for a national call generally comprises three different portions:

(1) A first code, characterizing the area in which the called subscriber is located;

(2) A second code, characterizing the exchange to which the called subscriber is connected within said area;

(3) A numerical portion, characterizing the called subscriber within the exchange serving him.

Owing to the amount of information involved in a national call number, it follows that the latter comprises a larger number of digits than used for local or area calls.

When the called subscriber is at a great distance from the calling subscriber, the translation of the code characterizing the area is sufficient to allow the register to determine the route and the tolls. However, in the case of a national call between two subscribers located but a short distance from each other, the translation of the first, of the second and even of some digits of the numerical portion may become necessary for determining the information required for establishing the route and for determining the tolls on such a call.

Upon removing his handset, the calling subscriber dials a special number characterizing a national call. The reception of that number at the register is effected as already described. This code is immediately translated in the register thanks to the aforementioned contact pyramids. After translation of this code, the register is told that a national call is involved and that it must accordingly (1) release the registering relays that had been brought into play to provide for the reception of the above number and (2) send the calling party a special tone to invite him to dial the called party's number. When the register has received the first code, that is, the one characterizing the area in which the called party is located, it calls in a translator and connects itself to it in accordance with a method already described. When said connection becomes operative, the register sends the translator the above-mentioned code and a signal characterizing the fact that the received digits form part of a national-call call number. These digits are translated by suitable relays generally different from those assigned to area calls. A route relay is energized, this allowing sending the register the information needed for the routing of the call. The routing method is identical with the one described with reference to an area call. It is well to explain that generally the number of digits making up a national-call call number is larger than the one making up an area- or local-call call number. Arrangements are provided to increase the capacity of the chain of registering relays in the case of a national call. This remark further applies equally to the chain of directing relays controlling the aforementioned scanning relays.

If the routing of the call requires the translation of supplementary digits, the translator so tells the register and releases. The call routing operations are thereupon accomplished in accordance with a method already described.

A few special cases will now be described involving absent subscribers, restricted-service subscribers, etc.

It has been pointed out hereinbefore that a route relay upon energizing sends the register the signals required for the routing of the call. The arrangement is such that a route relay can send the register not only said signals, in ordinary cases, but also different route signals used in case of rerouting, in the case of restricted-service subscribers, etc.

A route relay, of course, provides only one route at a time. In order to determine a specific troute from a given route relay, the translator has been provided with a certain number of category relays controlled by the register and whose contacts constitute a discrimination pyramid providing the control for the route relays. Stated otherwise, when a route relay energizes, it can control a plurality of different routes, the choosing of any one of these routes being under the control of the above-mentioned discrimination pyramid.

The category discrimination relays are controlled by the register, which itself receives the information required for this control through the above-mentioned discrimination wire.

By way of example it will be assumed that the called subscriber involved in a local call is an absent subscriber. After receiving that subscriber's number, the register controls the routing of the call in accordance with the same method as for the general case. Since an absent subscriber is involved, a special polarity is sent from that subscriber's connector (not shown in Fig. 1) to the register's discrimination wire. The register then calls in a translator and, when the connection to that translator becomes operative, the register controls in said translator the energization of a route relay and of a discrimination relay, thus allowing said route relay to send the register the information needed for the connection of the calling subscriber to an operator.

If the call must be rerouted, the call is first routed as in the general case up to the point where the group selection operations are controlled by one of the two markers M1 or M'1. If all the normal routes are busy, the seized marker sends the register a signal characterizing this condition. The register recalls the translator, again sends it the number's code, this obviously involving the energization of the same route relay, and controls a special discrimination relay characteristic of the rerouting requirement. Owing to the pulling up of the discrimination relay, the above-mentioned route relay will now send the register such signals as to allow the wanted connection to be established over an emergency route.

If a restricted-service calling subscriber dials the number of an area call to which he is not entitled, the register is so told by the sending of a special polarity over the discrimination wire. The register is connected to a translator and controls the discrimination relays assigned to restricted-service subscribers. When the translator receives the called subscriber number's code, a route relay energizes, this relay obviously being the same one that would have energized if a regular subscriber had dialed the same number mentioned above. Owing to the pulling up of the discrimination relay assigned to restricted-service subscribers, the route relay that has just energized controls the sending to the register of information that will subsequently allow connecting the calling subscriber to an operator, while in the ordinary case it would have controlled the sending to the register of information that would have allowed the call to be routed to the distant exchange and from there to the called subscriber.

This description of the general operation will be brought to an end with a discussion of calls to special services. Generally, the special services are reached by dialing numbers comprising a small number of digits, always beginning with the same digit. Upon the reception of such numbers, the register calls in a translator and connects itself to it as already described. When the connection becomes operative, the register sends the number to the translator. The reception of this number at the translator involves the energization of two route relays: a main route relay and an auxiliary route relay. The main route relay characterizes by its energization the fact that the wanted connection involves some special service. It follows that this single route relay in the translator sends the register only part of the route information required for the routing of the call, the remaining portion of this information being dependent on the second digit of the number dialed by the calling subscriber and on said subscriber's category. It is the auxiliary route relay that performs the discrimination of the calling subscriber's category and the translation of the number's second digit. There are as many auxiliary route relays as there are different categories of calling subscribers.

The auxiliary route relay then sends the register the rest of the route information required for the routing of the call.

The method is identical where special services are rung by means of three-digit numbers. A second auxiliary route relay is provided, controlled by the first auxiliary route relay. This second auxiliary relay can effect the translation of the number's third digit and thereby provide for the sending of the rest of the route information to the register.

A detailed description of the operation of register EN and of translator T will now be given with reference to Figs. 2 to 9.

In the descriptions that follow, the relay windings are referenced by a combination of letters comprising two capital letters followed by one or more small letters. The first capital letter characterizes the equipment in which the relay is used. All relays forming part of one and the same equipment therefore bear a reference beginning with one and the same letter. For equipment and wiring reasons, the relays of each equipment are divided into groups, all the relays in a group being fastened to one and the same bar. The second capital letter in the relay's reference characterizes the bar. All the relays of one and the same bar are therefore referenced by one and the same second capital letter. The small letters following the two first capital letters in a relay's reference denote the contact assemblies associated with the particular relay involved. On one and the same bar, the contact assemblies of the various relays are referenced in alphabetical order. Thus it is that on bar A of equipment R the first two relays each have two contact assemblies and the following two each have one assembly, the references used being then as follows:

First relay—RA*ab*
Second relay—RA*cd*
Third relay—RA*e*
Fourth relay—RA*f*

The referencing of the relay contacts is as follows: for a given contact assembly associated with a given relay, the contact references are obtained by having the two first capital letters making up the first portion of the relay reference followed by the small letter characterizing the contact assembly involved and by a digit locating the contact in that assembly. Thus it is that contacts RA*c*2 and RA*d*3 are respectively the second contact of assembly *c* and the third contact of assembly *d* of relay RA*cd*.

In certain cases, for the purpose of simplification, similar circuits or members performing identical functions are shown as a single member or circuit of each kind.

In this particular case, only the first and the last member are referenced, the references being separated by a diagonal line. Thus it is that a relay whose winding is referenced EP*a/e* actually represents five relays referenced EP*a*, EP*b* . . . EP*e*. Likewise, a relay contact referenced TJ*a/j*, 2/11 actually represents the second, third . . . eleventh contacts of relays TI*a*, TI*b* . . . TI*j* or a total of 100 contacts (10 relays, 10 contacts per relay).

In order to make the drawing clearer, some wires that must provide electrical connections between members far from each other have been grouped into cables. These cables are referenced by capital letters. The wires in a cable are referenced by a small letter preceded by the capital letter denoting the cable. In this connection, to prevent passing too large a number of wires or cables from one equipment to another, some relay contacts are shown in equipments to which actually they do not belong. These contacts are enclosed in a dotted-line rectangle. Of course, these contacts are referenced in accordance with the equipment whereof they actually form part.

Thus, contact EF*b*3, shown in equipment R and encircled by dotted lines, belongs to relay EF*b* of equipment E.

Electrical connections that can be modified in accordance with operating requirements are shown in dotted lines.

It will be assumed first that the various members that will be used in the course of the description that follows are free. Under these conditions, all the relays and magnets shown in Figs. 2 to 9 are unoperated.

The battery normally used for the general supply of the system has its negative pole represented by an arrow; its positive pole is connected directly to ground.

It will be assumed as a nonlimitative example that the automatic switchboard involved serves 10,000 subscribers. These subscribers are divided into 20 groups of 500, each group being selected by group selecting means SG (Fig. 1) of a group selecting set. In the case of a local call the called subscriber is then hunted for by a line selecting means.

As already stated, when the subscriber removes his handset he is connected by known means to a register connector JE*l* having access to a free register EN. The connection of the free register to the register connector is provided by a register finder. The register finder is represented in simplified form in Fig. 3 by rectangle CE. As soon as the register can be connected to the register finder, magnet CE*c* is energized by battery applied to wire A*k*1 by the register connector.

Connecting relay CE*c* prepares a holding circuit for itself over its front CE*c*9. The seizure of the register is effected by the grounding of wire A*b*1 in the line selecting means, the effect of this being to energize seizure relay RC*b* and release-control relay RC*gh*:

(1) Battery, upper winding of relay RC*b*, back RC*f*1, RA*d*1, wire B*b*1, cable B, wire B*b*1, front CE*c*2, ground on wire A*b*1;

(2) Battery, left-hand winding of relay RC*gh*, back RA*p*4, ground over the circuit described above.

Seizure relay RC*b* will control the starting of the operations involved in placing the register in condition for receiving the dial pulses. Through the closing of front contact RC*b*1 a ground is applied to test wire A*t*1: ground, front RC*b*1, wire B*t*1, cable B, wire B*t*1, front CE*c*4, test wire A*t*1.

The general ground required for the holding of the various relays of register EN is applied to ground wire *tg* by the closing of front RC*b*2. Connection magnet CE*c* of register finder CE has its holding circuit completed by the closing of front RC*b*3: ground, magnet CE*c*, front CE*c*9, wire BK1 over cable B, front RC*b*3, battery.

The closing of front RC*b*4 completes the circuit of pulse-receiving relay RA*ab*, which pulls up: battery, left-hand winding of relay RA*ab*, left-hand coil of transformer RC*cd*, front RC*b*4, wire B*a*1, cable B, wire B*a*1, front CE*c*1, wire A*a*1, calling subscriber's loop, wire A*b*1 grounded in the line selecting means.

The pulse-receiving relay is a sensitive relay having only one front contact RA*a*1 controlling auxiliary relay RC*a*. Relay RC*a* "duplicates" relay RA*ab* and operates in synchronism with it.

The energization of repeating relay RC*a* entails the energization of relay RA*cd* by the closing of front contact RC*a*1: ground, left-hand winding of relay RA*cd*, front RC*a*1, resistance RR2, battery.

The closing of front contact RC*a*2 is inoperative at the instant under consideration.

Relay RA*cd* will hold throughout the use period of the register, its function being to control the connection of the calling party's circuit throughout the use period of the register, as will subsequently be explained. Over its front RA*c*1 it applies a ground to holding wire D*b* to prepare the holding of the code-sending relays. Front RA*c*2 prepares the energizing circuit of relay RC*i* over wire *k*1. The function of the circuit including this wire will be explained subsequently. Front RA*c*3 prepares the holding circuit of relay RA*cd*. Front RA*c*4 completes the holding circuit of relay RC*b*; battery, upper winding of relay RC*b*, back RC*f*1, RA*p*4, front RA*c*4, ground.

Over its front RA*c*5 relay RA*cd* completes the energizing circuit of relay RD*ab* (Fig. 3): battery, relay RD*ab*, front RA*c*5, back RE*q*1, holding wire D*b*, front RA*o*1, ground.

Make-break contact RA*d*1 directs wire B*b*1 to the right-hand winding of transformer RC*cd* and of relay RA*ab*. This contact operates at the same instant as front RA*c*4. The result of this is that the energizing circuit of relay RC*b* is broken for a moment. However, this relay cannot fall back, because its lower winding is short-circuited, this imposing a certain delay on the release of this relay. The closing of front RA*d*2 has no effect at the instant under consideration, because front RC*b*2 is already closed. The same applies also to front RA*d*3, which will short-circuit front RC*b*3. Over its front RA*d*4 relay RA*cd* grounds test wire A*t*2: test wire A*t*2, front CE*c*5, wire B*t*2, cable B, wire B*t*2, front RA*d*4, back RC*f*5, EF*c*2, ground.

The closing of front RA*d*1 causes the looping of the subscriber's line to dialing relay RA*ab*, while the ground applied to wire TB*b*1 in the line selecting means is removed: battery, left-hand winding of relay RA*ab*, left-hand winding of transformer RC*cd*, front RC*b*4, wire B*a*1, cable B, wire B*a*1, front CE*c*1, wire A*a*1 subscriber's loop not shown, wire A*b*1, front CE*c*2, wire B*b*1, cable B, wire B*b*1, front RA*d*1, RC*b*5, right-hand winding of transformer RC*cd*, right-hand winding of relay RA*ab*, ground. The middle winding of transformer RC*cd* is supplied alternating current by tone generator RG3 over the following circuit: ground, middle winding of transformer RC*cd*, back EH*e*3, EH*g*1, EH*h*4, EI*d*5, EE*n*3, tone generator RG3, ground.

The two secondary windings of transformer RC*cd* having just been looped by the closing of front RA*d*1, an A.C. superimposed on the supply D.C. will flow in the subscriber's loop. The subscriber, then hearing that tone, is thus told that he has just been connected to a register and that the latter is ready to receive the numerical pulse trains corresponding to the wanted subscriber's number.

It will be assumed in order to simplify matters that the calling subscriber and the called subscriber are regular subscribers served by one and the same exchange; in other words, that the connection that is going to be established is a local connection. The fact htat the calling subscriber is a regular subscriber is characterized by disconnecting discrimination wire A*c*1 from said subscriber. Thus, discrimination relays RA*n*, RA*o*, RA*m* and RA*l* remain unoperated.

The calling subscriber then dials the wanted number. It will be assumed throughout what follows that a 7-digit system is involved, the seven digits being respectively denoted by P, Q, R, M, C, D, U. The first three digits make up the code and will be used to characterize the connecting office or the group comprising the called subscriber. The last four digits are provided to characterize the called subscriber within his connecting office. It will be assumed that the calling subscriber dials the telephone number 965—25—70.

When said subscriber dials, breaks are made in the loop of his line and dialing relay RA*ab* beats at the repetition rate of the pulses sent by the dial.

As has already been pointed out, relay RA*ab* controls auxiliary relay RC*a*, which latter will consequently beat at a rate identical with that of relay RA*ab*.

Relays RA*ab* and RC*a* release at the beginning of the reception of the first dial pulse. Relay RC*e*, having its short-circuit removed by the opening of front contact RCa1, energizes: battery, resistance RR2, relay RCe, front RAc3, back RCa1, ground.

Relay RAcd, short-circuited by the closing of back contact RCa1, is slow in releasing, this allowing it to hold until the end of the pulse under consideration.

The passing to front position of make-break contact RCe1 has the effect of removing the short-circuit from the energizing winding of relay RCk and of completing the energizing circuit of said relay, which then pulls up: battery, resistance RR1, relay RCk, front RCe1, wire Da over cable D, back EHe2, ground over wire tg.

The closing of front RCe2 completes the energizing circuit of relay EHh (Fig. 4): battery, relay EHh, back EId2, wire Dd over cable D, front RCe2, ground on general holding wire tg.

The opening of back RCe3 prevents, owing to the subsequent closing of front RCk1 to RCk5, the sending of a ground to the coding contact pyramid, connected between back RCe3, and front RCk1 to RCk5.

Through the closing of its front contacts RCk1 to RCk5, relay RCk prepares the connection of the coding contact pyramid to registering relays EOa . . . EOe. Through the closing of its contact RCk6 it completes the following holding circuit for itself: battery, resistance RR1, relay RCk, front contact RCk6, wire Da over cable D, back EHe2, ground on general holding wire tg. Further, the closing of this front contact controls the sending of the general ground to the receiving relays forming part of equipment NR. The circuit used for sending pulses to this latter equipment is prepared by the closing of front contact RCk7.

Relay EHh completes a holding circuit for itself by the closing of its front EHh2: battery, relay EHh, back EId2, front EHh2, ground on general holding wire tg.

The opening of back contact EHh4 breaks the primary winding of transformer RCcd, the effect of this operation being to eliminate the sending of dialing tone to the calling subscriber's loop. This break is made therefore as soon as the calling subscriber has released his dial after having dialed the first code digit.

Relay RAab and relay RCa energize again at the end of the first pulse. Make-break contact RCa1 short-circuits relay RCe and completes the energizing circuit of relay RAcd. Relay RAcd, which had its left-hand winding short-circuited for the duration of the pulse by back contact RCa1, has not released. It is now relay RCe that is short-circuited. Owing to the short-circuiting of relay RCe, this relay does not release during the time interval separating the reception of two consecutive pulses. The closing of front contact RCa2 completes the circuit for sending pulses to meter NR: meter NR, wire NRc, front contact RCk7, RCa2, ground over the circuit already described.

The reception and the coding of the received digits are effected in a meter NR represented in the drawing by a rectangle. This device has already been described in a patent application filed by R. L. M. Le Quean on December 19, 1955, Serial No. 554,023 and entitled "Improvements in Telephone Systems." This device comprises six metering relays, RAe, RAf, RAg, RAh, RAi, RAj, whose windings are not shown in the drawing. Depending upon the digit received, some of these relays can hold at the end of a pulse train over holding wire NRb, connected to the general ground wire through front contact RCk6 as already pointed out. The sending of pulses to the meter is effected by beating-contact RCa2. A certain number of metering relays are energized at the end of each pulse, the energization of these relays characterizing the serial number of the last pulse received or, what amounts to the same, the number of pulses received from the beginning of the pulse train involved. The following table gives the selective combinations of metering relays energized for received-pulse numbers comprised between 1 and 10. In this table the letter R denotes the metering relays in unoperated position; the letter T denotes the metering relays in operated position.

| Relays | RAe | RAf | RAg | RAh | RAi | RAj |
|---|---|---|---|---|---|---|
| 1 | T | T | T | R | R | R |
| 2 | R | R | T | T | R | R |
| 3 | T | T | R | T | R | R |
| 4 | R | R | R | R | T | R |
| 5 | T | T | T | R | T | R |
| 6 | R | R | T | T | T | R |
| 7 | T | T | R | T | T | T |
| 8 | R | R | R | R | R | T |
| 9 | T | T | T | R | R | T |
| 10 | R | R | T | T | R | T |

To use this table a digit dialed is chosen, digit 6 for example; reading the line corresponding to that digit it will be seen then that relays RAg, RAh and RAi are in operated position.

Figure 2:
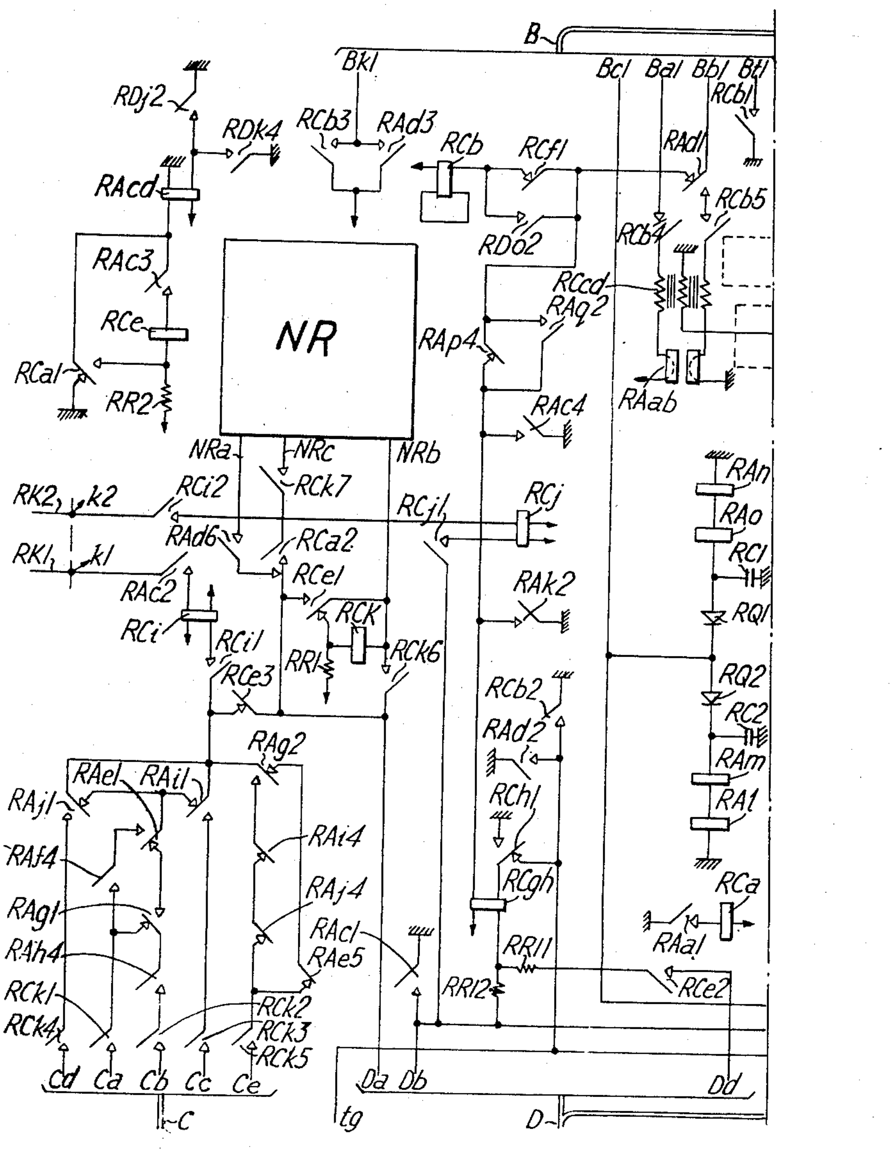
Figs. 2 and 3 are a schematic of the devices for sending and receiving numerical pulses.
Figure 2A:
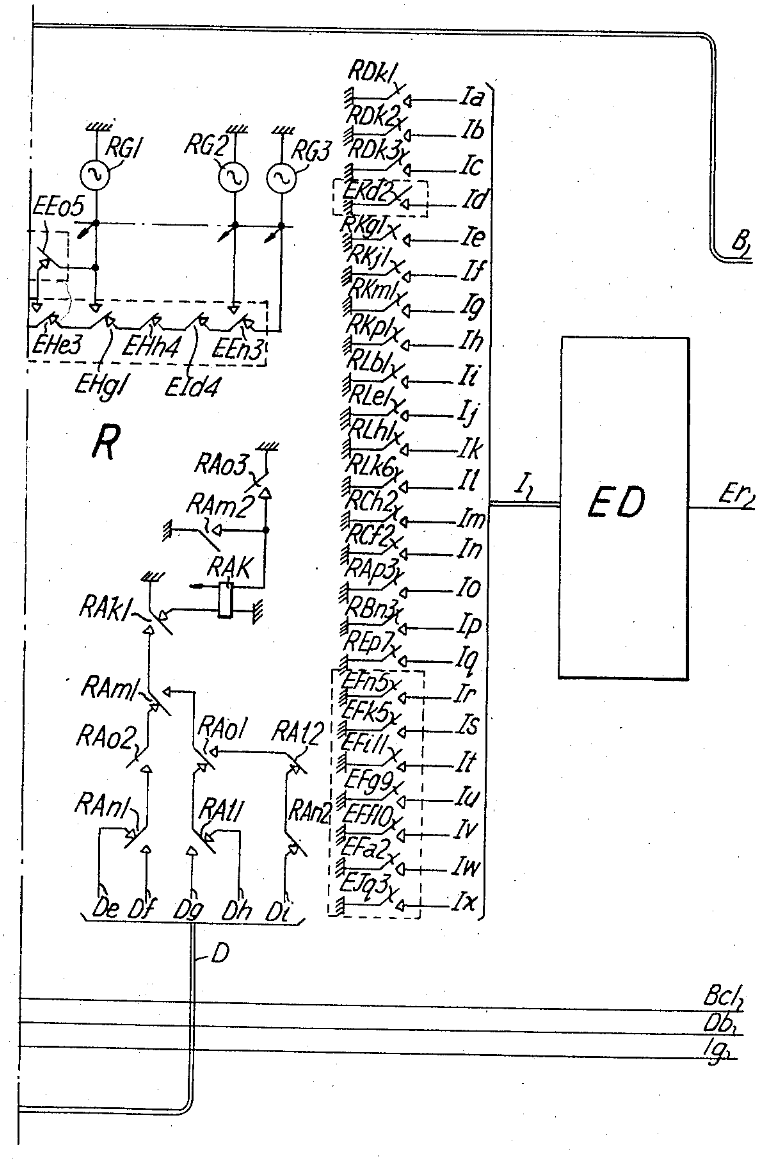

The metering relays have a certain number of contacts shown in Fig. 2 in equipment R. These contacts form a pyramid comprising one incoming wire capable of being grounded and five outgoing wires Ca, Cb, Cc, Cd and Ce. The combination of metering-relay contacts allows sending grounds over two of the 5 coding wires mentioned above, for each digit received by the meter. Thus is formed a 5-element code using two predetermined elements for each digit. As is known, this well-known code allows obtaining 10 different combinations corresponding to the 10 different digits that can be dialed by the subscriber.

The following table gives the code used within the framework of the present invention.

| Digits | 1 | 2 | 3 | 4 | 5 | 6 | 7 | 8 | 9 | 0 |
|---|---|---|---|---|---|---|---|---|---|---|
| Wires | Ca Ce | Cb Ce | Ca Cb | Cc Ce | Ca Cc | Cb Cc | Cc Cd | Cd Ce | Ca Cd | Cb Cd |

It can be seen from this table that when dialing digit 6, for example, a ground is applied to wires Cb and Cc.

The discussion will now be resumed of the reception of the called subscriber's number at the end of the first pulse corresponding to the first digit dialed. As previously pointed out, a ground is applied to wire NRc owing to the closing of front contact RCa2. That ground causes the energization of metering relays RAe, RAf, RAg. The energization of these relays has no effect at the instant under consideration, because the coding contact pyramid is not supplied, due to the opening of back contact RCe3. Relays RAab and RCa release at the beginning of the next pulse. A cycle identical with the one previously described recommences. Relays RAab and RCa energize at the instant corresponding to the end of the ninth pulse. The closing of front contact RCa1 short-circuits relay RCe, which will release with a certain delay. The closing of front contact RCa2 causes the sending of a ground over wire NRc to meter NR, the effect of this being to energize metering relays RAc, RAf, RAg, RAj, as follows from a previously-described table. At this moment the calling subscriber's dial has returned to normal and relay RCe released, thus marking the end of the first pulse train.

The release of relay RCe will cause the first digit of the called subscriber's number to be sent to the metering relays in coded form.

Through the return to normal position of its make-break contact RCe1, relay RCe short-circuits the winding of relay RCk, which will release with a certain delay. The opening of front contact RCe2 breaks the energizing circuit of relay EHh, which holds through its holding contact EHh2 over a circuit previously described. The closing of back contact RCe3 completes the grounding circuit of the coding wires Ca, Cd, corresponding to digit 9:

(1) Wire Ca, front contacts RCk1, RAf4, RAe1, back contacts RA*i*1, RC*e*3, ground over a circuit already described;

(2) Wire C*d*, front contacts RC*k*4, RA*j*1, then ground on wire *tg* over a circuit already described.

Coding wires C*a* . . . C*e* are connected to a metering relay set whose operation will now be explained.

Figure 4:
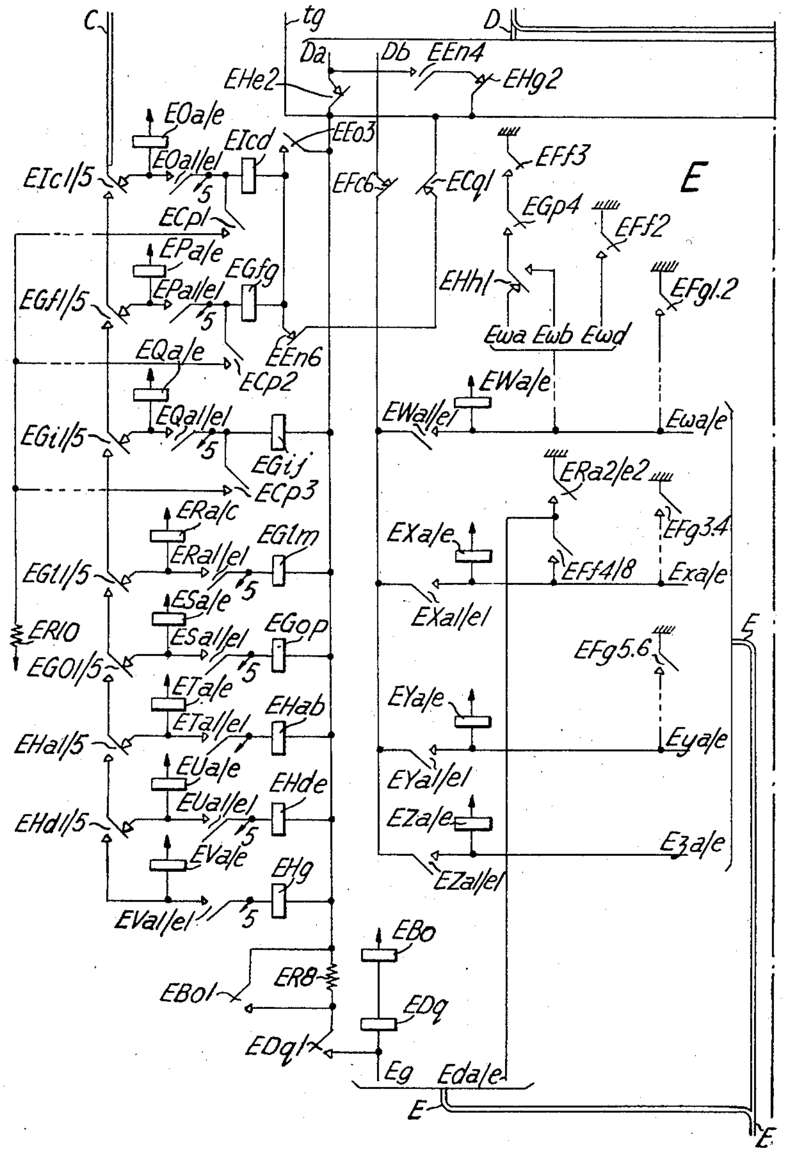
Figs. 4 to 7 are schematics of the devices provided for registering the number dialed and the combinations translated.
Figure 4A:
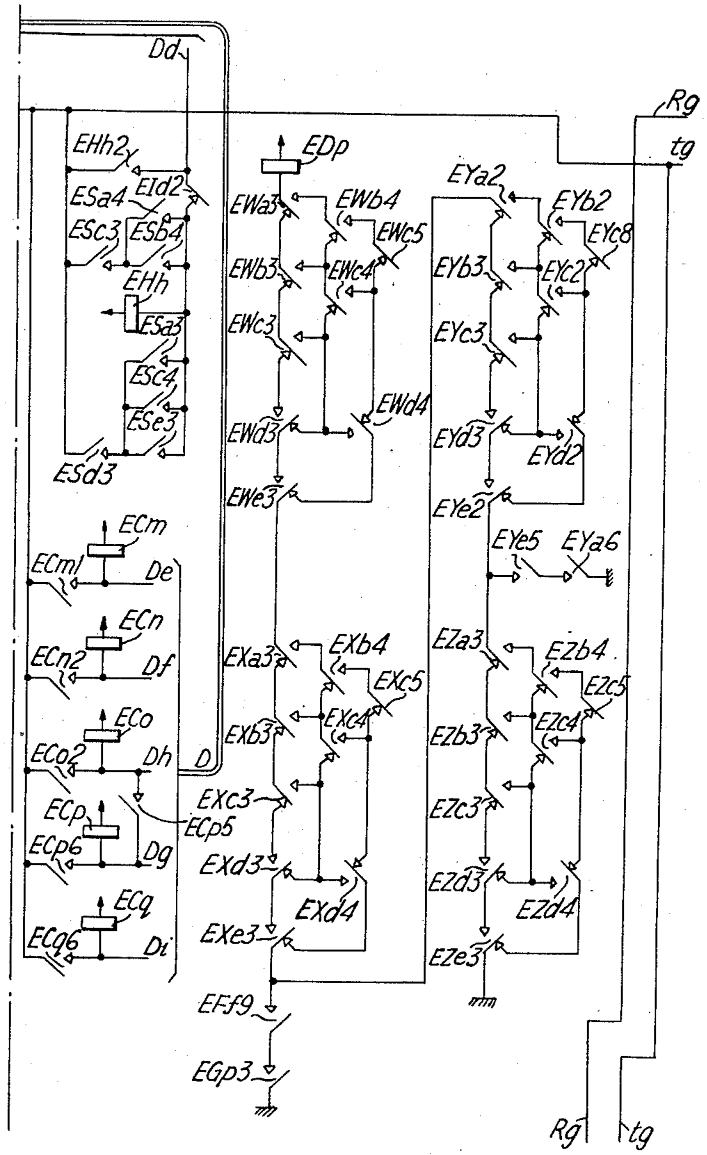

As previously pointed out, seven-digit dialing is used, three digits for the code and the other four for the numercial portion. Since the code chosen for sending the digits received by the metering relays to the registering relays comprises five elements, it follows that the total number of registering relays to be provided is 35 (the 7 digits to be sent require 5 registering relays each). Fig. 4 shows only 7 registering relays, each of them actually corresponding to the five registering relays associated with the digit involved. The following table gives the references of these various relays:

| Digits | | | | | | |
|---|---|---|---|---|---|---|
| P | Q | R | M | C | D | U |
| EO*a*<br>EO*b*<br>EO*c*<br>EO*d*<br>EO*e* | EP*a*<br>EP*b*<br>EP*c*<br>EP*d*<br>EP*e* | EQ*a*<br>EQ*b*<br>EQ*c*<br>EQ*d*<br>EQ*e* | ER*a*<br>ER*b*<br>ER*c*<br>ER*d*<br>ER*e* | ES*a*<br>ES*b*<br>ES*c*<br>ES*d*<br>ES*e* | ET*a*<br>ET*b*<br>ET*c*<br>ER*d*<br>ET*e* | EU*a*<br>EU*b*<br>EU*c*<br>EU*d*<br>EU*e* |

It can be seen from this table that the registering relays corresponding to digit R, for example, are referenced EQ*a*, EQ*b* . . . EQ*e*. The five relays shown in Fig. 4 as a single relay bear the reference EQ*a*/*e*. A similar reasoning is applicable to the 30 relays for the other six digits.

The relays corresponding to one and the same digit are designated *a* to *e*, these references agreeing with those given to the coding wires C*a* . . . C*e*. The windings of the five registering relays for a given digit of the call number can be connected by circuits that will subsequently be described to the five coding wires mentioned above. Thus, upon the reception of digit R, for example, registering relays EQ*a* . . . EQ*e* will be connected to coding wires C*a* . . . C*e*.

These explanations will make it possible to continue the description of the registering of the digits dialed. The five registering relays EO*a* . . . EO*e* for the first digit (P) are connected to the five coding wires C*a* . . . C*e* through the five back contacts EI*c*1 . . . EI*c*5 shown in the figure as a single back contact EI*c*1/5.

In the present case the calling subscriber has just dialed the first digit, the digit 9 in the example chosen, and coding wires C*a*, C*d* have just been grounded as previously explained. This grounding has the effect of energizing registering relays EO*a*, EO*d* over the following energizing circuits:

(1) Battery, relay EO*a*, back EI*c*1, ground on wire C*a* over a circuit previously described;

(2) Battery, relay EO*d*, back EI*c*4, ground on wire C*d* over a circuit previously described.

Figure 3:
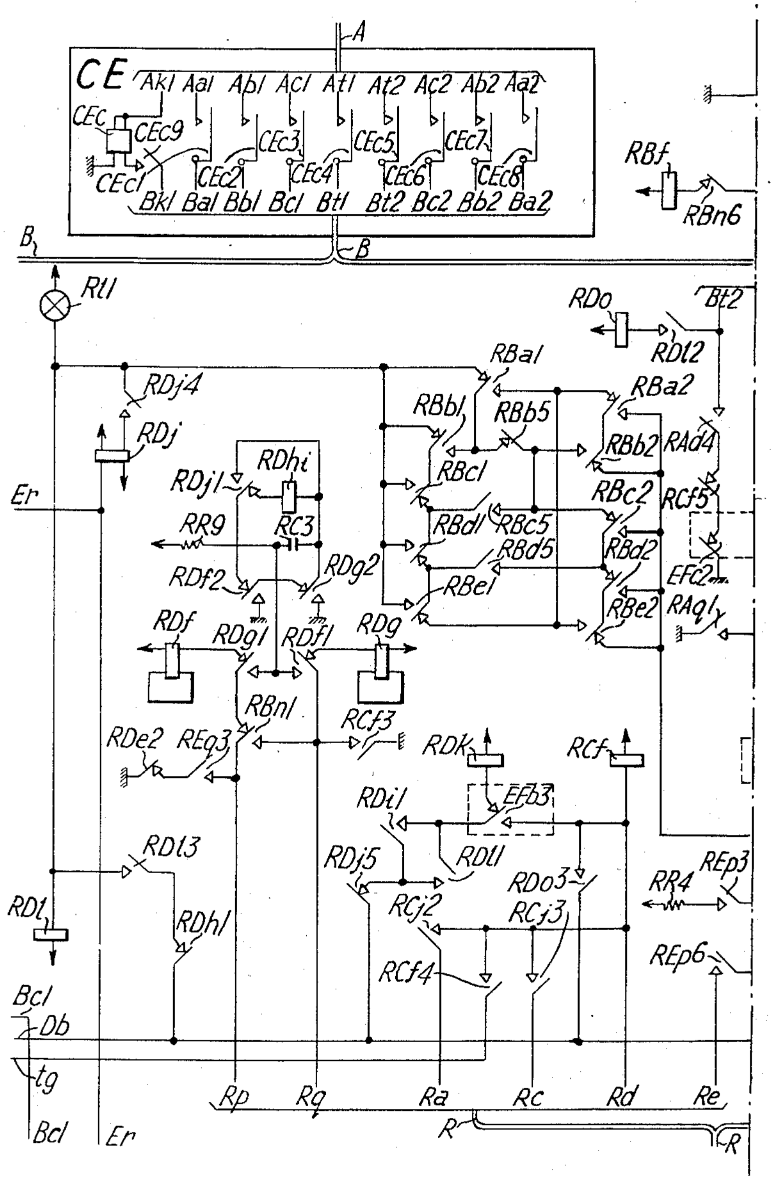
Figure 3A:
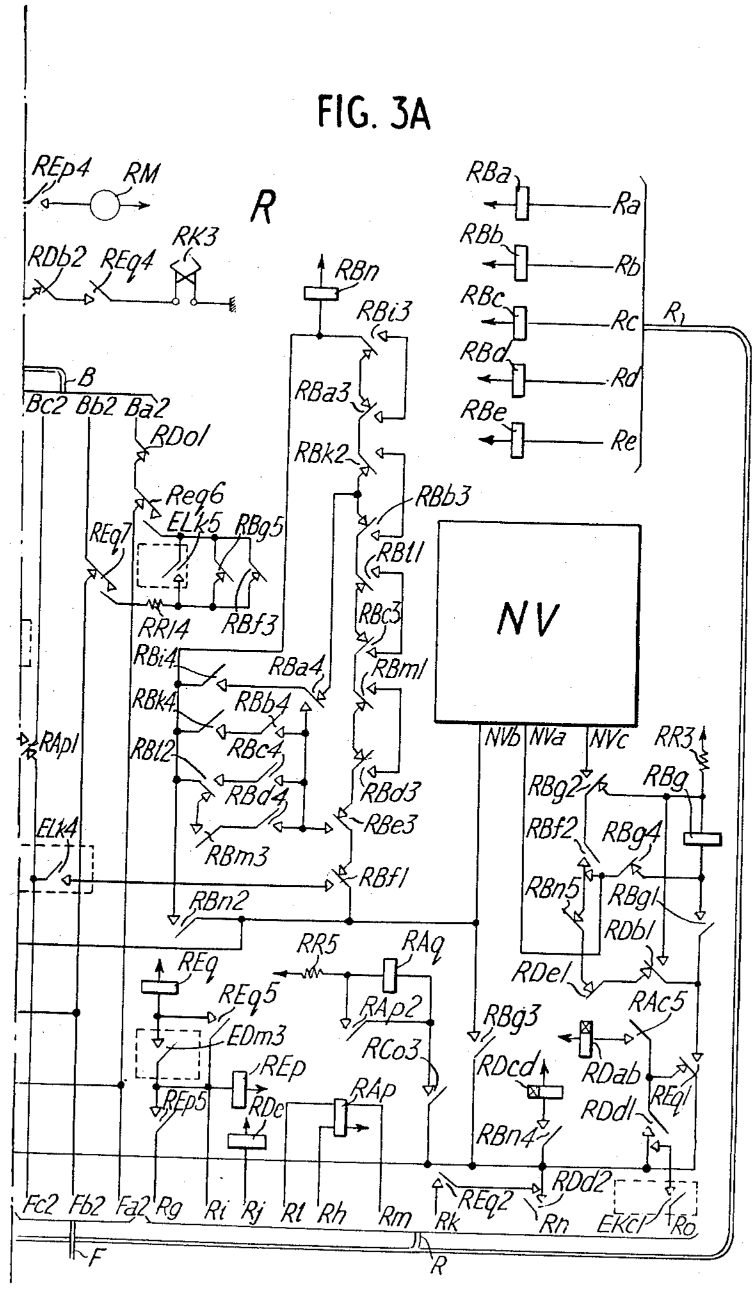

These relays prepare a holding circuit for themselves through the closing of their front contacts EO*a*1 and EO*d*1. These contacts are shown as a single front contact referenced EO*a*1/*e*1 and representing the five front contacts EO*a*1 . . . EO*e*1 associated with metering relays EO*a* . . . EO*e*. All of these front contacts are connected to the general holding wire through the winding of relay EI*cd* and back contacts EE*n*6. However, relay EI*cd* remains unoperated, due to the fact that the two ends of its energizing winding are grounded at the desired instant. The closing of front contacts EO*a*2 and EO*d*2 completes the energizing circuit of scanning relays RB*a* and RB*d* (Fig. 3). The energizing circuit of these relays, which perform no function in the case of a local call, will not be described. The closing of front contacts EO*d*5 and EO*a*6 prepares the energizing circuit of relay EF*f*.

Relay RC*k*, whose winding had been short-circuited by the closing of back contact RC*e*1, releases in turn after a certain delay. The opening of front contacts RC*k*1 . . . RC*k*5 has the effect of breaking the connections existing between coding wires C*a* . . . C*e* and the windings of registering relays EO*a* . . . EO*e*. The two relays EO*a* and EO*d* that were energized hold over a circuit previously described, this having the effect of energizing relay EI*cd*, whose winding has just had its short-circuit removed due to the removal of the ground that was sent to the two registering relays EO*a* and EO*d*. The opening of front contacts RC*k*6 and RC*k*7 breaks the holding circuits of metering relays RA*e*, RA*f*, RA*g*, RA*j*, which release in turn.

Relay EI*cd* marks by its energization the end of the operations involved in registering the first digit of the called subscriber's number.

The passing into operating position of the five make-break contacts EI*c*1 . . . EI*c*5 directs the five coding wires C*a* . . . C*e* to the five registering relays EP*a* . . . EP*c* charged with registering the number's second digit. The closing of front contact EI*d*1 prepares the energizing circuit of relay EF*f*. The opening of back contact EI*d*2 breaks the energizing circuit of relay EH*h*, which releases. The closing of front contact EI*d*3 prepares the energizing circuit of the relay RC*f* that transfers the calling line to faulty operation. The opening of back contact EI*d*4 prevents further sending of ringing tone to the calling subscriber's circuit, when relay EH*h* releases.

The release of relay EH*h* has no effect at the moment involved.

The operations that have just been described recur identically for the registering of the next digit, the digit 6 in the example chosen. After the release of relay RC*k*, marking the end of the registering of said second digit, relays EP*b*, EP*c*, EG*fg* are still energized.

At the end of the registering of the number's third digit, the digit 5 in the example chosen, relays EQ*a*, EQ*c*, EG*ij* energize.

Figure 6:
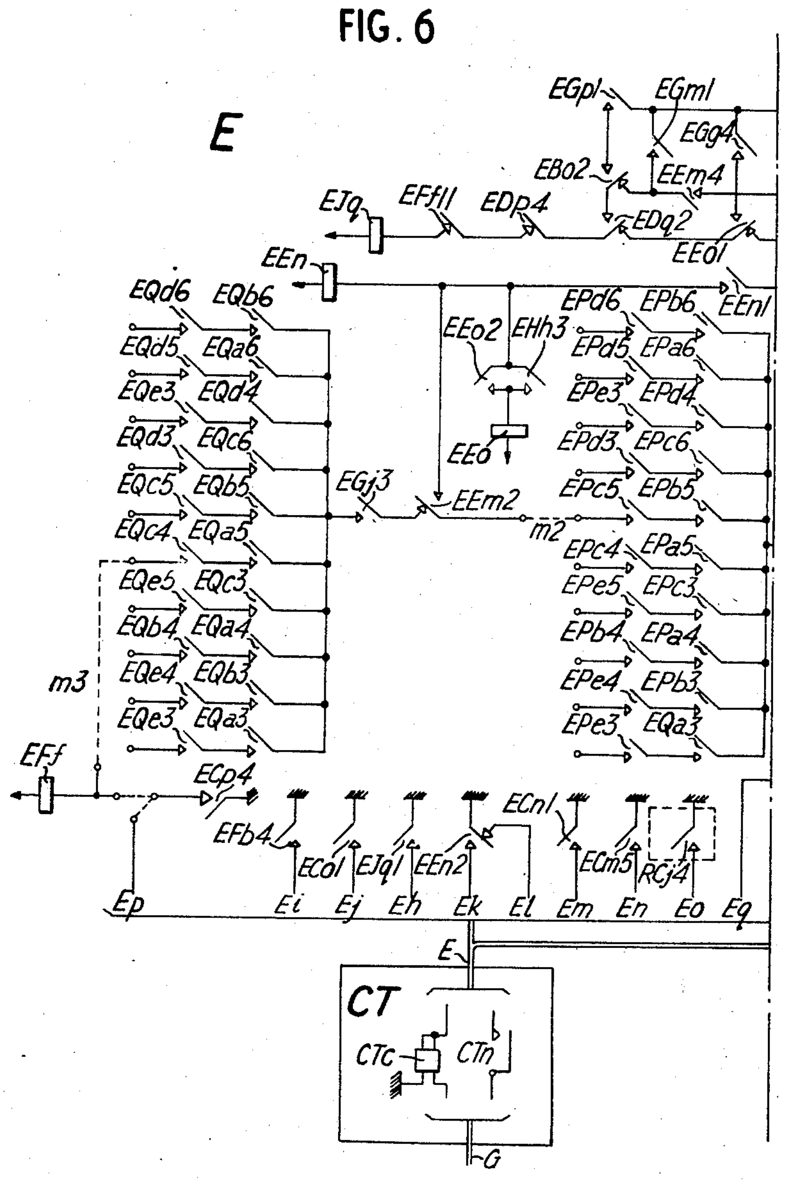
Figure 6A:
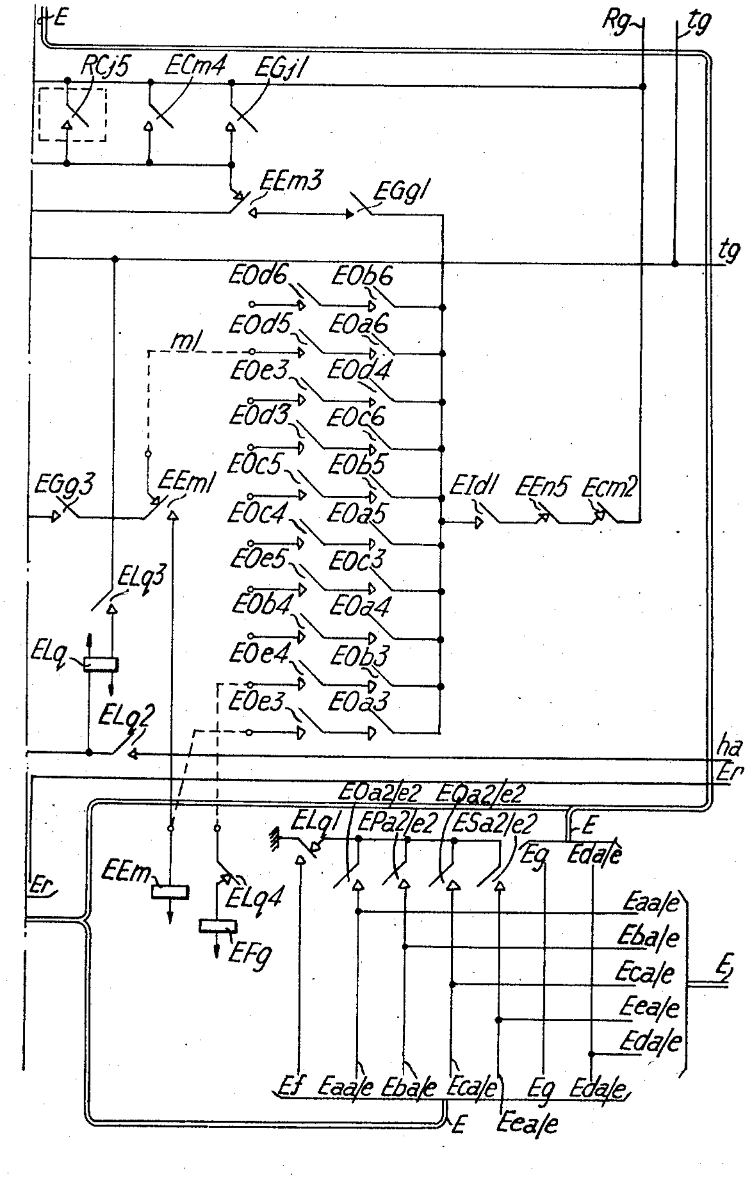
Figure 7:
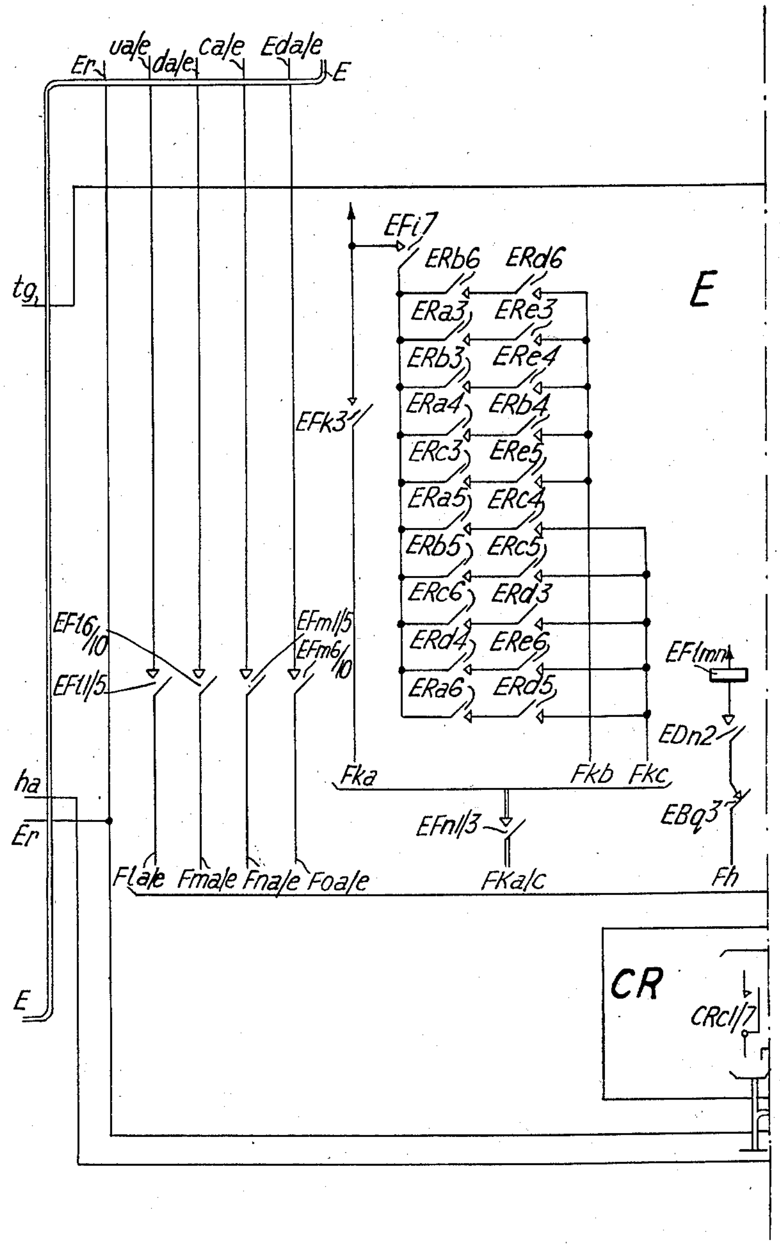
Figure 7A:
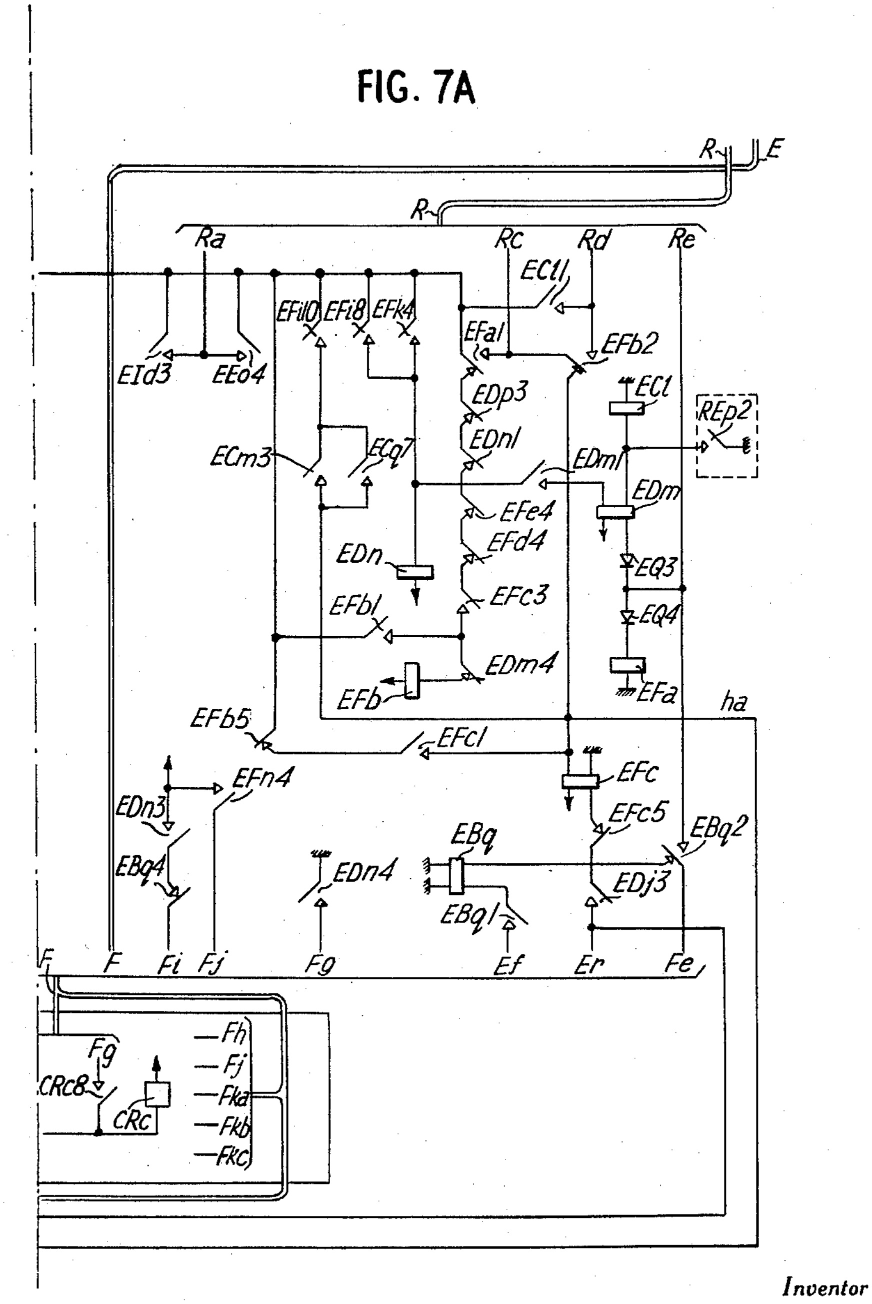

At the instant under consideration the register has just received the code (965) for a local call. The energization of registering relays EO*a*, EO*d*, EP*b*, EP*c*, EQ*a*, EQ*c* will allow the register to detect the local nature of the wanted connection. This detection is provided by relay EF*f*, which energizes. To do so, the registering relays associated with each digit form through a suitable arrangement of their front contacts decoding pyramids having one incoming wire and ten outgoing wires (Fig. 6). When two registering relays for a given digit energize, metallic continuity is established between the incoming wire and the outgoing wire corresponding to the value of the digit that has just been registered. When it is desired to provide discrimination for a special code made up of three digits, it suffices to jumper one of the outgoing wires of the first decoding pyramid to the incoming wire of the second and so on. In the special case here described as an example, relay EF*f* detects the calling subscriber's dialing of the selective combination 965. This relay indeed has its energizing circuit completed as follows: battery, relay EF*f*, jumper *m*3, front contacts EQ*c*4, EQ*a*5, EG*j*3, back contact EE*m*2, jumper *m*2, front contacts EP*c*5, EP*b*5, EG*g*3, back EE*m*1, jumper *m*1, front contacts EO*d*5, EO*a*6, EI*d*1, back contacts EE*n*5, EC*m*2, wire R*g*, back EF*c*4, ground on general holding wire *tg*.

The energization of relay EF*f* tells the register that the connection that is going to be established is a local connection and that therefore the use of the translator is superfluous.

As previously pointed out, the exchange with which the register here under consideration has been assumed to be associated comprises 10,000 lines divided into 20 groups of 500, each group being served by a so-called line-selecting means. Group selection should allow routing a call in progress from the register connector to the line-selecting means to which the called subscriber is connected. It follows from this that for local calls alone the group-selecting means will have 20 outgoing groups. Moreover, as will subsequently be explained, a certain number of groups are provided for outgoing calls to distant exchanges. From this it follows that the numbering scheme used by the register to control the group selection, whether for a local or for a toll call, should comprise 2 digits, this allowing obtaining 100 different selective combinations. In order to save time in transmission operations, use is made of a coded numbering scheme identical with the one used to send the digits received from the metering relays RA*e* . . . RA*j* to the registering relays EO*a*/*e* . . . EU*a*/*e*.

To register the 2-digit selective combinations required for the group selection use is made of 10 registering relays divided into 2 groups of 5, each group corresponding to one of the digits making up said selective combinations. These relays, referenced EW*a* . . . EW*e* for the first group and EX*a* . . . EX*e* for the second, are shown as 2 relays only, referenced EW*a*/*e* and EX*a*/*e*. The energizing windings of relays EW*a* . . . EW*e* are connected to the coding wires referenced E*wa* . . . E*we*. Likewise, relays EX*a* . . . EX*e* are connected to the coding wires referenced E*xa* . . . E*xe*. These wires are all grouped into cable E, terminating at translator T through translator connector CT.

Over these wires are sent from the translator polarities that energize for a special translation 2 relays EW and 2 relays EX, the energization of these relays thereupon allowing the group selection that subsequently allows connecting the register connector to the originating connector associated with the outgoing circuit that must route the call to the distant terminating exchange. As previously stated, the translator is not associated with the register in the case of a local call. In other words, the register itself must provide the translation of the received code to determine the elements required for the control of the group selection. Since that group selection is provided by the energization of 2 relays EW and of 2 relays EX and since these relays cannot be energized over the path previously described, the translator not being connected to the register, it follows that shunts have been provided on some of the wires E*wa* . . . E*we* and E*xa* . . . E*xe*. These shunts terminate at coding contacts whose operation will be explained later on in this description. The above-mentioned special shunts will be termed "local coding wires" in what follows.

Knowing the first two digits of the call number's numerical portion is a condition at once necessary and sufficient in order to be able to determine the routing of the call from the register connector to the line-selecting means serving the called subscriber. As previously pointed out, the subscribers are associated in groups of 500 to form a line-selecting means. Consequently, a group of 1000 subscribers comprises 2 line-selecting means. Stated otherwise, in order to identify a particular line-selecting means, it suffices to know the 1000-subscriber group comprising the called subscriber and to determine whether said subscriber forms part of the first or the second 500-subscriber group making up the 1000-subscriber group in question.

The coding of the thousands digit is provided by relays EX*a* . . . EX*e*, which for a local call "duplicate" the thousands-digit registering relays ER*a* . . . ER*e*. The coding of the digit characterizing the 500-subscriber group comprising the called subscriber is provided by relays, EW*a*, EW*b*, EW*d*. It will be noted that only three relays EW are used for this coding. This is due to the fact that the called subscriber may be comprised either in the first or in the second 500-subscriber group in a given 1000-subscriber group. If the subscriber is in the first 500 group, coding relays EW*a* and EW*d* energize, while relays EW*b* and EW*d* energize if said subscriber is in the second 500 group. It will be noted that relay EW*d* energizes regardless of the 500 group to which the called subscriber is connected. For that reason, said relay can be energized before receiving the thousands and the hundreds digits or, stated otherwise, immediately after receiving the three digits making up the code characterizing a local call. This will further be explained in detail in the description that follows.

Since the register will have this information once the subscriber has dialed the thousands and the hundreds digits, the 2 relays EW and EX can be energized by sending suitable polarities over certain of the local coding wires mentioned before.

After having received the code 965, the register is told that the connection about to be established is a local connection by the energization of relay EF*f*, as has already been pointed out. By the passing into operating position of its make-break contact EF*f*1, relay EF*f* prepares the energizing circuit of relay EF*hi* (Fig. 5), which will subsequently control the starting of the local line-selecting operations. The closing of front contact EF*f*2 completes the energizing circuit of relay EW*d*, which pulls up: battery, relay EW*d*, local coding wire E*wd*, front contact EF*f*2, ground.

The closing of front contact EF*f*3 prepares the energizing circuit of one of the 2 relays EW*a* or EW*b*. The closing of the five front contacts EF*f*4 . . . EF*f*8 prepares the energizing circuit of 2 of relays EX*a* . . . EX*e*. The closing of front contact EF*f*9 prepares the energization of relay ED*p*. The closing of front contact EF*f*10 grounds wire I*v* to fault register ED (Fig. 2). The opening of back contact EF*f*11 prevents any untimely energization of translator-seizure relay EJ*q*.

As can be seen, coding relay EW*d* has just energized, as preveiously indicated.

This relay completes a holding circuit for itself through the closing of its front contact EW*d*1: battery, relay EW*d*, front EW*d*1, back EF*c*6, wire D*b*, cable D, wire D*b*, front RA*c*1, ground.

The function of the other contacts of this relay will be described subsequently.

The calling subscriber will now dial the numerical portion of the called subscriber's number. It will be recalled that this numerical portion is 25—70 in the example chosen at the beginning of this description. At the end of the operation for registering the thousands digit, that is, digit 2, relays ER*b*, ER*e*, EG*lm* are energized. The energization of the 2 registering relays ER*b* and ER*e* entails that of relays EX*b* and EX*e*. The method of grounding local coding wires E*xa* . . . E*xe* in the register will be explained before describing the energizing circuits of these relays. The 5 local coding wires can be grounded through 5 groups of 2 series front contacts EF*f*4 . . . EF*f*8, ER*a*2 . . . ER*e*2. Therefore, a total of 5 sets of 2 front contacts connected in series are provided and connected on the one side to a local coding wire and on the other to ground. These explanations will now allow describing the energizing circuits of relays EX*b* and EX*e*, which are as follows:

(1) Battery, relay EX*b*, local coding wire E*xb*, front contact EF*f*5, front contact ER*b*2, ground;

(2) Battery, relay EX*e*, local coding wire E*xe*, front contact EF*f*8, front contact ER*e*2, ground.

The closing of said front contacts ER*b*2 and ER*e*2 also prepares the code-sending circuit that will be used subsequently in the course of the line-selecting operations and that will be referred to again at that time.

Through the closing of their front contacts ER*b*3 . . . ER*b*6, ER*e*3 . . . ER*e*6, registering relays ER*b* and ER*e* prepare the coding circuit that will be used subsequently in the course of the line selection.

The energization of relay EG*lm* has no effect at this time.

Relays EX*b* and EX*e* complete a holding circuit for themselves through the closing of their front contacts EX*b*1 and EX*e*1:

(1) Battery, relay EX*b*, front EX*b*1, back EF*c*6, wire D*b*, cable D, wire D*b*, front RA*c*1, ground;

(2) Battery, relay EX*e*, front EX*e*1, back EF*c*6, wire D*b*, cable D, wire D*b*, front RA*c*1, ground.

Through the closing of their front contacts EX*b*2, EX*e*2, relays EX*b* and EX*e* prepare the code-sending circuits over coding wires *ub* and *ue*. Through the closing of their front contacts EX*b*3, EX*b*4, EX*e*3, relays EX*b* and EX*e* prepare the energizing circuit of relay ED*p*.

At the end of the operations for registering the hundreds digit, digit 5 in the example chosen, relays ES*a*, ES*c*, EG*op* are energized.

Through the closing of their front contacts ES*a*2 and ES*c*2, hundreds-digit registering relays ES*a* and ES*c* prepare the code-sending circuits that will be used subsequently in the course of the line-selecting operations (Fig. 6). Through the closing of their front contacts ES*a*4, ES*c*3, relays ES*a* and ES*c* complete the energizing circuit of relay EH*h*, which pulls up: battery, relay EH*h*, front ES*a*4, ES*c*3, ground over general holding wire *tg*.

The energization of relay EG*op* entails that of relay RD*f*, whose energizing circuit is completed through the closing of front EG*p*2: battery, upper winding of relay RD*f*, back RD*g*1, RB*n*1, wire R*p*, cable R, wire R*p*, back EF*d*2, front EG*p*2, back ED*p*1, RE*p*1, ground.

The closing of front EG*p*3 prepares the energizing circuit of relay ED*p*. The energizing circuit of coding relays EW*a* or EW*b* is prepared by the closing of front EG*p*4.

The energization of relay EH*h* shows that the called subscriber forms part of the second group of 500 subscribers connected to the 1000 group involved, that is, group 2 in the example chosen. From the foregoing explanations it follows that coding relay EW*b* should be energized. The energizing circuit of said relay is indeed completed by the closing of front contact EH*h*1: battery, relay EW*b*, local coding wire E*wb*, front EH*h*1, EG*p*4, EF*f*3, ground. The other contacts of relay EH*h* are inoperative at this instant.

The energization of relay EW*b* will allow starting the group-selecting control operations. This relay completes a holding circuit for itself through the closing of its front contact EW*b*1: battery, relay EW*b*, front EW*b*1, back EF*c*6, wire D*b*, cable D, wire D*b*, front RA*c*1, ground.

Through its front EW*b*2, coding relay EW*b* prepares the circuit for the group-selecting control operations. The energizing circuit of relay ED*p* is completed through the closing of front EW*b*3 and EW*b*4: battery, relay ED*p*, back EW*a*3, front EW*b*3, back EW*c*4, front EW*d*4, back EW*e*3, EX*a*3, front EX*b*3, back EX*c*4, EX*d*3, front EX*e*3, EF*f*9, EG*p*3, ground.

It will be noted that the energization of relay ED*p* is under the control of 2 series-connected contact pyramids that if need be establish metallic continuity between the energizing winding of relay ED*p* and front contact EF*f*9. The purpose of these pyramids is to verify that the 2 relays EW and the 2 relays EX have energized following the reception of the thousands and the hundreds digits. It can easily be verified that the metallic continuity of a pyramid is provided only when 2 out of the 5 relays controlled by it are energized. The metallic continuity is broken in all other cases.

The relay RD*f* that has just energized forms part of a time device comprising relays RD*f*, RD*g* and RD*hi*. This device starts counting time as soon as one or the other of relays RD*f* and RD*g* pulls up. The purpose of this device is to verify that the time required to perform each operation controlled by the register is less than a certain value. If that time exceeds said critical value, it may be deduced therefrom that trouble prevents the normal establishment of the connection. Throughout what follows it will be assumed that all the elementary operations required for establishing a local or a toll connection are performed normally and that relay RD*hi* therefore never energizes.

Relays RD*f* and ED*g* can cause the starting of the time device without distinction. When either one of these relays energizes it starts said device, which then controls a certain elementary operation. When that operation has been effected, the first starting relay releases, while the second energizes. In the course of this switching of the starting relays, the time device is "restored to normal" and accordingly is ready to control the new elementary operation that has just begun immediately after the end of the preceding elementary operation.

The energization of relay RD*f* prevents the subsequent energization of relay RD*g* through the opening of back contact RD*f*1. Make-break contact RD*f*2 removes the short-circuit from condenser RC3 and completes its charging circuit: battery, resistance RR9, condenser RC3, back contact RD*g*2, front contact RD*f*2, ground.

This condenser will be charged gradually, owing to the presence of charge resistance RR9. The sensitive relay RD*hi* connected to the terminals of this condenser will remain unoperated so long as the voltage at the terminals of the condenser is below a certain predetermined value. This lag will allow providing the control for the energization of relay ED*p*.

The energization of relay ED*p* will control the starting of the group selection. The closing of front contact ED*p*1 short-circuits time condenser RC3, which discharges, thus restoring to normal the time device just mentioned above: ground, front RD*f*2, back RD*g*2, condenser RC3, front RD*f*1, wire R*q*, cable R, wire R*q*, back EF*e*2, front ED*p*1, back RE*p*1, ground.

Relay RD*f*, having its energizing circuit broken owing to the opening of back contact ED*p*1, releases with a certain delay due to its lower winding being short-circuited to itself.

The closing of front contact ED*p*2 completes the energizing circuit of relay EF*jk*, which pulls up: battery, relay EF*jk*, back EF*e*1, front ED*p*2, back ED*m*2, EF*c*4, ground on general holding wire *tg*.

The other contacts of relay ED*p* are inoperative at this time.

Relay RD*f* releases after a moment, this meaning that the two groups of coding relays EW and EX have energized properly. The closing of back contact RD*f*1, completes the energizing circuit of relay RD*g*, which pulls up: battery, relay RD*g*, back RD*f*1, wire R*q*, cable R, wire R*q*, back EF*e*2, front ED*p*1, back RE*p*1, ground.

Condenser RC3 is discharged quickly due to the short-circuiting of its armatures by the closing of back contact RD*f*2.

The energization of relay RD*g* will control the starting of a new control cycle by time relay RD*hi*. The opening of back contact RD*g*1 prevents untimely energization of relay RD*f*. Condenser RC3 is freed from the short-circuit and placed under charge by the passing into operating position of make-break contact RD*g*2: battery, resistance RR9, condenser RC3, front contact RD*g*2, ground.

Condenser RC3 charges gradually, the relay RD*hi* connected to its armatures remaining unoperated so long as the voltage at the terminals of said armatures remains below a certain critical value. The time relay has therefore just started a new control cycle, which will measure the time taken up by the group-selecting operations properly speaking.

Since the register now has all the elements required for the group selection, it will send them to a group-selection receiver through a receiver connector. These operations are controlled by relay EF*jk*, which has just energized. The closing of front contacts EF*j*1 . . . EF*j*5 and EF*j*6 . . . EF*j*10 prepares the circuit used for sending the selective combinations required for the group selection. The opening of front contact EF*k*1 prevents the energization of relay EF*hi* when relay EH*ed* energizes.

after registering the units digit. The closing of front contact EF*k*2 prepares the energizing circuit of relay EF*e*. The closing of front contact EF*k*3 applies a battery to wire F*ka* to tell receiver connector CR subsequently that it must provide the connection of a group-selection receiver. The closing of front EF*k*4 completes the energizing circuit of relay ED*n*, which pulls up: battery, relay ED*n*, front EF*k*4, ground on general holding wire *tg*.

A ground is applied to wire I*s* to fault register ED through front contact EF*k*5.

The energization of relay ED*n* causes the sending to receiver connector CR of signals that enable it to select a group-selection receiver. The opening of front contact ED*n*1 has no effect at the instant under consideration, but will serve subsequently to control the release of relay ED*n*. The closing of front contacts ED*n*2 and ED*n*3 controls the seizure of a receiver connector CR in accordance with a known method. The holding circuit of connection magnet CR*c* of receiver connector CR is prepared by the closing of front contact ED*n*4.

The connection of a group-selection receiver will now be effected under the control of the register. This method of connection is known and it will simply be outlined in order to facilitate an understanding of the operation of the register relays controlling the group-receiver connection operations.

The closing of front contact ED*n*3 causes the sending of a battery to the set of receiver connectors associated with the register under consideration. As soon as one of these connectors is seized, it causes the sending of a ground over wire F*h*, the effect of this being to energize relay EF*lmn*: ground on wire F*h*, back EB*q*3, front ED*n*2, relay EF*lmn*, battery.

The energization of this relay tells the register that it has just been connected to a receiver connector and that the latter is ready to receive from said register the signals required to allow it to be connected to a receiver. It is well to recall that receiver connector CR allows connecting the register either to a group-selection or to a line-selection receiver. Presently the register is told only that the selection to be made is a group selection. This is characterized by the energization of relay EF*jk*. By energizing, relay EF*jk* has prepared information circuits that will allow receiver connector CR to choose the suitable receiver. Said circuits are completed by the energization of relay EF*lmn*.

The closing of front contacts EF*l*1 . . . EF*l*10 prepares the circuit used for sending the code to the group-selection receiver that is going to be seized by receiver connector CR. Front contacts EF*m*1 . . . EF*m*10 are inoperative at the instant under consideration. The closing of front contact EF*n*1 completes the discrimination circuit that will enable the receiver connector to hunt for and be associated with a group-selection receiver: battery, front EF*k*3, wire F*ka*, front EF*n*1, wire F*ka*, cable F to receiver connector CR.

The seizure-holding circuit of receiver connector CR is completed by the closing of front contact EF*n*4: battery, front EF*n*4, wire F*j*, cable F to receiver connector CR.

The closing of front contact EF*n*5 applies a ground to wire I*r* to fault register ED.

Once the receiver connector is associated with a group-selection receiver, the latter controls the operation of connection magnet CR*c* over a circuit not shown. Through the closing of its front contacts Crc1 . . . CR*c*8, this magnet provides the connection of wires F*a*2, F*h*2, F*c*2, F*d*, F*e*, F*f*, E*r* to the corresponding wires (not shown) of the group receiver involved. Connection magnet CR*c* completes a holding circuit for itself through its front CR*c*8: battery, winding of magnet CR*c*, front CR*c*8, ED*n*4, ground.

The receiver thereupon registers the selective combinations needed for the group selection at the proper registering relays and in accordance with a known method over the following circuits:

(1) Ground, front EW*b*2, EF*j*2, wire *db*, front EF*l*7, wire F*mb*, cable F to receiver connector CR;

(2) Ground, front EW*d*2, EF*j*4, wire *dd*, front EF*l*9, wire F*md*, cable F to receiver connector CR;

(3) Ground, front EX*b*2, EF*j*7, wire *ub*, front EF*l*2, wire F*lb*, cable F to receiver connector CR;

(4) Ground, front EX*e*2, EF*j*10, wire *ue*, front EF*l*5, wire *fle*, cable F to receiver connector CR.

To be able to connect itself to one of the two markers associated with the group-selecting means to which the calling subscriber has been connected during the hunting for the calling line, the receiver must know the identity of said group-selecting means. This identity is sent to the receiver in accordance with a known method by sending a special polarity over the discrimination wire A*c*2 coming from the group-selecting means to which the calling subscriber has access. This polarity is sent by the register and by the receiver connector to the group-selection receiver over the following circuits: wire A*c*2 brought to a special potential, front EC*c*6, wire B*c*2, cable B, wire B*c*2, back RA*p*1, wire F*c*2, cable F to the group-selection receiver involved through receiver connector CR.

Having now received all this information, the group-selection receiver will be able to send it to one of the two markers associated with the group-selecting means involved. The marker tells the register that it has received all the information required for the group selection, and that this group selection has just been effected normally, by connecting battery to wire F*e* through receiver connector CR, the effect of this being to energize relay EB*q*: ground, upper winding of relay EB*q*, back EB*q*2, wire F*e* grounded by the group-selection receiver through receiver connector CR.

Relay EB*q* will control the receiver-connector's releasing operations. Relay EB*q* completes a holding circuit for itself through the closing of its front EB*q*1: ground, lower winding of relay EB*q*, front EB*q*1, battery on wire F*f* applied by the group receiver through receiver connector CR.

The closing of front contact EB*q*2 completes the energizing circuit of releasing relay ED*m*, which pulls up: ground, relay EC*l*, right-hand winding of relay ED*m*, rectifier EQ3, wire R*e*, front EB*q*2, wire F*e* connected to battery across a high resistance in the group-selection receiver and through receiver connector CR.

Marginal relay EC*l* remains unoperated owing to the high resistance switched in by the group-selection receiver involved.

Through the opening of its back contacts EB*q*4 and EB*q*3, relay EB*q* breaks the holding circuit of receiver connector CR and of relay EF*lmn*, which releases.

Relay ED*m* completes a holding circuit for itself through the closing of its front contact ED*m*1: battery, left-hand winding of relay ED*m*, front EF*k*4, ground on general holding wire *tg*.

The opening of back ED*m*2 removes the short-circuit from relay EF*e*, which releases, while relay EF*jk* holds in series with said relay EF*e*: battery, relay EF*jk*, front EF*k*2, back EF*e*3; relay EF*e*, wire R*g*, back EF*c*4, ground on general holding wire *tg*.

The other contacts of relay ED*m* are inoperative at this time.

The release of relay EF*lmn* breaks the code-sending circuits that have just been used for the group selection.

Relay EF*e* controls the ending of the group-selection operations. The passing into operating position of its make-break contact EF*e*1 prepares the energizing circuit of relay EF*hi* and prevents further energization of relay EF*jk*. The time circuit is restored to normal through the opening of back contact EF*e*2, the effect of this being to break the energizing circuit of relay RD*g*, which releases with a slight delay. Relay EF*e* completes a holding circuit for itself through the closing of its make-break contact EF*e*3: battery, resistance ER7, front EFe3, relay EFe, wire Rg, back EFc4, ground on general holding wire tg.

The opening of back contact EFe3 breaks the energizing circuit of relay EFjk, which releases.

The release of relay EFjk prepares the energizing circuit of relay EFhi through the closing of its back contact EFk1. Relay EDn releases owing to the break in its energizing circuit caused by the opening of front contact EFk4. The ground applied to wire Is to fault register ED is removed by the opening of front contact EFk5.

The release of relay EDn entails the release of connection magnet CRc of receiver connector CR through the opening of front contact EDn4.

The receiver connector, released by the release of magnet CRc, breaks the energizing circuit of relays EBq and EDm, which release, thereby marking the end of the group-selecting operations.

The register will now control the line-selecting operations as soon as the calling subscriber has dialed the hundreds, tens and units digits of the numerical portion of the called subscriber's number.

It will be recalled that the called subscriber's number is 965—25—70. Once the calling subscriber has dialed the last two digits, namely 7 and 0, the following relays energize:

(1) For the tens digit 7: ETc, ETd, EHab;

(2) For the units digit 0: EUb, EUd, EHde.

The energizing method of these relays, which is identical with that of relays EOa, EOd and EIcd, which has already been explained, will not be described.

Through the closing of their front contacts ETc2 and ETd2 (Fig. 5), tens-registering relays ETc and ETd prepare certain code-sending circuits involved in the line selection. Relay EHab has no effect at this time.

Through the closing of their front contacts ESb2 and ESd2, units-registering relays ESb and ESd prepare the code-sending circuits involved in the line selection.

Relay EHde tells the register that the calling subscriber has just dialed the last digit of the called subscriber's number. Through the closing of its front contact EHe1, relay EHde completes the energizing circuit of relay RDf of the time device: battery, upper winding of relay RDf, back RDg1, RBn1, wire Rp, cable R, wire Rp, back EFd2, front EHe1, EFe2, EDp1, back REp1, ground.

The supply circuit of pulse counter NR is definitively broken by the opening of back contact EHe2, this rendering it insensitive to the arrival of new pulses should the calling subscriber dial additional digits. The closing of front contact EHe3 (Fig. 2) completes the energizing circuit of the primary winding of transformer RCcd: ground, primary winding of transformer RCcd, front EHe3, back EEo5, waiting-tone generator RG1, ground.

Relay EFhi, controlling the starting of the line-selecting operations, pulls up, its energizing circuit having just been completed by the closing of front contact EHe4 (Fig. 5): battery, relay EFhi, front EHe4, back EFd1, front EFf1, back EFk1, front EFe1, EDp2, back EDm2, wire Rg, back EFc4, ground on general holding wire tg.

The timing device will now control in accordance with a method already described the building-up time of the line-selecting operations.

The energization of the primary winding of transformer RCcd causes the sending through the calling subscriber's loop of a special waiting tone that will tell the calling subscriber that the register has received the called subscriber's number properly and that the operations involved in hunting for the latter subscriber are in progress. The circuit used for sending this tone has already been described at the beginning of this description.

Relay EFhi controls the line-selecting operations as has just been stated.

Through the closing of its contacts EFh1 . . . EFh5, relay EFhi prepares the circuits used for sending the code corresponding to the tens digit. Through the closing of its front contacts EFh6 . . . EFh10, relay EFhi prepares the circuits used for sending the code corresponding to the units digit. Through the closing of its front contacts EFi1 . . . EFi5, relay EFhi prepares the circuits used for sending the code corresponding to the hundreds digit. The energizing circuit of relay EFd is prepared by the closing of front contact EFi6. Front contact EFi7 prepares the discrimination circuit that will allow hunting for a line-selection receiver. Front contact EFi8 completes the energizing circuit of relay EDn, which pulls up: battery, relay EDn, front EFi8, ground on general holding wire tg.

The called-subscriber category discrimination circuit is prepared by the closing of front contact EFi9. Front contact EFi10 is not used for local calls. A ground is applied to wire It to fault register ED by the closing of front contact EFi11.

The sequence of operations that develop in the course of the line selection will be explained before proceeding with this description.

When the register is connected to a receiver connector, it must furnish it a special signal telling it that it must be associated with a line-selection receiver. In a 10,000-line exchange such as involved in the present description, the line-selection receivers are divided into 2 groups, each having access to one half of the set of 2 markers associated with a line-selecting means. Stated otherwise, the subscribers of a 10,000-line exchange are divided into 2 groups of 5,000 subscribers, each 5,000-subscriber group being associated with one half of the line-selection receivers provided in said exchange. Hence, the register must give the receiver connector a double signal, telling it that it must be associated with a line-selection receiver and that said receiver forms part of the first or of the second 5,000-subscriber group of the exchange involved.

The two discrimination wires Fkb and Fkc (Fig. 7) are used for that purpose. The grounding of one or the other of these wires tells receiver-connector CR that it must be associated with a line-selection receiver. In addition, depending on whether the called subscriber belongs to the first or to the second 5,000-subscriber group, the ground is applied either to wire Fkb, for called subscribers connected to the thousands 0, 1, 2, 3, 4, or to wire Fkc, for called subscribers connected to the thousands 5, 6, 7, 8, 9. This grounding is effected by a set of 20 decoding contacts ERa3/5, ERb3/5, ERc3/5, ERd3/5, ERe3/5 belonging to the 5 thousands-digit registering relays ERa . . . ERe. The operation of these contacts has already been mentioned before. Suffice it to recall that the thousands digit of the called subscriber's number is the digit 2, this bringing about the energization of registering relays ERb and ERe and further the closing of front contacts ERb3 and ERe4, which thus complete the grounding circuit for discrimination wire Fkb, which will subsequently be used to tell receiver connector CR:

(1) That it must hunt for a free line-selection receiver;

(2) That the hunting must be done in the group of line-selection receivers allotted to the first 5,000-subscriber group.

Once a line-selection receiver has been seized by receiver connector CR, it must be connected to one of the two markers associated with the line-selecting means to which the called subscriber is connected. The register knows the identity of the line-selecting means to which the latter is connected and can therefore send it directly to the line-selection receiver that has just been seized, to allow said receiver to be connected to one of the two markers associated with the line-selecting means involved. It is well to note here that, contrary to what happened for the group selection, the identity of the line-selecting means is sent directly to the line-selection receiver from the register and not from the line-selecting means via said register as was done for the group selection. This latter is due to the fact that the register does not know the identity of the group-selecting means to which the calling subscriber has been connected in the course of hunting for the calling line, while it does know the identity of the line-selecting means to which the called subscriber is connected.

In order to be able to connect itself to one of the two markers associated with the line-selecting means to which the called subscriber is connected, the line-selection receiver must know two things: the 1000 group and the 500 group to which the called subscriber is connected.

The information is sent to said line-selection receiver over wires E*da/e* and E*ca/e*. The hundreds-code sending wires E*ca* serve two purposes:

(1) To tell the line-selection receiver the 500-subscriber group to which the called subscriber is connected;

(2) To tell one of the two markers of the line-selecting means to which the called subscriber is connected the hundreds to which said subscriber belongs.

In order to provide the line selection the marker must know the last two digits of the numerical portion of the called subscriber's number, that is, the tens and the units digits. This information is sent in coded form over the two groups of five wires *da/e* and *ua/e*.

It will be recalled that the numerical portion of the called subscriber's number is 25—70, this corresponding to the energization of the following registering relays:

(1) For thousands digit 2—relays ER*b*, ER*e*;
(2) For hundreds digit 5—relays ES*a*, ES*c*;
(3) For tens digit 7—relays ET*c*, ET*d*;
(4) For units digit 0—relays EU*b*, EU*d*.

These relays ground the code-sending wires as follows:

(1) Ground, front ER*b*2, thousands-code sending wire E*db*, cable E, wire E*db* to receiver connector CR;

(2) Ground, front ER*e*2, thousands-code sending wire E*de*, cable E, wire E*de* to receiver connector CR;

(3) Ground, front ES*a*2, wire E*ea*, cable E, wire E*ea*, front EF*i*1, hundreds-code sending wire *ca* to receiver connector CR;

(4) Ground, front ES*c*2, wire E*ec*, cable E, wire E*ec*, front EF*i*3, hundreds-code sending wire *cc* to receiver connector CR;

(5) Ground, front ET*c*2, EF*h*3, tens-code sending wire *dc* to receiver connector CR;

(6) Ground, front ET*d*2, EF*h*4, tens-code sending wire *dd* to receiver connector CR;

(7) Ground, front EU*b*2, EF*h*7, units-code sending wire *ub* to receiver connector CR;

(8) Ground, front EU*d*2, EF*h*9, units-code sending wire *ud* to receiver connector CR.

These explanations allow continuing the description of the development of the line-selecting operations. It will be recalled that the energization of relay EF*hi* has entailed that of relay ED*n* through the closing of front contact EF*i*8. As from the moment of energization of relay ED*n*, the general operation of the register will be the same as already described in connection with the group selection. Relay ED*n* controls the seizure of a receiver connector CR for example. The latter in turn is connected to a line-selection receiver, which is associated with one of the two markers of the line-selecting means to which the called subscriber is connected. When the receiver connector has found said receiver, relay EF*lmn* pulls up, while connection magnet CR*c* is energized. When the receiver has registered the coded information that will allow hunting for the called subscriber among the 500 lines comprised in the line-selecting means involved, relay EB*q* pulls up, thereby telling the register that the line-selecting operations have just ended. Relay ED*m* pulls up immediately. The pulling up of this relay will this time cause that of relay EF*d* in a manner identical with the one described in connection with the pulling up of relay EF*e* during the group-selecting operations.

The pulling up of relay EF*d* prepares the energizing circuit of relay RA*p* through the closing of front contact EF*d*1. By the passing into operating position of its make-break contact EF*d*2, the time device is "restored to normal" in accordance with a method already described and then immediately placed in counting position to control the release of the register. By the passing into operating position of make-break contact EF*d*3, relay EF*d* completes a holding circuit for itself and opens the energizing circuit of relay EF*hi*, which releases: battery, resistance ER6, front EF*d*3, relay EF*d*, wire R*g*, back EF*c*4, ground on general holding wire *tg*.

In accordance with a known method already described, the release of relays EF*hi* and ED*n* entails that of relay EB*q* and the release of translator connector CR.

The release of relay EF*hi* further entails that of relay ED*m*.

The release of relay ED*m* entails the pulling up of relay RA*p*, whose energizing circuit is completed by the closing of back contact ED*m*2: battery, lower winding of relay RA*p*, wire R*h*, cable R, wire R*h*, front EF*d*1, EF*f*1, back EF*k*1, front EF*e*1, ED*p*2, back ED*m*2, wire R*g*, back EF*c*4, ground on general holding wire *tg*.

Relay RA*p* controls the release of the register. Through the closing of its front RA*p*3, it applies a ground to wire I*o* to fault register ED. Through the opening of its back contact RA*p*4, the energizing circuit of register-holding relay RC*b* is opened, thereby releasing this relay.

The opening of back contact RC*b*1 breaks the ground on test wire B*t*1, the effect of this being to establish metallic continuity in the register connector between the calling subscriber and the group-selecting means. The opening of front contact RC*b*4 breaks the energizing circuit of loop relay RA*ab*, which releases, together with the associated relay RC*a*.

The release of relay RC*a* entails the release of relay RA*cd*, which is delayed due to the short-circuit of its upper winding.

After a moment, relay RA*cd* releases in turn and removes the ground from general holding wire *tg* owing to the opening of front contact RA*d*2, this causing the release of all the relays that were holding over this wire. Code relays EW and EX, which were holding over wire D*b*, release in turn owing to the opening of front contact RA*c*1. The release of relay RA*cd* further causes the release of register finder CR owing to the opening of front contact RA*d*3. The register is thus released.

The operations that follow the metallic connection of the calling subscriber to the group-selecting means do not come within the scope of the present invention and will not be described.

It will now be assumed that the calling subscriber dials a number corresponding to an area call. It will be assumed by way of example that he dials 828—25—70. In this number, 828 constitutes the so-called code, while 25—70 represents the numerical portion of said number.

The seizure of the register and the registering of the digits dialed by the subscriber are effected the same way as described in connection with a local call. When the subscriber is through dialing the third code-digit, relay EF*f* does not pull up, since its energizing circuit can be completed only when the code dialed is 965, as has previously been pointed out. It is known that relay EG*ij* pulls up after the registering of the third code-digit. The operation of this relay has already been explained. It will be recalled that front EG*j*1 was inoperative owing to the pulling up of relay EF*f*, which had thereby opened back contact EF*f*11, thus preventing the energization of relay EJ*q*. In the case of an area call, relay EF*f* remains unoperated. From this it follows that the energizing circuit of relay EJ*q* is completed through the closing of front contact EG*j*1, the relay therefore pulling up: battery, relay EJ*q*, back EF*f*11, ED*p*4, ED*q*2, EE*q*1, EE*m*3, front EG*j*1, wire R*g*, cable R, wire R*g*, front EF*c*4, ground on general holding wire *tg*.

Before considering the operation of relay EJ*q*, it will be noted that none of code relays EW*a/e* and EX*a/e* pulls up, since relay EF*f* is unoperated and its front contacts EF*f*3 . . . EF*f*8 are open. The pulling up of these relays depends in fact upon the area connection wanted and accordingly should be under the control of the translator.

How a translator is seized by the register will not be described. It will be recalled simply that the register is connected to a translator by a translator connector, represented in simplified form by a rectangle referenced CT in Fig. 6. Connection magnet CT*c* is shown within this rectangle. The energizing and holding circuits of this magnet are not shown. The wires connecting register E to translator T are grouped in a cable referenced E. This cable passes through translator connector CT, whose connection contacts are shown as a single front contact referenced CT*n*1/10. The method of seizing the translator has moreover been described in Patent No. 1,069,160, filed by the two applicants on December 18, 1952.

For reference, it is recalled that the registers of the exchange involved are divided into a certain number of groups, each group having access to the 2 translators of said exchange through translator connectors.

When a register must be connected to a translator, it is brought into calling position in the group to which it belongs. This group becomes "calling" in turn, hunts for a free translator and connects itself to it through the corresponding translator connector.

The pulling up of relay EJ*q* causes, over circuits not shown, the operation of connection magnet CT*c* of translator connector CT. The seizure of the translator is effected by grounding wire E*h*, this entailing the energization of relay TC*k* (Fig. 8): battery, upper winding of relay TC*k*, wire E*h*, cable E through receiver connector CT, wire E*h*, front EJ*q*1, ground.

The energizing circuit of relay RD*f* (Fig. 3) of the timing device is completed by the closing of front contact EJ*q*2: battery, upper winding of relay RD*f*, back RD*g*1, RB*n*1, wire R*p* through cable R, back EF*d*2, front EJ*q*2, back ED*p*1, RE*p*1, ground.

Through the closing of front contact EJ*q*3 (Fig. 2) a ground is applied to wire I*x* to fault register ED.

The pulling up of relay TC*k* busies the translator on the banks of all the translator connectors, this busying being provided by contacts not shown of said relay TC*k*.

The translator may be regarded as being busy as soon as one of the relays making up the translator equipment pulls up. For that reason, as soon as a relay of the equipment of said translator pulls up, it completes a holding circuit for relay TC*k*, this holding circuit further involving the two wnidings of said relay TC*k*. Stated otherwise, there will be as many holding contacts of relay TC*k* as there are relays whose pulling up it is desired to control, all these contacts being of course connected in parallel between the ground and wires C*k*1 or C*k*2. For readily understandable reasons of simplification, all the holding contacts associated with wire C*k*2 have been shown as a single front contact bearing the following in parentheses: (See Table 1.)

This table shows the references of all the holding contacts of relay TC*k*. These contacts will further be mentioned at the proper time in the description that follows.

The timing device, which has just been started by the closing of front contact EJ*q*2, will control the answering time of translator T.

The register contains a special relay EE*n* (Fig. 6) that pulls up in case of national calls (the energizing circuit of this relay will be described subsequently). In the example here chosen, the connection wanted is an area connection and hence relay EE*n* remains unoperated. It follows from this that make-break contact EE*n*2 directs the ground on wire E*l* to translator T. As soon as said translator is connected to the register through translator connector CT, the circuit of relay TE*k* is completed (Fig. 8): battery, relay TE*k*, wire E*l* through cable E and translator connector CT, back EE*n*2, ground.

The pulling up of relay TE*k* tells translator T that it is going to receive the number of an area call and that therefore it must perform the translation operations corresponding to said area call.

Through the closing of its front contact TE*k*1, relay TE*k* completes the holding circuit of relay TC*k*, as follows from the above-mentioned Table I. The energizing circuit of the 9 relays TE*b*/*j* is prepared by the closing of the 9 front contacts TE*k*/2/10.

As previously pointed out, the seizure of the translator in the case of area calls is effected after reception of the code, that is, the first three digits dialed by the calling subscriber.

Reference to the above-mentioned table will show that following reception of the code, 828 in the example chosen, the following registering relays are pulled up (Fig. 4):

(1) Relays EO*d*, EO*e* for the 1st digit (8);
(2) Relays EP*b*, EP*e* for the 2nd digit (2);
(3) Relays EQ*d*, EQ*e* for the 3rd digit (8).

The register must send the translator the number it has just received from the calling subscriber in the form of numerical pulses. To save time, this sending is done in coded form in a manner identical with the one described with reference to the sending to the registering relays of the digits stored by the pulse-counting relays NR. This sending is done by 3 groups of 5 wires referenced as follows (Fig. 8):

(1) Wires E*aa*/*e* for digit P;
(2) Wires E*ba*/*e* for digit Q;
(3) Wires E*ca*/*e* for digit R.

Figure 8:
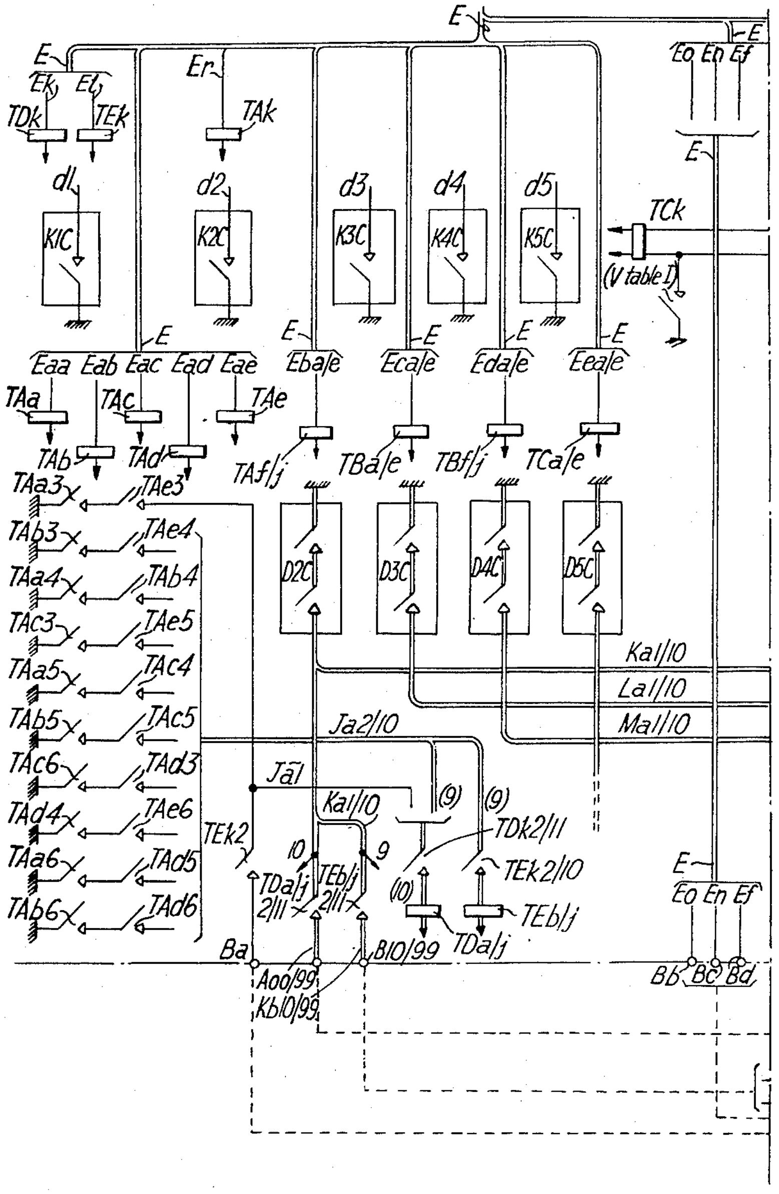
Figs. 8 and 9 are a schematic of a translator.
Figure 8A:
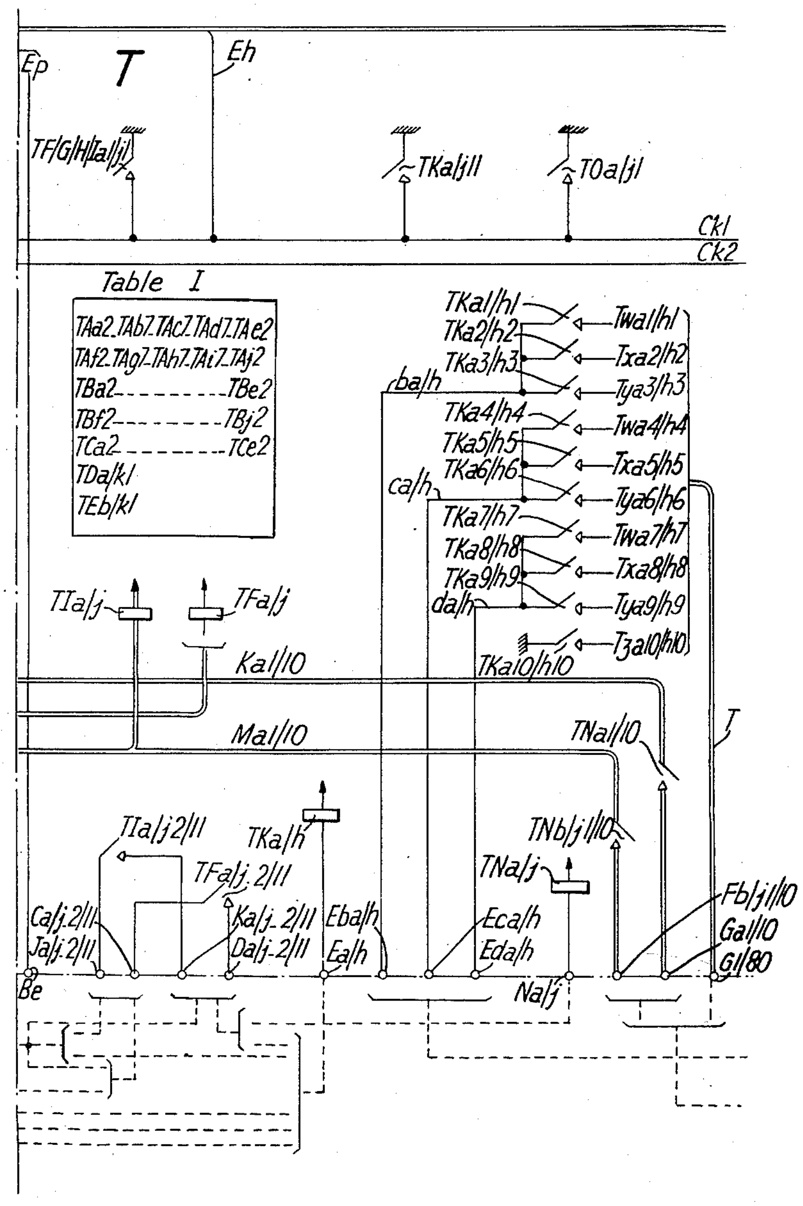
Figure 9:
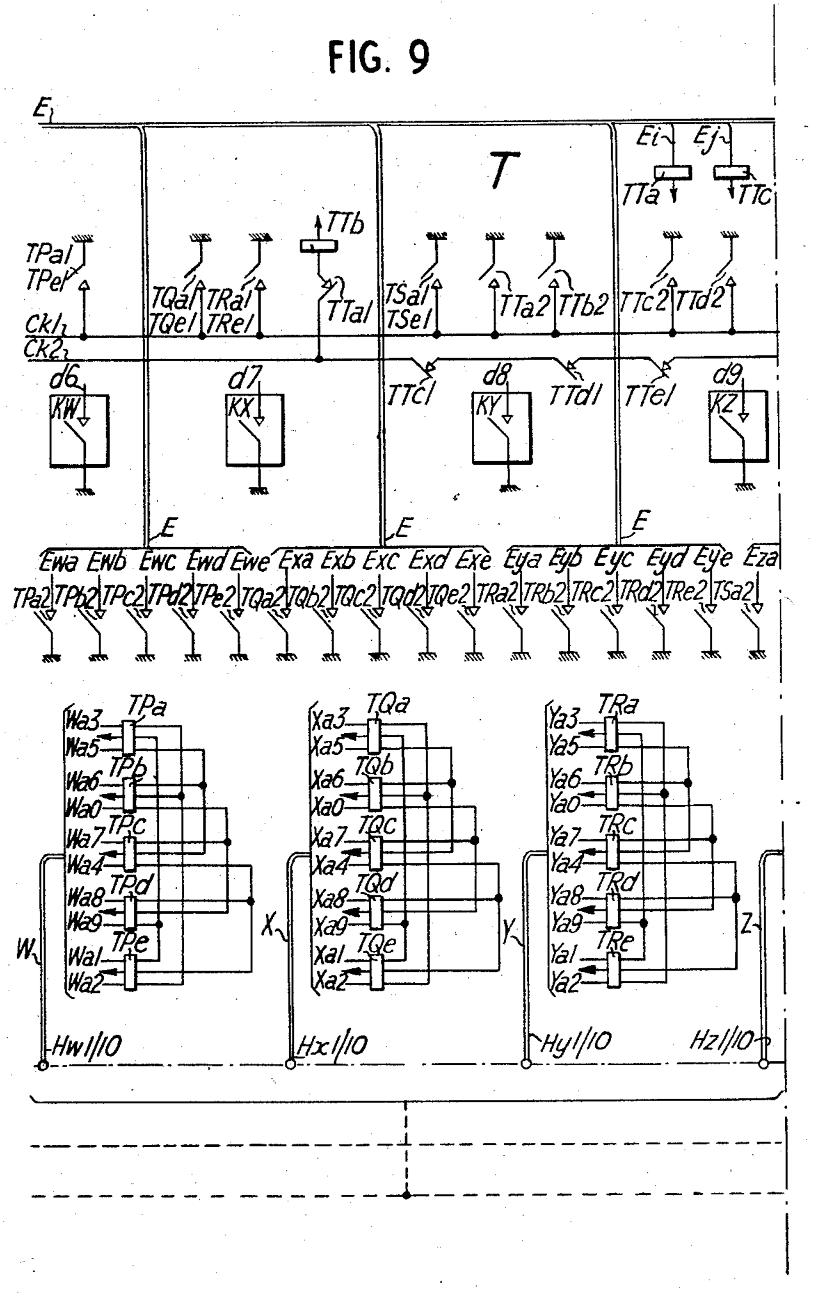
Figure 9A:
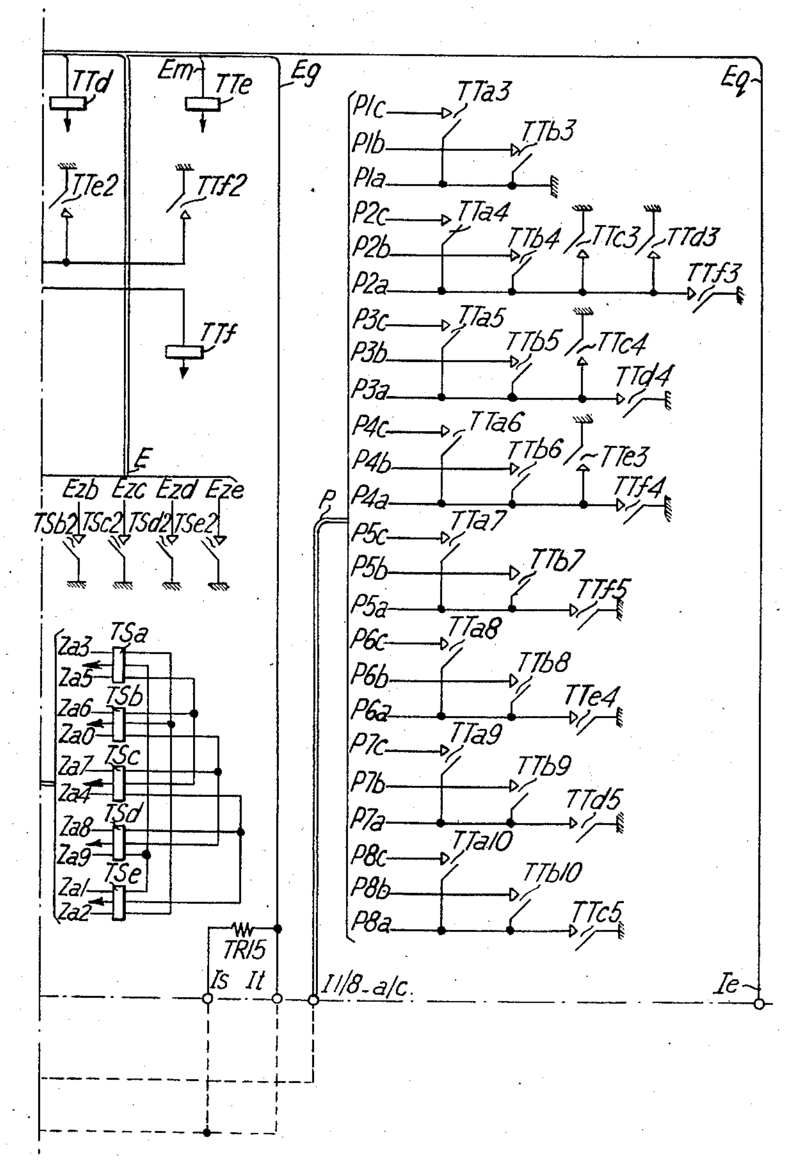

Each 5-wire group has a set of 5 decoding relays in translator T (Fig. 8). These relays are shown separately and referenced TA*a* . . . TA*e* for those concerning the first group of 5 wires E*aa* . . . E*ae*, corresponding to the sending of the number's first digit (P). For the other 5-wire groups, the corresponding decoding relays are shown as a single relay referenced for example TA*f*/*j* for the second group of 5 sending wires referenced E*ba*/*e*.

Code-sending wires E*aa*/*e* . . . E*ac*/*e* are all under the control of front contacts EO*a*2/*e*2, EP*a*2/*e*2, EO*a*2/*e*2 of registering relays EO*a*/*e*, EP*a*/*e*, EQ*a*/*e* (Fig. 6). From this it follows that when the translator is connected to the register, the decoding relays of said translator "duplicate" the registering relays of equipment E.

It will be recalled that in the example chosen the code dialed by the calling subscriber is 828. When the translator is connected to the register, the energizing circuits of the decoding relays associated with the sending wires corresponding to the registering relays that have energized following the reception of the called subscriber's number are completed as follows:

(1) Battery, relay TA*d*, wire E*ad* through cable E and translator connector CT, front EO*d*2, back EL*q*1, ground;

(2) Battery, relay TA*e*, wire E*ae* through cable E and translator connector CT, front EO*e*2, ground over a circuit already described.

Decoding relays TA*g*, TA*j*, TB*d*, TB*e* pull up in similar fashion.

Each group of 5 decoding relays has a decoding pyramid comprising 10 outgoing wires each capable of being grounded. When 2 decoding relays of one group pull up, an outgoing wire of the associated decoding pyramid is grounded. The operation of these pyramids, which are standard use in telephone switching, will not be described in detail. With the exception of the first, that is, the one corresponding to the first code-digit (P), all these pyramids are represented in simplified form by rectangles, referenced D2C, D3C, these being the decoding pyramids for the 2nd and 3rd digits of the code P—Q—R. Inside each rectangle are shown 2 front contacts in series, these 2 contacts representing schematically the 2 stages of decoding contacts comprised in each decoding pyramid. The first decoding pyramid is shown in detail in order to illustrate the principle employed for the embodiment of said pyramids.

It will be assumed throughout what follows that the codes whose first digit is the digit 1 involve special services, which will be discussed subsequently. However, the digit 1 can be used for national calls requiring 8-digit numbers. From this it follows that for area calls, as is the case in the present description, the digit P will always be comprised between 2 and 10. For that reason, out of the 10 decoding-pyramid outgoing wires referenced J*a*1/10, only 9 (J*a*2/10) are used for the translations required for area calls. These 9 outlets together with the 10 outlets belonging to decoding pyramid D2C allow obtaining 90 possible combinations with the first two digits of the codes used for area calls. In order to obtain these 90 selective combinations, the 9 wires J*a*2/10 have 9 relays referenced TE*b/j*, each equipped with 10 front contacts TE*b*2/11 . . . TE*j*2/11, this representing a total of 90 front contacts for the 90 selective combinations possible with the first two digits of the code.

Each outgoing wire of the second decoding pyramid is multipled to 9 front contacts of the 9 relays TE*b/j*. Thus, for example, the first wire (K*a*1) of the second contact-pyramid is multipled to the 9 front contacts TE*b*2 . . . TE*j*2, the second wire (K*a*2) is multipled to the 9 front contacts TE*b*3 . . . TE*j*3 and so on. These front contacts are shown as a single front contact referenced TE*b/j*2/11 at which terminates a cable referenced K*a*1/10. Thus are obtained 90 outgoing wires shown as a cable referenced K*b*10/99, each wire corresponding to a particular combination of the first two digits (P and Q) of the code. These wires terminate at 90 terminals of an allotter RT. These terminals are shown as a single terminal referenced B10/99.

Each outgoing wire L*a*2/10 of decoding pyramid D3C has one decoding relay TF*a* . . . TF*j* in Fig. 8. These relays are used when the number dialed by the calling subscriber requires the translation of more than 2 of the digits making up said code.

Before proceeding with this description, we shall resume the operation of the translator after the pulling up of decoding relays TA*d*, TA*e*, TA*g*, TA*j*, TB*d*, TB*e*. These relays complete holding circuits for translator-busying relay TC*k* by the closing of their front contacts TA*d*7, TA*e*2, TA*g*7, TA*j*2, TB*d*7, TB*e*2, as follows from Table I of the above-mentioned figure.

The closing of the above-mentioned front contacts will further complete the energizing circuit of relays TT*b* and TT*f*, which pull up:

(1) Battery, relay TT*b*, back TT*a*1, wire C*k*2, ground over a circuit already described;

(2) Battery, relay TT*f*, back TT*e*1, TT*d*1, TT*c*1, wire C*k*2 grounded.

In order to ensure proper operation of the decoding relays, control pyramids are provided, shown in the drawing as rectangles enclosing a front contact. The pyramids, referenced K1C . . . K3C, provide control for the groups of decoding relays TA*a/e* . . . TB*a/e*. Such pyramids have already been described with reference to the control of relays EW*a/e*, EX*a/e* in the course of the preceding description, which concerned a local call. Suffice it to recall that for a given group of decoding relays, the associated control pyramid verifies that 2 decoding relays of the group involved are pulled up, something that is represented in this case by the closing of the front contact shown within the rectangle representing said control pyramid. From each control pyramid issues a wire *d*1 . . . *d*3 connected by cables and contacts not shown to fault register ED (Fig. 2), which was discussed in connection with local calls.

In the present case, following normal operation of decoding relays TA*d*, TA*e*, TA*g*, TA*j*, TB*d*, TB*e*, wires *d*1, *d*2, *d*3 are grounded by control pyramids K1C, K2C, K3C. The decoding of the code 828 causes the grounding of wires J*a*8, K*a*2, L*a*8 by the corresponding decoding pyramids.

The grounding of wire J*a*8 causes the energization of relay TE*h* over the following circuit: battery, relay TE*h*, front TE*k*8, wire J*a*8, front TA*e*6, TA*d*4, ground.

The grounding of wire L*a*8 entails the energization of relay TF*h*: battery, relay TF*h*, wire L*a*8, third-digit decoding pyramid D3C, ground.

The pulling up of relay TE*h* causes the grounding of wire K*b*82, corresponding to the combination of the first two digits (P and Q) of the code dialed, that is, the digits 8 and 2 in the example chosen: terminal B82, wire K*b*82, front TE*h*3, second-digit decoding pyramid D2C, ground.

It is well to point out further that relay TE*h* completes a holding circuit for TC*k* in accordance with a known method (see Table I of Fig. 8).

In the present case the translator has just received from the register the first three digits (P—Q—R) making up the code of the called subscriber's number. This reception is characterized in the final analysis by the grounding of terminal B82, corresponding to the following specific values of the digits P and Q: $P=8$, $Q=2$.

It has been pointed out that the reception of the digit R caused the pulling up of relay TF*h*. In the example here chosen, the pulling up of this relay is inoperative, as will be seen from the explanations that follow.

It is known that in automatic telephony the routing of a call from the originating exchange to the terminating exchange or to a tandem exchange requires the translation of a certain number of digits making up the called subscriber's number. Depending upon the case, the translation necessary will involve 2, 3 or even more digits. However, in most cases, the translation of 2 or 3 digits is standard practice. For that reason, in the case of area calls, the register waits until it has received the first three digits of the called subscriber's number and, once it has received them, seizes a translator and sends it the three digits it has just received. According to the foregoing, the sending to the translator of the number's first three digits is therefore superfluous where the connection requires the translation of but two digits.

The translation of any selective combination (2 digits or 3 digits) should allow the translator to send the register 3 signals:

(1) A signal allowing the group selection to be made;

(2) A signal determining the number of digits of the called subscriber's number that must be sent to the terminating or to the tandem office;

(3) A toll signal that will subsequently allow control of the calling subscriber's meter.

In order to save time, the sending of said signals from the translator to the register is done in coded form. The code used is identical with the one already mentioned in the course of the present description.

As already indicated, the signals required for the group selection comprise 2 elements, one for the energization of 2 of the 5 relays EW*a/e* and the other for the energization of 2 of the 5 relays EX*a/e*, the signals being sent to the two above-mentioned groups of relays by two 5-wire groups referenced E*wa/e*, E*xa/e*.

Similarly, the signals required for determination of the number of digits to be resent, and for determination of the tolls, are received at the register by 2 groups of 5 relays referenced EY*a/e*, EZ*a/e*, whose operation will be explained subsequently. The control of these relays is effected from the translator by two 5-wire groups referenced E*ya/e* and E*za/e*.

For a given route, the translator must therefore send two polarities over each 5-wire group controlling relays EW*a/e*, EX*a/e*, EY*a/e*, EZ*a/e*. This result is obtained by providing as many route relays as there are different outgoing groups in the exchange involved. When one of these relays is energized, it provides control for a certain number of auxiliary relays that, through their front contacts, cause the sending of the necessary polarities over the above-mentioned sending wires.

These route relays are referenced TK*a*/*h* in Fig. 8 and have their energizing windings connected to 8 input terminals referenced E*a*/*h*. The number of these relays is further in no way limitative and may be increased if necessary.

In the final analysis, the translation of a code corresponding to a given area call is therefore characterized by the pulling up of a particular route relay corresponding to said wanted direction.

It follows from this that in the case of a call requiring the translation of 2 digits, it is therefore sufficient to connect the energizing windings of certain route relays to certain combination terminals B10/99 corresponding to the 90 combination wires K*b*10/99.

In the example chosen, the code 828 corresponds precisely to an area call requiring the translation of only the first two digits, 8 and 2. It will be recalled that the selective combination for these first two digits is characterized by the grounding of terminal B82. The route relay provided to determine the selective combinations required for the routing of such a call is relay TK*e*. For this purpose, allotter RT comprises a jumper directly connecting output terminal B82 to input terminal E*e*. This jumper is shown as a dotted line in said allotter RT: battery, relay TK*e*, terminal E*e*, jumper in allotter RT, terminal B82, wire K*b*82, front TE*h*3, wire K*a*2, second-digit decoding pyramid D2C, ground.

Thus, as soon as output terminal B82 is grounded, route relay TK*e* pulls up and sends the register the signals required for the routing of the wanted area call. Through the closing of its front contact TK*e*11, this route relay completes a holding circuit for translator-busying relay TC*k*: battery, upper winding of relay TC*k*, front TK*e*11, ground.

In order to control the sending to the register of the signals required for the routing of the call, each route relay comprises, in addition to the holding contact of relay TC*k*, 10 front contacts referenced TK*a*1/*h*1, TK*a*2/*h*2 . . . TK*a*10/*h*10. The first nine contacts are assembled into three 3-contact groups. Three wires referenced T*wa*1/*h*1, T*xa*2/*h*2, T*ya*3/*h*3 . . . T*wa*7/*h*7, T*xa*8/*h*8, T*ya*9/*h*9 issue from each 3-contact group thus formed. Also, there are 8 wires referenced T*za*10/*h*10 for the 8 front contacts TK*a*10/*h*10. Thus are obtained 80 wires terminating at 80 output terminals of incoming allotter RT. These terminals are referenced G1/80 and are associated with the 80 outgoing wires T*wa*1 . . . T*zh*10 in the following order:

Wire T*wa*1—terminal G1
Wire T*xa*2—terminal G2

Wire T*wb*1—terminal G11
Wire T*xb*2—terminal G12

Wire T*yh*9—terminal G79
Wire T*zh*10—terminal G80

The wires whose reference number begins with the letters T*w* are intended to control the auxiliary relays controlling register relays EW*a*/*e*. Likewise, the outgoing wires whose reference number begins with the letters T*x*, T*y*, T*z* control the auxiliary relays controlling the groups of relays EX*a*/*e*, EY*a*/*e*, EZ*a*/*e* of register E (Fig. 4).

The auxiliary relays controlling relays EW*a*/*e*, EX*a*/*e*, EY*a*/*e*, EZ*a*/*e* are referenced TP*a* . . . TP*e*, TQ*a* . . . TQ*e*, TR*a* . . . TR*e*, TS*a* . . . TS*e*. They are divided into four 5-relay groups, each group controlling relays EW*a*/*e*, EX*a*/*e*, EY*a*/*e*, EZ*a*/*e*. Each auxiliary-relay group is controlled by 10 incoming wires referenced as follows:

(1) Wires W*a*1 . . . W*a*10 associated with relays TP*a* . . . TP*e*;

(2) Wires X*a*1 . . . X*a*10 associated with relays TQ*a* . . . TQ*e*;

(3) Wires Y*a*1 . . . Y*a*10 associated with relays TR*a* . . . TR*e*;

(4) Wires Z*a*1 . . . Z*a*10 associated with relays TS*a* . . . TS*e*.

Each control wire of a given auxiliary-relay group is connected to an input terminal of allotter RT and to battery through the windings in series of 2 auxiliary relays. The input terminals are referenced H*w*1/10 for the first group of auxiliary relays TP*a* . . . TP*e*, H*x*1/10 for the second and so on. From this it follows that the grounding of any one of input terminals H*w*1/10, H*x*1/10, H*y*1/10, H*z*1/10 causes the pulling up of 2 auxiliary relays corresponding to that terminal.

Each auxiliary relay has 2 front contacts, the one completing the holding circuit for relay TC*k*, the other grounding one of the control wires of one of the relays EW*a*/*e* . . . EZ*a*/*e* of register E (Fig. 4). In addition, control pyramids KW, KX, KY, KZ have been provided, which are similar to others previously described and which allow checking the proper operation of the above auxiliary relays. Whenever 2 relays are pulled up in each auxiliary-relay group, the corresponding control pyramid provides the grounding of the corresponding control wire connected by circuits not shown to fault register ED (Fig. 2). These control wires are referenced *d*6 . . . *d*9 in Fig. 9.

It follows from these explanations that in order to send to the register the signals required for the routing of any area call it suffices to jumper 4 output terminals associated with a given route relay, that is, with the one pulling up following the translation of a predetermined code, to 4 input terminals each controlling 2 auxiliary relays.

It is well to recall that each route relay has its front contacts divided into three 3-contact groups and one 1-contact group. Each 3-contact group can control 6 auxiliary relays (3 times 2 auxiliary relays chosen from the groups of relays TP*a*/*e*, TQ*a*/*e*, TR*a*/*e*). On the other hand, the single front contact belonging to the fourth group can control only 2 auxiliary relays chosen from the group of relays TS*a*/*e*. The auxiliary relays belonging to groups TP*a*/*e*, TQ*a*/*e*, TR*a*/*e* control relays EW*a*/*e*, EX*a*/*e*, EY*a*/*e*. These relays supply the register the necessary elements that enable it to control the routing of the call, that is, the control of the group selection and indication of the number of digits to be sent to the distant exchange. Now, one route relay can control 3×6 auxiliary relays or 3×2 auxiliary relays per category. Since 6 auxiliary relays supply the register the elements required for the routing of the call, it follows that a given route relay can control a number of routes through the set of discrimination contacts. These routes are arranged however to provide the termination of one and the same call, except where transfer must be made to an operator. In certain cases it is indeed necessary to provide a number of routes for the routing of a given call. Such is the case, for example, when reroutings are provided for a connection between two exchanges.

On the other hand, it will be noted that a route relay can control only one toll, since it has only one front contact capable of controlling 2 auxiliary relays out of the five making up relay groups TS*a*/*e*. This is due to the fact that in the event of rerouting the toll chargeable to the calling subscriber must be the same as the one that would have been charged to him had he obtained the wanted connection over a direct route.

The first nine front contacts of route relays TK*a*/*h* are supplied three by three by the wires referenced *ba*/*h*, *ca*/*h*, *da*/*h*, terminating at input terminals of allotter RT referenced E*ba*/*h*, E*ca*/*h*, E*da*/*h*.

It is quite obvious that the three 3-contact groups previously mentioned cannot be supplied simultaneously when a route relay pulls up, since each 3-contact group, when supplied, furnishes the register the elements required for the routing of the wanted call over a special path. To meet this requirement a certain number of so-called category relays have been provided, referenced TT*a* . . . TT*f*, whose front contacts are so arranged that they make up 8 so-called discrimination pyramids, each having one input wire, capable of being grounded, and 3 outgoing wires, referenced P1*a*, P1*b*, P1*c* . . . P8*a*, P8*b*, P8*c*. These wires terminate at output terminals of incoming allotter RT referenced I1/8/*a*/*c*. Wires P1*a* . . . P8*c* are connected to the output terminals as follows:

Wire P1*a* is connected to terminal I1*a*
Wire P1*b* is connected to terminal I1*b*
Wire P8*c* is connected to terminal I8*c*

Thus a certain number of discrimination pyramids can be obtained thanks to these contact pyramids. Output terminals I1/8/*a*/*c* are used to supply the 3-contact groups of the above-mentioned route relays. Stated otherwise, when a subscriber of a given category asks for the establishment of a certain connection it suffices, in order to cause the energization of the six auxiliary relays charged with sending to the register the signals required for the establishment of said connection, to jumper one of output terminals 11/8*a*/*c* to one of the input terminals E*ba*/*h* or E*ca*/*h* or E*da*/*h* corresponding to a certain group of three front contacts of the route relay that has just pulled up.

To make these explanations specific, the discussion will be resumed of the translation of the code corresponding to the area call chosen as an example at the beginning of this description. It will be recalled that the code 828 has caused the pulling up of route relay TK*e* and further that this pulling up has required the translation of only the first 2 digits, that is, of digits 8 and 2. It is known that the signals sent by the translator to the register are characterized by the pulling up of certain ones of relays EW*a*/*e*, EX*a*/*e*, EY*a*/*e*, EZ*a*/*e*. To be specific, 2 relays pull up in each of said four 5-relay groups. To simplify the description that follows, the 10 combinations it is possible to obtain by causing the simultaneous pulling up of 2 out of the 5 relays making up a given group are numbered 1 to 0. In addition, the 5-relay group involved will be denoted by having each digit comprised between 1 and 0 preceded by the letter characterizing the group involved. These letters are 4 in number, W, X, Y, Z, and they denote relay groups E*wa*/*e* . . . EZ*a*/*e*. The code used is the same already mentioned in connection with the registering relays. The following table gives the designation of the relays that pull up for a given combination index.

| | W | | X | | Y | | Z | |
|---|---|---|---|---|---|---|---|---|
| 1 | EW*a* | EW*e* | EX*a* | EX*e* | EY*a* | EY*e* | EZ*a* | EZ*e* |
| 2 | EW*b* | EW*e* | EX*b* | EX*e* | EY*b* | EY*e* | EZ*b* | EZ*e* |
| 3 | EW*a* | EW*b* | EX*a* | EX*b* | EY*a* | EY*b* | EZ*a* | EZ*b* |
| 4 | EW*c* | EW*e* | EX*c* | EX*e* | EY*c* | EY*e* | EZ*c* | EZ*e* |
| 5 | EW*a* | EW*c* | EX*a* | EX*c* | EY*a* | EY*c* | EZ*a* | EZ*c* |
| 6 | EW*b* | EW*c* | EX*b* | EX*c* | EY*b* | EY*c* | EZ*b* | EZ*c* |
| 7 | EW*c* | EW*d* | EX*c* | EX*d* | EY*c* | EY*d* | EZ*c* | EZ*d* |
| 8 | EW*d* | EW*e* | EX*d* | EX*e* | EY*d* | EY*e* | EZ*d* | EZ*e* |
| 9 | EW*a* | EW*d* | EX*a* | EX*d* | EY*a* | EY*d* | EZ*a* | EZ*d* |
| 0 | EW*b* | EW*d* | EX*b* | EX*d* | EY*b* | EY*d* | EZ*b* | EZ*d* |

Thus, in what follows, the use of the designation W5, for example, means that the translator has sent the register signals that cause in said register the pulling up of relays EW*a*, EW*c*.

To route a call whose number is 828—25—70, it will be assumed that the translator sends the register the following code signals: W3, X1, Y8, Z3.

To do so, the terminals of allotter RT shown below are connected two by two as follows:

(1) Terminal G51 is connected to terminal H*w*3;
(2) Terminal G52 is connected to terminal H*x*1;
(3) Terminal G53 is connected to terminal H*y*8;
(4) Terminal G60 is connected to terminal H*z*3;
(5) Terminal I2*a* is connected to terminal E*be*.

It will be recalled that the fact that the calling subscriber is a regular subscriber is characterized in the translator by the pulling up of relays T*b* and T*f*; from this it follows that the energizing circuits of relays TP*a*, TP*b*, TQ*a*, TQ*e*, TR*d*, TR*e*, TS*a*, TS*b* are completed upon the pulling up of route relay TK*e*:

(1) Battery, middle winding of relay TP*b*, upper winding of relay TP*a*, wire W*a*3 through cable W, jumper interconnecting terminals H*w*3 and G51, wire T*we*1 through cable T, front TK*e*1, wire *be*, jumper interconnecting terminals E*be* and I2*a*, wire P2*a* through cable P, front TT*f*3 of category relay RR*f*, ground;

(2) Battery, middle winding of relay TQ*a*, upper winding of relay TQ*e*, wire X*a*1 through cable X, jumper interconnecting terminals H*x*1 and G52, wire T*xe*2 through cable T, front TK*e*2, ground over a circuit previously described;

(3) Battery, middle winding of relay TR*e*, upper winding of relay TR*d*, wire Y*a*8 through cable Y, jumper interconnecting terminals H*y*8 and G53, wire T*ye*3 through cable T, front TK*e*3, ground over a circuit previously described;

(4) Battery, middle winding of relay TS*b*, upper winding of relay TS*a*, wire Z*a*3 through cable Z, jumper interconnecting terminals H*z*3 and G60, wire T*z*10 through cable T, front TK*e*10, ground.

The pulling up of the above-mentioned auxiliary relays causes the sending to the register of selective combinations allowing it to control the routing of the wanted connection. Through the closing of their front contacts TP*a*1, TP*b*1, TQ*a*1, TQ*e*1, TR*d*1, TR*e*1, TS*a*1, TS*b*1, said relays complete a holding circuit for relay TC*k*: battery, upper winding of relay TC*k*, wire C*k*1, above-mentioned front contacts in parallel, ground.

Through the closing of their front contacts TP*a*2, TP*b*2, TQ*a*2, TQ*e*2, TR*d*2, TR*e*2, TS*a*2, TS*b*2, auxiliary relays TP*a*, TP*b*, TQ*a*, TQ*e*, TR*d*, TR*e*, TS*a*, TS*b* complete energizing circuits for relays EW*a*, EW*b*, EX*a*, EX*e*, EY*d*, EY*e*, EZ*a*, EZ*b*:

(1) Battery, relay EW*a*, wire E*wa* through cable E and translator connector CT, front TP*a*2, ground;
(2) Battery, relay EW*b*, wire E*wb* through cable E and translator connector CT, front TP*b*2, ground;
(3) Battery, relay EX*a*, wire E*xa* through cable E and translator connector CT, front TQ*a*2, ground;
(4) Battery, relay EX*e*, wire E*xe* through cable E and translator connector CT, front TQ*e*2, ground;
(5) Battery, relay EY*d*, wire E*yd* through cable E and translator connector CT, front TR*d*2, ground;
(6) Battery, relay EY*e*, wire E*ye* through cable E and translator connector CT, front TR*e*2, ground;
(7) Battery, relay EZ*a*, wire E*za* through cable E and translator connector CT, front TS*a*2, ground;
(8) Battery, relay EZ*b*, wire E*zb* through cable E and translator connector CT, front TS*b*2, ground.

The operation of relays EW*a*, EW*b*, EX*a* and EX*e* has already been discussed.

Through the closing of their front contacts EY*d*1, EY*e*1, EZ*a*1, EZ*b*1, relays EY*d*, EY*e*, EZ*a*, EZ*b* complete holding circuits for themselves over a common circuit already described.

It will be noted in Fig. 4 that two control pyramids, similar to those already described in connection with the control of relays EW*a*/*e* and EX*a*/*e*, have been provided to ensure the proper operation of relays EY*a*/*e*, EZ*a*/*e*. All these pyramids are connected in series; stated otherwise, when the register receives from the translator the information required for the routing of an area call, relay ED*p* can pull up only after said pyramids have checked the proper operation of the above-mentioned code-receiving relays.

The other contacts of relays EY*d* and EY*e*, that is, the contacts other than those providing the holding of these relays and those controlling the control pyramid (EY*d*2, EY*d*3, EY*e*2), are inoperative at this time.

Over their front contacts EZ*a*2, EZ*b*2, relays EZ*a* and EZ*b* prepare the circuit used for sending the toll chargeable to the calling subscriber. The other contacts of these relays control the corresponding control pyramid.

If the control of relays EW*a*, EW*b*, EX*a*, EX*e*, EY*d*, EY*e*, EZ*a*, EZ*b* is favorable, relay ED*p* pulls up and causes the starting of the group-selecting operations in accordance with a method identical with the one described in connection with the discussion of the routing of a local call. It will be noted however that back contact ED*p*4 is now used to break the energizing circuit of translator-seizure relay EJ*q*.

The release of the translator is effected under the control of relay TC*k*, which remains pulled up so long as one of the relays of said translator remains pulled up. The release is effected as from translator connector CT, which breaks the connection between the register and the translator, this entailing the release of relay TE*k* and the release of the decoding relays. The release of said decoding relays entails the release of the route relay and of the code-sending auxiliary relays. Finally, relays TC*k*, TT*b*, TT*f* release in turn; the translator is released and can be connected again to some other register.

In spite of the release of the translator, the code-receiving relays EW*a/e*, EX*a/e*, EY*a/e*, EZ*a/e* that pulled up hold over circuits already described.

Relay ED*m* pulls up at the end of the group-selecting operations. Owing to the non-energization of relay EF*f* (area call), the closing of back contact ED*m*2 completes the energizing circuit of relay RE*p*, which pulls up: battery, relay RE*p*, wire R*i* through cable R, back EF*f*1, EF*k*1, front EF*e*1, ED*p*2, back ED*m*2, EF*c*4, ground on general holding wire *tg*.

Through the opening of its back contact RE*p*1, relay RE*p* restores the timing device to normal. Through the closing of its front contact RE*p*2 (Fig. 7), relay EC*l* is short-circuited. Front contact RE*p*3 applies battery to wire A*b*2 to cause the seizure of an outgoing connector at the exchange involved; wire A*b*2, front CE*c*7, wire B*b*2 through cable B, back RE*q*7, front RE*p*3, resistance RR4, battery.

Pulsing motor RM is started by the closing of front contact RE*p*4. Relay RE*p* complete a holding circuit for itself through the closing of its front contact RE*p*5: battery, relay RE*p*, front RE*p*5, wire R*g* through cable R, back EF*c*4, ground on general holding wire *tg*.

The energizing circuit of relays ED*m* and EF*a* is prepared by the closing of front contact RE*p*6. Finally, a ground is applied to wire I*q* to fault register ED by the closing of front contact RE*p*7.

As can be noted, the register prepares the sending of outgoing dialing pulses even before having received all the digits making up the called subscriber's number. This arrangement allows saving time in the establishment of an area connection. Since the sending of information from the register at the originating exchange to the register at the terminating exchange is done in the form of numerical pulses, it follows that considerable time is saved by starting to send the pulses to the distant exchange before having received the called subscriber's full number.

When the distant equipment is ready to receive the dialing pulses sent from the register of the originating exchange, it so tells the register of said originating exchange by sending battery over wire A*a*2, the effect of this being to cause the pulling up of relay ED*m*: ground, front RE*p*2, right-hand winding of relay ED*m*, rectifier EQ3, wire R*e* through cable R, front RE*p*6, wire F*a*2, back RE*q*6, RD*o*1, wire B*a*2 through cable B, front CE*c*8, wire A*a*2 connected to battery.

The pulling up of relay ED*m* causes the starting of the pulse sender. The closing of front contact ED*m*3 completes the energizing circuit of relay RE*q*, which pulls up: battery, relay RE*q*, front ED*m*3, RE*p*5, wire R*g* through cable R, back EF*c*4, ground on general holding wire *tg*.

The pulse sender is controlled by relay R*eq*.

The pulling up of relay RE*q* prepares, through the switching into operating position of make-break contact RE*q*1, the energizing circuit of relay RB*g* and the opening of the energizing circuit of relay RD*ab*. Slow-releasing relay RD*ab* remains operated for a moment. The closing of front contact RE*q*2 completes the energizing circuit of relay EK*c*, which pulls up: battery, relay EK*c*, back E*lk*2, E*lh*2, E*le*2, E*lb*2, E*kp*2, E*km*2, E*kj*2, E*kg*2, E*kd*1, wire R*k* through cable R, front RE*q*2, back RD*d*2, ground on wire D*b* over a circuit already described.

The closing of front contact RE*q*3 causes the starting of the timing device, which operates identically as already described. The energizing circuit of pulse-repeating relay RB*f* is prepared by the closing of contact RE*q*4. Relay RE*q* completes a holding circuit for itself through the closing of its front contact RE*q*5: battery, relay RE*q*, front RE*q*5, then ground over a circuit already described.

Wires A*a*2 and A*b*2 are looped to beating contact RB*f*3 by the switching into operating position of make-break contacts RE*q*6 and RE*q*7, while relay ED*m* releases, its energizing circuit having just been broken by the opening of back contact RE*q*6.

The release of relay ED*m* has no effect at this time.

Relay EK*c* completes a holding circuit for itself through the closing of its front contact EK*c*1: battery, relay EK*c*, wire R*o* through cable R, front RK*c*1, back RD*d*1, ground over a circuit already described.

Relay RD*ab* releases after a moment. Through the switching into normal position of its make-break contact RD*b*1, it removes the short-circuit from relay RB*g* and completes its energizing circuit: battery, resistance RR3, relay RB*g*, back RB*g*4, RB*f*2, RB*n*5, RD*e*1, RD*b*1, front RE*q*1, wire D*b* across Figs. 3 and 4, front RA*c*1, ground.

The closing of back contact RD*b*2 prepares the energizing circuit of repeating relay RB*f*.

Relay RB*g* completes a holding circuit for itself through the closing of its front contact RB*g*1: battery, resistance RR3, relay RB*g*, front RB*g*1, RE*q*1, ground over a circuit already described.

The closing of front contact RB*g*2 prepares the circuit used for sending pulses to pulse counter NV. The energizing circuit of relay RB*n* is prepared by the closing of front contact RB*g*3. The opening of back contact RB*g*5 removes the short-circuit from beating relay RB*f*3.

Pulsing motor RM drives a cam RK3 that periodically opens and closes the circuit it controls.

To fix ideas it will be assumed that cam RK3 is in opening position when motor RM starts. At the end of a certain period of time, this cam closes the circuit of pulse-repeating relay RB*f*, which pulls up: battery, relay RB*f*, back RB*n*6, RD*b*2, front RE*q*4, cam RK3 in closing position, ground.

Through the closing of front contact RB*f*2 a pulse is sent to pulse counter NV over wire N*vc*: pulse counter NV, wire N*vc*, front RB*g*2, RB*f*2, back RB*n*5, RD*e*1, RD*b*1, ground over a circuit already described.

The opening of back contact RB*f*3 removes the looping of wires A*a*2 and A*b*2, thus marking the beginning of the first dialing pulse.

It was assumed before, for simplification, that pulsing cam RK3 was in opening position when pulsing motor RM started. It is quite obvious that cam RK3 can be in any position when motor RM starts and particularly that it can be in closing position. In this case, relay RB*g* cannot pull up, its energizing circuit being short-circuited by the switching into operating position of its make-break contact RB*f*2. When, owing to its rotation, cam RK3 opens the energizing circuit of relay RB*f*, the energizing circuit of relay RB*g* is completed by the switching into normal position of make-break contact RB*f*2. Things are thus back to the preceding case. This arrangement thus prevents the energization of relay RB*g* when cam RK3 is in closing position at the time of the release of relay RD*ab*.

As has been pointed out before, the register must, depending upon the case, send the terminating exchange either part or all of the digits making up the called subscriber's number. This signal is furnished it by the translator and it is characterized by the pulling up of two of relays EY*a*/*e*. A table included hereinbefore lists the relays that pull up for each value of Y. The various values that Y can take correspond to the various quantities of the telephone number's digits that must be sent by the register to the distant exchange. Throughout what follows it will be taken that the quantity of digits in a given telephone number that must be sent by the register is equal to the value of the figure accompanying the letter Y in the above-mentioned table less one unit. Thus, in the example chosen, the value of Y8 means that the register must send the distant exchange 7 digits of the called subscriber's number; since the number for an area call comprises 7 digits, it follows that in this case the distant exchange is sent the full number dialed by the calling subscriber.

Figure 5:
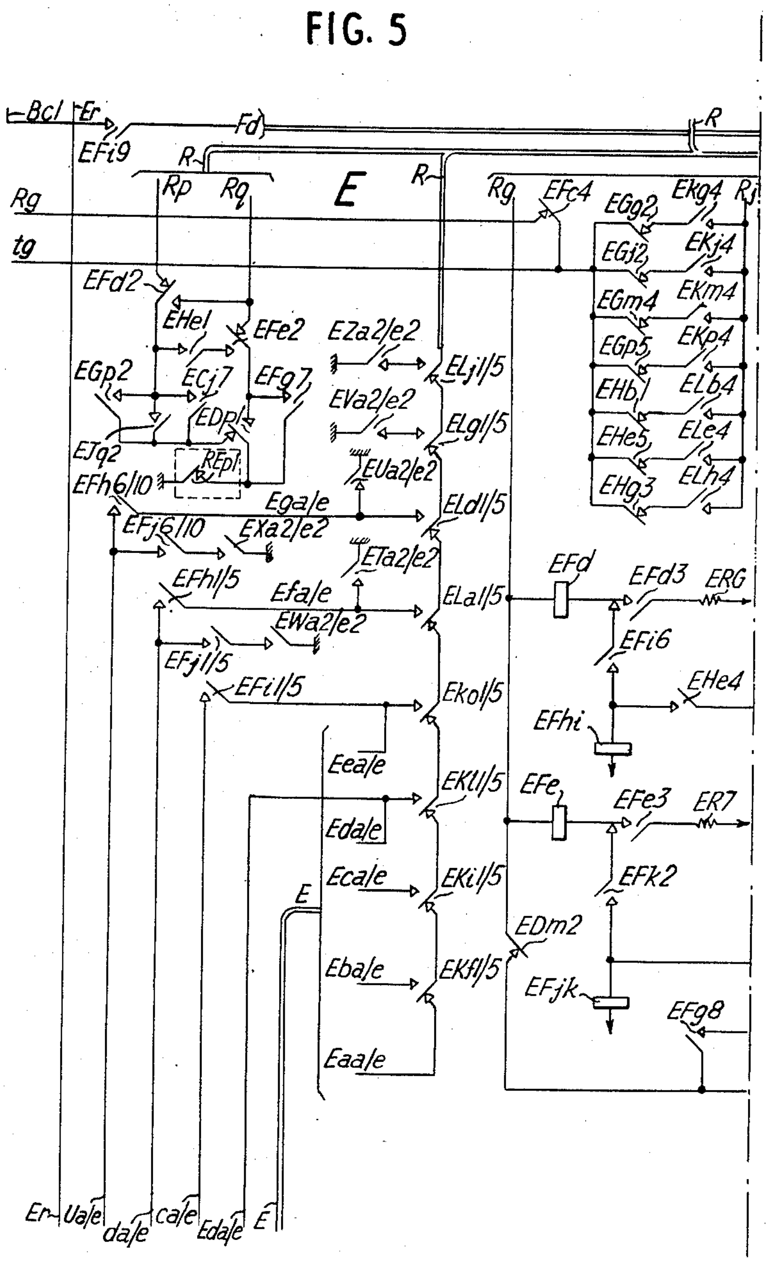
Figure 5A:
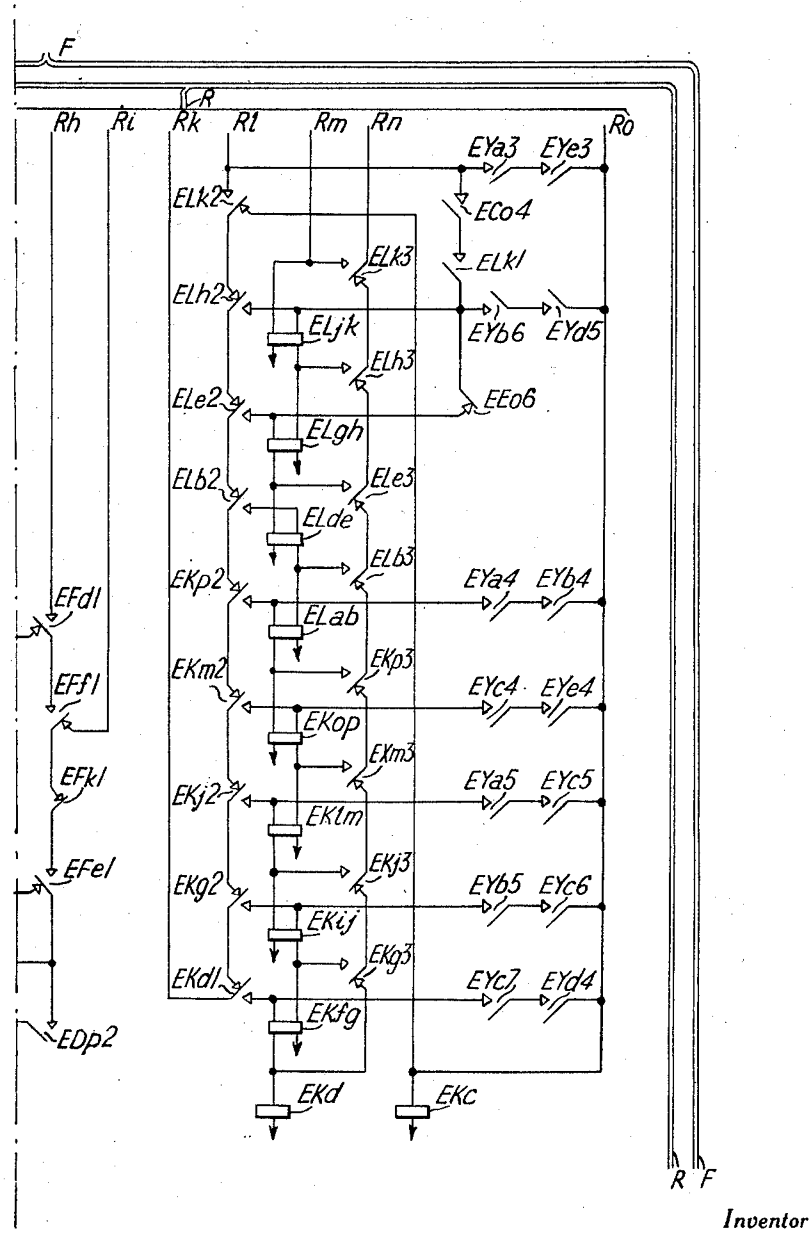

The arrangement for sending the pulses to the distant exchange is as follows. There are five scanning relays RB*a* . . . RB*e* (Fig. 3) capable of "duplicating" registering relays EO*z*/*e*, EP*a*/*e* . . . EU*a*/*e*. To do so, the registering relays can provide the control for said scanning relays over their front contacts EO*a*2/*e*2 . . . EU*a*2/*e*2 (Figs. 4, 5 and 6). These contacts through their operation ground wires E*aa*/*e*, E*ba*/*e* . . . E*ga*/*e*. The grounding of wires E*aa*/*e*, E*ba*/*e*, E*ca*/*e* is done over the following circuits (Fig. 6):

(1) Wires E*aa*/*e* through cable E, front EO*a*2/*e*2, back E*lq*1, ground;

(2) Wires E*ba*/*e* through cable E, front EP*a*2/*e*2, back E*lq*1, ground;

(3) Wires E*ca*/*e* through cable E, front EQ*a*2/*e*2, back E*lq*1, ground.

The grounding of wires E*da*/*e*, E*ea*/*e*, E*fa*/*e* has already been described before with reference to local calls.

The grounding of wires E*ga*/*e* is obvious in Fig. 5.

A control wire R*a* . . . R*e* is associated with each scanning relay RB*a* . . . RB*e*. The five control wires R*a* . . . R*e* of the five scanning relays RB*a* . . . RB*e* can be connected in succession to the corresponding wires of wire groups E*aa*/*e* . . . E*ga*/*e* through a chain of directing contacts EK*f*1/5, EK*i*1/5, EK*l*1/5, EK*o*1/5, EL*a*1/5, EL*d*1/5.

The pulses sent out by cam RK3 are counted by a counter NV similar to the one referenced NR and previously discussed. This counter comprises 6 counting relays referenced RB*h* . . . RB*m*, whose energizing windings, located within rectangle NR, are not shown. Certain of these counting relays pull up, depending upon the number of pulses sent out by cam RK3 following the pulling up of relay RB*g*. The following table gives the designation of the relays that pull up after counter NV has received a given number of pulses.

| | RB*h* | RB*i* | RB*j* | RB*k* | RB*l* | RB*m* |
|---|---|---|---|---|---|---|
| 1 | T | T | T | R | R | R |
| 2 | R | R | T | T | R | R |
| 3 | T | T | R | T | R | R |
| 4 | R | R | R | R | T | R |
| 5 | T | T | T | R | T | R |
| 6 | R | R | T | T | T | R |
| 7 | T | T | R | T | T | T |
| 8 | R | R | R | R | R | T |
| 9 | T | T | T | R | R | T |
| 10 | R | R | T | T | R | T |

In this table, the letters T denote the relays operated and the letters R the relays unoperated.

In order to control the sending of the numerical pulses corresponding to any digit of the number, a pyramid has been provided consisting of a certain number of contacts belonging to scanning relays RB*a* . . . RB*e* and to counting relays RB*h* . . . RB*m*. When unoperated, the pyramid is designed not to provide any metallic continuity in the energizing circuit of relay RB*n*. In proceeding to send the numerical pulses corresponding to a predetermined digit of the number, the control wires of the scanning relays are connected through the aforementioned directing contacts to the corresponding front contacts of the registering relays for the digit involved. From this it follows that 2 scanning relays pull up and through the closing of their front contacts in the aforementioned contact pyramid prepare the energizing circuit of relay RB*n*. When the last pulse of the pulse train corresponding to the number's digit involved has been sent to the distant exchange, the counting relays that then pull up complete through the closing of their front contacts in the contact pyramid the energizing circuit of relay RB*n*, which pulls up and causes the stopping of the pulse sender.

Directing contacts EK*f*1/5, EK*i*1/5, EK*l*1/5, EK*q*1/5, EL*a*1/5, EL*d*1/5 belong to relays arranged in a chain, as examination of the right-hand portion of the figure will show.

That relay chain operates in a classical manner, that is, it advances one step following the sending of a pulse train, the direction of advance being such that the relays making it up pull up in the order EK*fg* . . . EL*de*. Since the number of digits to be sent depends essentially on the destination of the wanted connection, it follows that the operation of the chain of directing relays does not necessarily commence with the energization of relay EK*fg* after the sending of the first pulse train corresponding to the digit P (case where $Y=8$, 7 digits to be sent). In order to ensure the sending of a predetermined number of digits, the directing relay is energized before any digit sending, this connecting the scanning relays to the registering relays corresponding to the first digit to be sent. The control of the directing relays is provided by relays EY*a*/*e*, a certain number of auxiliary contacts of which have been provided. Depending upon the Y value sent by the translator to the register, such or such directing relay pulls up upon the energization of the two relays EY corresponding to the Y value, this entailing the starting of the chain of directing relays as from the directing relay that has just pulled up.

Along the same order of ideas, provision has been made for the sending of toll pulses. To do so, the scanning relays can "duplicate" relays EZ*a*/*e*. To that end a directing relay EL*jk* has been provided that through the action of its directing contact EL*j*1/5 can connect the control wires R*a* . . . R*e* of scanning relays RB*a* . . . RB*e* to front contacts EZ*a*2 . . . EZ*e*2 of toll relays Ez*a* . . . Ez*e*.

To make these explanations specific, the discussion will be resumed of the sending of the digits making up the called subscriber's number.

Since the register has received from the translator the signal Y8, all the digits making up the number, that is, 7 digits, must be sent to the distant exchange. To meet this requirement, relays EY*d*, EY*e*, which have just pulled up, do not cause the energization of any of the directing relays. From this it follows that scanning relays RB*a* . . . RB*e* are placed under the control of the relays EO*a*/*e* registering the first digit of the called subscriber's number, that is, digit P. It will be recalled that in the example chosen $P=8$, this corresponding to the energization of registering relays EO*d*, EO*e* and of scanning relays RB*d*, RB*e* over circuits already described.

Through the closing of their front contacts RB*d*4, RB*e*3, the scanning relays prepare the energizing circuit of relay RB*n*. Front contacts RB*d*1, RB*d*2, RB*d*5, RB*e*1, RB*e*2 form part of a contact pyramid providing the control of the scanning relays. This pyramid is so designed that it provides the metallic continuity of the energizing winding of relay RD1 when the number of scanning relays pulled up is other than 2.

At the end of the first pulse cam RK3 breaks the energizing circuit of relay RB*f*, which releases. The switching into normal of make-break contact RB*f*2 causes the sending of a ground to counter NV over control wire NV*a*: wire NV*a*, back RB*f*2, ground over a circuit already described.

The closing of back contact RB*f*3 entails the looping of wires A*a*2 and A*b*2.

After a moment, cam RK3 again completes the energizing circuit of relay RB*f*, which pulls up, thus causing the sending of a new pulse. The previously-described operations thus recur in identical fashion up to the end of the eighth pulse.

At that instant, relay RB*f* releases as before, while in pulse counter NV relay RB*m* is pulled up, as can be seen from the above-mentioned table. The energizing circuit of relay RB*n* is then completed and this relay pulls up: battery, relay RB*n*, back RB*l*2, front RB*m*3, RB*d*4, RB*e*3, back RB*f*1, front RB*g*3, ground over a circuit already described.

The pulling up of relay RB*n* causes the stopping of the pulse sending to the distant exchange and the advancing by one unit of the chain of directing relays.

The opening of back contact RB*n*1 entails the restoration to normal of the above-described timing device. The holding circuit of relay RB*n* is completed by the closing of front contact RB*n*2: battery, relay RB*n*, front RB*n*2, ground over a circuit already described.

A ground is applied to wire I*p* to fault register ED through the closing of front contact RB*n*3. The closing of front contact RB*n*4 completes the energizing circuit of relay RD*cd*, which pulls up: battery, relay RD*cd*, front RB*n*4, ground on wire D*b*.

The opening of back contact RB*n*5 prepares the release of the relays of pulse counter NV. The opening of back contact RB*n*6 prevents relay RB*f* from bearing at the rate of cam RK3.

The energization of relay RD*cd* entails that of relay RD*ab* through the closing of make-break contact RD*d*1: battery, relay RD*ab*, front RA*c*5 and RD*d*1, ground on wire D*b* over a known circuit.

The opening of the two back contacts RD*d*1 and RD*d*2 breaks the energizing circuit of relay EK*c*, which releases. The closing of front contact RD*d*2 completes the energizing circuit of relay EK*d*, which pulls up: battery, relay EK*d*, back EK*g*3, EK*j*3, EK*m*3, EK*p*3, EL*b*3, EL*e*3, EL*h*3, EL*k*3, wire R*n* through cable R, front RD*d*2, ground on wire D*b*.

The energization of relay RD*ab* causes the release of relay RB*g* owing to the short-circuiting of the energizing winding of said relay by the closing of front contact RD*b*1.

The energization of relay EK*d* prepares the energization of directing relay EK*fg* through the closing of front contact EK*d*1. A ground is applied to wire I*d* to fault register ED by the closing of front EK*d*2.

The release of relay RB*g* entails the release of relay RB*n* and of the counting relays of counter NV through the opening of its front RB*g*3.

In turn, the release of relay RB*n* breaks through the opening of its front contact RB*n*4 the energizing circuit of relay RD*cd*. This slow-releasing relay homes after a moment. The closing of make-break contact RD*d*2 completes the energizing circuit of directing relay EK*fg*, which pulls up, while relay EK*d* holds in series with said relay EK*fg*: battery, relay EK*d*, left-hand winding of relay EK*fg*, front EK*d*1, wire R*k* through cable R, front RE*q*2, back RD*d*2, ground on wire D*b*.

Further, the opening of front contact RD*d*1 breaks the energizing circuit of relay RD*ab*, which releases with a certain delay.

The energization of directing relay EK*fg* causes the connection of scanning relays RB*a* . . . RB*e* to the front contacts of the relays (EP*a* . . . EP*e*) registering the number's second digit, namely, digit Q. Over its front contact EK*g*2, relay EK*fg* prepares the energizing circuit of relay EK*ij*. Front contact EK*g*3 prepares through its closing the holding circuit of relay EK*fg*.

Relay RD*ab* releases after a moment, thus marking the beginning of the sending of the second digit's pulses. The above-described operations then recur in identical fashion. At the end of the sending of the second pulse-train, relay RD*cd* pulls up and completes the holding circuit of relay EK*fg*: battery, right-hand winding of relay EK*fg*, front EK/*g*3, back EK*j*3, EK*m*3, EK*p*3, EL*b*3, EL*e*3, EL*h*3, EL*k*3, wire R*n* through cable R, front RD*d*2, ground on wire D*b*.

Further, the opening of back contact RD*d*2 breaks the holding circuit of relay EK*d*, which releases and through the closing of its back contact EK*d*1 prepares the energizing circuit of relay EK*ij*.

When relay RD*cd* homes, it completes the energizing circuit of relay EK*ij*, which energizes, while relay EK*fg* holds in series with said relay EK*ij*: battery, right-hand winding of relay EK*fg*, right-hand winding of relay EK*ij*, front EK*g*2, back EK*d*1, wire R*k* through cable R, front RE*q*2, back RD*d*2, ground on wire D*b*.

The pulse sending will thus continue up to the end of the last pulse-train, corresponding to units digit 0. At that instant, relays EL*de* and EL*ab* are pulled up, while relay RD*cd* pulls up after the sending of the tenth pulse.

The switching into operating position of make-break contact RD*d*2 then completes the holding circuit of relay EL*de* and opens the energizing circuit of relay EL*ab*, which releases and through the closing of its back contact EL*b*2 completes the energizing circuit of relays EL*gh* and EL*jk*.

Upon homing, relay RD*cd* completes, through the restoration to normal of its make-break contact RD*d*2, the energizing circuit of relays EL*gh* and EL*jk*, which pull up:

(1) Battery, left-hand windings in series of relays EL*de* and EL*gh*, front EL*e*2, ground over a circuit already described;

(2) Battery, right-hand windings in series of relays EL*gh* and EL*jk*, back EE*o*6, ground over a circuit already described.

The pulling up of directing relay EL*jk* places scanning relays RB*a* . . . RB*e* under the control of toll-code sending relays EZ*a* . . . EZ*e*.

The closing of front contacts EL*k*2, EL*k*3, prepares the energizing circuit of relay RA*p*. The toll-pulse sending circuit is prepared by the closing of front contact EL*k*4. Front contact EL*k*5 short-circuits wires A*a*2 and A*b*2.

The sending of the metering pulses is done by beating-contact RB*f*1 over wire A*c*2: wire A*c*2, front CE*c*5, wire B*c*2 over cable B, back RA*p*1, front EL*k*4, beating contact RB*f*1, ground over a circuit already described.

Beating contact RB*f*3, being short-circuited by front contact EL*k*5, is inoperative.

When the metering-pulse train is sent, relay RD*cd* pulls up and through the switching into operating position of its make-break contact RD*d*2 completes the holding circuit of relay EL*jk*: battery, left-hand winding of EL*jk*, front EL*k*3, wire R*n* through cable R, front RD*d*2, ground on wire D*b*.

Directing relays EL*gh* and EL*de*, having their energizing circuit broken by the opening of back contact RD*d*2, release.

After a moment, relay RD*cd* releases again as known and completes the energizing circuit of relay RA*p*, which pulls up: battery, left-hand winding of EL*jk*, wire R*m* through cable R, upper winding of RA*p*, wire R*l* through cable R, front EL*k*2, ground over a circuit already described.

The pulling up of relay RA*p* entails the release of the register exactly as described with reference to a local call. It will be noted however that a contact RAp1 is provided that disconnects wire Bc2 in order to prevent the sending of additional metering pulses over this wire in case beating contact RBf1 is still switched in because the register is slow in releasing.

The establishment will now be described of an area connection requiring translation of the first three digits making up the called subscriber's number. It will be assumed by way of example that the called subscriber's number is 272—25—70.

The seizure of the register and the translator is effected like before and requires no further description.

The decoding in the translator of the number's first two digits, namely, digits 2 and 7, causes by known means the grounding of wire Kb27 and of the corresponding output terminal (B27).

Since the code 272 calls for the translation of three digits, output terminal B27 cannot therefore be connected to the energizing winding of a route relay (through a jumper connecting output terminal B27 to the input terminal associated with a given route-relay).

To ensure the translation of 3 digits a certain number of third-digit relays have been provided, referenced TFa/j in Fig. 8 and controlled by outgoing wires referenced La1/10 in third-digit decoding pyramid D3C.

These relays' front contacts, referenced TFa/j/2/11, terminate at input terminals referenced Ca/j/2/11 and at output terminals Da/j/2/11.

When the translator must receive codes requiring the translation of three digits, certain of the output terminals B10/99, corresponding to the decoding of the first two digits, are jumpered to certain of the input terminals Ca/j/2/11 and certain of the output terminals Da/j/2/11 are jumpered to certain of the input terminals Ea/h.

It follows from the foregoing explanations that the reception by the translator of code 272 causes the pulling up of third-digit relay TFb: battery, TFb, wire La2, ground through third-digit decoding pyramid D3C.

The following terminals are jumpered together in allotter RT:

Output terminal B27 jumpered to input terminal Cb2;
Output terminal Db2 jumpered to input terminal Ee.

It follows therefore that route relay TKe pulls up: battery, relay TKe, terminals Ee and Db2 jumpered together, front TFb2, terminals Cb2 and B27 jumpered together, ground over a circuit already described.

Route relay TKe therefore pulls up as in the case of the first area call described (telephone number 828—25—70).

The following operations required for the establishment of the connection are performed as in the case of the area call already described.

It will be noted that route relay TKe pulls up in both area-call examples described above; this case can arise for example when the wanted connections terminate at two different exchanges located in one and the same city.

The case will now be described of an area call requiring translation of 3 digits for the routing of the call and translation of 4 digits for determination of the tolls. It will be assumed that the number 931—25—70 meets this requirement.

The reception of the code 931 brings about in the translator the grounding of output terminal B93. This terminal is jumpered in allotter RT to the input terminal Ca2 corresponding to the second front-contact of third-digit relay TFa, which has just pulled up (third digit 1 of number 931—25—70). The corresponding output terminal Da2 is jumpered in allotter RT to the input terminal Eh corresponding to route relay TKh. It will be noted that the operation of the translator is identical up to this point with the one described with reference to the establishment of an area connection requiring the translation of three digits.

The pulling up of route relay TKh allows furnishing the register the information required to control the establishment of the connection. In the example chosen this information is: $W=3$, $X=2$, $Y=5$.

To send this information to the register, the auxiliary relays involved in sending the code W, X and Y are controlled as before by the first three front contacts (TKh1, TKh2, TKh3) of route relay TKh. These three contacts are supplied from outgoing wire P2b of the above-mentioned pyramid of discrimination contacts. To do so, the output terminal I2b associated with wire P2b is jumpered in allotter RT to the input terminal Ebh associated with the first three front contacts (TKh1 . . . TKh3) of relay TKh.

It will be noted that the value of Z is not included in the information sent from the translator to the register This is due to the fact that 3 digits cannot suffice to determine the tolls to be charged the calling subscriber. To characterize this condition, output terminal G80 (corresponding to front contact TKh10 of route relay TKh) is jumpered to input terminal Is in allotter RT.

The grounding of terminals Is will be used to tell the register that the translator needs a fourth digit to enable it to determine all the information required for the establishment of the wanted connection. The grounding of terminal Is causes in the register the pulling up of relay EDq4 (Fig. 4): battery, relay EBo, relay EDq, wire Eg through cable E and translator connector CT, resistance TR15, terminal Is jumpered to terminal G80 in allotter RT, wire Tzh10, front TKh10, ground.

Owing to the presence of resistance TR15 in the energizing circuit of relays EBo and EDq, only relay EDq pulls up, relay EBo, being a marginal relay, remaining unoperated.

The pulling up of relay EDq tells the register that the translator needs a fourth digit in order to be able to furnish it the full information required for the routing of the call.

In the present case, the register has received from the translator only the information concerning the values of W, X and Y. It will be recalled that these values are: $W=3$, $X=2$, $Y=5$.

Reference to a previously-mentioned table will show that these values bring about in the register the energization of code relays EWa, EWb, EXb, EXe, EYa, EYc. These relays complete holding circuits for themselves over circuits already described.

It will be noted that relay EDp cannot pull up unless 2 relays are pulled up in each of the relays groups EWa/e, EXa/e, EYa/e, EZa/e. Consequently, in spite of the translator's sending the register the signals W, X and Y, relative to the routing of the call, relay EDp remains unoperated and accordingly the group-selecting operations cannot commence. Relay EDq completes a holding circuit for itself through the closing of its front contact EDq1: battery, relay EBo, relay EDq, front EDq1, resistance ER8, ground on general holding wire tg.

The switching into operating position of make-break contact EDq2 directs the energizing circuit of relay EJq to front contact EGm1, which controls the registering of the fourth digit of the called subscriber's number. Since the translation time is short, it follows that relay EJq releases during the operation of make-break contact EDq2, because the register has not yet received the fourth digit at that instant. The translator is released in accordance with a method already described. The registers' code relays EWa, EWb, EXb, EXe, EYa, EYc remain pulled up.

Once the calling subscriber has dialed the fourth digit of the called subscriber's number and that digit has been registered by the corresponding relays, relay EGlm pulls up as is known and then completes through the closing of its front contact EGm1 the energizing circuit of relay EJq, which again pulls up: battery, relay EJq, back EFf11, EDp4, front EDq2, back EBo2, front EGm1, ground over a circuit already described.

The translator is again brought in by the pulling up of relay EJ$q$. It should further be noted that this translator can be different from the one seized the first time by the register. The operation of this translator is identical with that previously described. It will be recalled that route relay TK$h$ pulls up and again sends the register the information required for routing the call, excluding the tolls: $W=3$, $X=2$, $Y=5$.

Since the translation of four digits is needed in order to determine the tolls to be charged to the calling subscriber and the translation of the first three digits is characterized by the pulling up of route relay TK$h$, secondary toll-relays, associated with the regular route-relays, are provided in order to simplify the equipment and to give the translator greater flexibility. These toll relays, referenced TN$b/j$ in Fig. 8, have their energizing winding connected to terminals N$b/j$ of allotter RT. The number of toll relays shown in the figure is given as an example and it can vary in accordance with the requirements of the exchange for which the equipment may be intended. Contacts TN$b/j$/1/10 of these relays are connected to the 10 outgoing wires M$a$1/10 issuing from fourth-digit decoding pyramid D4C. These 10 wires are multipled to said contacts as follows:

Wire M$a$1 multipled to contacts TN$b$1/$j$1.

---

Wire M$a$10 multipled to contacts TN$b$10/$j$10.

The outgoing wires corresponding to these contacts terminate at output terminals F$b/j$/1/10 of allotter RT. The connections are as follows:

Contact TN$b$1 connected to terminal F$b$1.
Contact TN$b$2 connected to terminal F$b$2.

---

Contact TN$b$10 connected to terminal F$b$10.

---

Contact TN$j$10 connected to terminal F$j$10.

The output terminals associated with said contacts are used to control auxiliary toll-code sending relays T$sa/e$.

To be precise, the putting through of an area call whose number is 931—25—70 will be described to the end. Route relay TK$h$ is associated with secondary toll-relay TN$e$. This amounts to saying that terminals E$h$ and N$e$ are jumpered together in allotter RT, thus connecting in parallel the energizing windings of relays TK$h$ and TN$e$. Output terminal F$e$2 and terminal H$z$2 are also jumpered together in allotter RT. It will be recalled that terminal F$e$2 belongs to the second contact of the secondary route relay TF$e$ associated with the main route relay TK$h$. The jumpering of terminals F$e$2 and H$z$2 means that following translation of the number's fourth digit, namely, digit 2, the secondary route relay determines the tolls to be charged, which is therefore $Z=2$ in the example chosen. Reference to a table mentioned before will show that the toll $Z=2$ calls for the energization in the register of code relays EZ$b$ and EZ$e$ or, what amounts to the same thing, the energization in the translator of auxiliary relays TS$b$ and TS$e$. The energizing circuit of these relays is in effect completed by the pulling up of the auxiliary route relay as follows: battery, middle winding of relay TS$b$, lower winding of relay TS$e$, wire Z$a$2 through cable Z, jumper between terminals H$z$2 and F$e$2, front TN$e$2, wire M$a$2 grounded through fourth-digit decoding contact pyramid D4C.

It will be recalled that the main route relay furnishes on its own to the register the elements W, X and Y. Consequently, following the energization of secondary route relay TN$e$, the register is in possession of all the elements required for the routing of call 931—25—70 and accordingly relay ED$p$ pulls up and controls the starting of the group selection. The routing of the call is thereupon effected like before.

Along the same order of ideas, the operation of the translator will be described for the case where the number dialed requires the translation of 4 digits for determination of the route and of the tolls. It will be assumed as an example that number 456—25—70 meets this requirement.

It will be recalled that when the number requires the translation of four digits for the determination of the tolls, while the translation of three digits suffices for the determination of the route, the corresponding route relay pulls up, sends the register the signals relative to W, X and Y and controls the grounding of wire E$g$ across a resistance. The sending of the signals relative to W, X and Y is inoperative, since Z cannot be determined. When the register brings in the translator again after having registered the fourth digit, the same route relay pulls up again and sends the register the signals relative to W, X and Y, while the secondary toll-relay associated with the main route relay, being this time informed of the number's fourth digit, sends the register the signals relative to Z.

When four digits must be translated to determine the route and the tolls, it is imperative to apply a high ground to wire E$g$ without the help of a route relay, considering that the elements required for establishing said route are not known as yet. To do so, it suffices to jumper one of output terminals D$a/j$/2/11 to terminal I$s$ in allotter RT.

To be precise, when the register is connected to the translator, a ground is applied to output terminal B45 upon the registering of the number's first three digits (456) and third-digit relay TF$c$ pulls up. The following jumpers are provided in allotter RT:

(1) Output terminal B45 connected to input terminal C$c$2;

(2) Output terminal D$c$2 connected to terminal I$s$.

The grounding of terminal I$s$ signals the register as is known that it must release the translator and then bring it in again once it has registered the fourth digit of the called subscriber's number, that is, digit 2 in the example chosen.

When the register brings the translator in again after having registered the fourth digit, fourth-digit relay TI$b$ pulls up. It will be noted that the ten fourth-digit relays are wired the same way as described with reference to third-digit relays TF$a/j$.

Two jumpers are provided in allotter RT:

(1) A jumper connecting output terminal D$c$2 to input terminal J$b$2;

(2) A jumper connecting output terminal K$b$2 to input terminal E$g$.

Consequently, the energizing circuit of route relay TE$g$ is completed and this relay pulls up: battery, relay TE$g$, terminal E$g$, jumper connecting terminals E$g$ and K$b$2, front TI$b$2, terminal J$b$2, jumper between terminals J$b$2 and D$c$2, front TF$c$2, terminal C$c$2, jumper between terminals C$c$2 and B45, ground over a circuit already described.

The pulling up of route relay TK$g$ allows furnishing the register the information needed to route the call in accordance with a known method.

The same principle is used where 5 digits must be translated to determine the information required for the routing of the call.

First the number's first three digits are translated in accordance with a known method upon the seizure of the translator, this grounding terminal I$s$, thereby telling the register that it must send a fourth digit. The translator thereupon releases.

When the register has received the fourth digit, it brings the translator in again and sends it the number's first four digits, a ground is applied to terminal I$t$ to wire E$g$ and an auxiliary route relay not shown pulls up. To do so, one of terminals K$a/j$/2/11 is jumpered to terminal I$t$ without energizing a route relay. This time, wire E$g$ is connected to free ground, the effect of this being to cause the pulling up of marginal relay EB$o$ of the register (Fig. 6). By its pulling up, this relay tells the register that the translator must know the number's fifth digit in order to send the register the information needed for the routing of the call.

By closing its front contact EBo1, relay EBo completes a holding circuit for itself by short-circuiting resistance ER8. Make-break contact EBo2 directs the energizing circuit of translator-seizing relay EJq to contact EGp1 of fifth-digit receiving control relay EGop.

Consequently, relay EJq falls back and releases the translator. When the register has received the number's fifth digit, it brings a translator in for the third time and sends it the number's first five digits. A fifth-digit relay pulls up. This relay is not shown but it is connected the same way as described with reference to third-digit relays TFa/j. In combination with the above-mentioned auxiliary route relay, it completes the energizing circuit of a route relay, which thereupon sends the register the information required for the routing of the call.

Up to here it has been assumed that the calling and the called subscribers were regular subscribers and that the connection had been established by direct lines, that is, without rerouting. A few special cases will now be examined and the operation of the register and of the translator will be described for each of them.

First the case will be considered of a call that requires rerouting. To fix ideas, let the called subscriber's number be 931—25—70. The putting through of a call to that number has already been discussed, but using a direct path. To consider the case of putting the call through with rerouting, the description will be resumed of the routing of the call over a normal path up to the end of the group-selecting operations. It is well to explain that when the calling subscriber removes his handset and dials 931—25—70, he is automatically connected to the called subscriber over a direct path. Rerouting is needed only if all the direct lines over which the called party can be reached are busy. For the register and primarily the translator to be informed that all the direct lines that can be used for the routing of a particular call are busy, it is necessary first to start the group-selecting operations giving access to the normal paths, to check that said paths are busy and then to bring about the group-selecting operations giving access to the rerouting paths.

Hence it will be assumed that at the end of the group-selecting operations involved in routing a call to number 931—25—70 all the normal paths are found to be busy. A positive to ground polarity is then applied to wire Fe by the marker seized by the group-selection receiver connected to the register. That polarity causes the pulling up of relay EFa through rectifier EQ4: ground, relay EFa, rectifier EQ4, wire Re, front EBq2, wire Fe to the group-selection marker through receiver connector CR.

The pulling up of relay EFa completes through the closing of its front contact EFa1 the energizing circuit of relay EFc, which pulls up: battery, left-hand winding of relay EFc, back EFb2, front EFa1, ground on general holding wire tg.

A ground is applied to wire Iw toward fault register ED by the closing of front contact EFa2.

The pulling up of relay EFc will cause the release of all the relays engaged in controlling of group-selecting operations. Relay EFc completes a holding circuit for itself through the closing of its front contact EFc1: battery, left-hand winding of relay EFc, front EFc1, back EFb5, ground on wire tg.

The closing of front contact EFc3 prepares the energizing circuit of relay EFb. The opening of back contact EFc4 causes the removal of the ground from wire Rg, this entailing the release of relay EFjk. The opening of back contact EFc6 breaks the holding circuit of relays EWa/e, EXa/e, EYa/e, EZa/e, thus entailing the release of those that had pulled up following the reception of the information sent by the translator.

The release of code-sending relays EWa/e . . . EZa/e entails the release of relay EDp. The receiver connector, the receiver and the marker seized release in accordance with the usual methods.

The release of the relays seized for the group selection, including the release of relay EFa, is controlled by relay EFb. When this release becomes effective, relay EFb pulls up: battery, relay EFb, back EDm4, front EFc3, back EFd4, EFe4, EDn1, EDp3, EFa1, ground on wire tg. The energization of relay EFb will cause the re-seizure of a translator and the sending of a rerouting signal to said translator.

Through its front contact EFb1, relay EFb completes a holding circuit for itself over general grounding wire tg. The energizing circuit of relay RCf is prepared by the closing of front contacts EFb2 and EFb3. The closing of front contact EFb4 prepares the circuit that sends the translator a signal telling it that there is rerouting. Relay EFc has is holding circuit opened by back contact EFb5.

The release of relay EFc completes the energizing circuit of translator-seizing relay EJq through the closing of its back contact EFc4: battery, relay EJq, back EFf11, EDp4, EDq2, EEo1, EEm3, front EGj1, wire Rg across Figs. 4, 5 and 6, back EFc4, ground on wire tg.

The translator is called in in accordance with the usual methods. The same route relay (TKh) pulls up, while the ground applied to wire Ei in the register by front contact EFb4 completes the energizing circuit of rerouting-discrimination relay TTa, which pulls up: battery, relay TTa, wire Ei through cable E and translator connector CT, front EFb4, ground.

The pulling up of relay TTa tells the translator that the register requires a rerouting. Through the opening of its back contact TTa1, it prevents the energization of relay TTb upon the seizure of the translator. Through the closing of its front contact TTa2, relay TTa completes a holding circuit for relay TCk in accordance with a known method. The closing of front contacts TTa3 . . . TTa10 causes the grounding of discrimination wires P1c . . . P8c.

It will be recalled that during the first seizure of the translator for establishing the present connection without rerouting route relay TKh furnished the auxiliary code-sending relays the signals relative to W, X and Y through the action of its three front contacts TKh1, TKh2 and TKh3, supplied by suitable jumpers from discriminating wire P2b.

In the present instance, that is, with rerouting of the call, wire P2b is disconnected, due to the fact that relay TTb stays unoperated and that consequently front contact TTb4 remains open. Route relay TKh cannot therefore send auxiliary relays TPa/e, TQa/e, TRa/e the signals concerning the values of W, X and Y through the action of its first three front contacts (TKh1 . . . TKh3). It is the next three front contacts (TKh4, TKh5 and TKh6) that are used for this purpose in the case of rerouting. To do so, they are supplied by suitable jumpers from discrimination wire P2c, which is grounded by the closing of front contact TTa4.

It will be assumed that the rerouting of the call characterized by the number 931—25—70 meets the following values for W, X and Y:

$$W=3—X=1—Y=8$$

As reference to a table mentioned before will show, these values correspond to the energization of the following code relays:

EWa, EWb, EXa, EXe, EYd, EYe

The control of these relays is provided by auxiliary relays TPa, TPb, TQa, TQe, TRd, TRe, which pull up. Only the energizing circuit of relays TPa and TPb will be described herein (it being easy to deduce therefrom those of the other relays): battery, middle winding of relay TPb, upper winding of relay TPa, wire Wa3 through cable W, jumper between terminals Hw3 and G84, front TKh4, wire ch, terminal Ech jumpered to input terminal I2c, wire P2c through cable P, front TTa4, TTf3, ground.

As regards the ground, it will be recalled that it is sent by secondary toll-relay TNe, which (thanks to a previously-mentioned jumper) is energized in parallel with route relay TK*h*. The tolls to be charged to the calling subscriber in the event of rerouting must obviously be the same as where a normal path is used.

It has been pointed out before that rerouting is necessary when no normal path is available from the originating to the terminating office.

Rerouting can also be required of the register where, a certain time after the seizure of an originating connector associated with a normal path, no dialing tone has been received by such originating connector from the terminating connector. This can for example be due to a fault on the transmission line involved or to non-seizure of the terminating connector.

At the end of the lag provided, the originating connector sends a positive to ground polarity over wire A*a*2, this causing the pulling up of relay EF*a* like before: ground, relay EF*a*, rectifier EQ4, wire R*e* through cable R, front RE*p*6, wire F*a*2, back RE*q*6, RD*o*1, wire B*a*2 through cable B, front CE*c*8, wire A*a*2 brought to a positive to ground polarity in the originating connector.

The pulling up of relay EF*a* then causes in the same manner previously described the release of the relays engaged subsequently to the energization of relay ED*p* in the group-selecting operations.

It is to be noted in this case that rerouting is called for even though there may be at that instant free direct lines that will allow putting the call through without rerouting.

The case will now be considered of absent subscribers. Two eventualities can arise. The absent subscriber may be either a called or a calling subscriber. It will be assumed first that he is a called subscriber. To go back to a common example, it will be assumed that the called absent subscriber is served by the same exchange as the calling subscriber and that his number is 828—25—70. The routing of a call to that number has already been described in detail. In the example now under consideration, it is quite obvious that the register can be informed that the called subscriber is absent only at the end of the line-selecting operations. A special polarity (low negative to ground potential) is then sent over discrimination wire F*d* from the called subscriber's connector through the line-selection marker, the receiver and receiver connector CT. This low negative polarity sent over wire F*d* (Fig. 2) causes the pulling up of discrimination relay RA*o*: ground, relay RA*n*, relay RA*o*, rectifier RQ1, wire B*c*1 across Figs. 2, 3 and 5, front EF*i*9, above-mentioned wire F*d*.

Relay RA*n*, in series with relay R*ao*, is a marginal relay and it stays unoperated.

The pulling up of discrimination relay R*ao* tells the register that the called subscriber is an absent subscriber. The energizing circuit of relay EC*m* is prepared through the closing of front contact RA*o*2. The energizing circuit of relay RA*k* is completed by the closing of front RA*o*3.

The pulling up of relay RA*k* entails the pulling up of relay EC*m* by the closing of front contact RA*k*1: battery, relay EC*m*, wire D*e* through cable D, back RA*n*1, front RA*o*2, back RA*m*1, front RA*k*1, ground.

The closing of front RA*k*2 completes a holding circuit for RC*gh*.

Relay EC*m* completes a holding circuit for itself through the closing of its front contact EC*m*1. The opening of back contact EC*m*2 breaks the energizing circuit of relay EF*f*, which releases.

The closing of front contact EC*m*3 completes the energizing circuit of relay EF*c*, which pulls up: battery, left-hand winding of relay EF*c*, front EC*m*3, EF*i*10, ground on wire *tg*.

The closing of front contact EC*m*4 prepares the energizing circuit of translator-seizing relay EJ*q*. A ground is applied to absent-subscriber discrimination wire E*n* by the closing of front contact EC*m*5.

The energization of relay EF*c* controls as before the release of the relays that were engaged in controlling the group- and line-selecting operations.

The release of relay EF*f* and the energization of relay EJ*q* occurring after the release of relay EF*c* has the effect of placing the register in a position to call the translator.

The translator is seized in accordance with the usual methods. Since the code 965 is reserved for local calls, no route relay can energize in the translator owing to the reception of this code.

It is known that the release of the relays engaged in controlling the group- and line-selecting operations is characterized by the release of relay EF*c* and the energization of relay EF*b*. Relay EF*b* grounds wire E*i* through the closing of its front contact EF*b*4. Consequently, relay TT*a* pulls up upon the seizure of the translator. The energizing circuit of this relay has further been described in connection with the rerouting.

A route relay TK*c* has been provided for absent subscribers, be they called or calling subscribers. This relay is energized by the ground applied to absent-subscriber discrimination wire E*n* thanks to a jumper connecting in allotter RT output terminal B*c* to the input terminal E*c* associated with route relay TK*c*.

This relay in effect pulls up upon the seizure of the translator: battery, route relay TK*c*, terminal E*c* jumpered to terminal B*c*, wire E*n* through cable E and translator connector CT, front EC*m*5, ground.

The pulling up of route relay TK*c* will allow sending the register the signals that will enable it to control the transfer of the call to an operator. It will be assumed that the corresponding values of W, X and Y are: $W=3$, $X=5$, $Y=1$.

The toll signal is not included, since it is a question of a call to an operator, not to be charged.

The control of the auxiliary relays providing the sending of the above-mentioned values to the register is effected by front contacts TK*c*4, TK*c*5 and TK*c*6, supplied by discrimination wire P1*c* through a jumper connecting in allotter RT output terminal I1*c* to input terminal E*cc*. It will be noted that discrimination wire P1*c* is grounded through the closing of front contact TT*a*3.

When the register controls the group-selecting operations under the control of the translator, it is known that relay ED*p* cannot pull up before the translator has sent the register the signals relative to W, X, Y and Z and the corresponding code relays have pulled up. In the special case of ringing the operator, relays EZ*a*/*e* stay unoperated. To allow the pulling up of relay ED*p*, provision is made to short-circuit the control-contact pyramid associated with relays EZ*a*/*e*. To do so, use is made of two auxiliary contacts (EY*a*6 and EY*e*5) of relays EY*a* and EY*e*, which are connected in series to the output of said contact pyramid. It will be recalled that relays EY*a* and EY*e* actually correspond to the value Y=1.

The operators are reached directly by the group-selecting means the same way as by local circuits, as was already pointed out at the beginning of the present description. Hence the need of making Y equal 1, which leads to the sending of no digit. Owing to this, provision has been made for the short-circuiting of the chain of directing relays by front contacts EY*a*3 and EY*e*3. Consequently, relays RA*p*, EK*c* and EL*jk* pull up upon the energization of relay RE*q*, which normally controls the beginning of the operations involved in sending the digits to the outside circuit in the case of an area call.

The energizing circuit of relay EK*c* has already been described. The energizing circuit of relays EL*jk* and EA*p* is as follows: battery, left-hand winding of relay EL*jk*, wire R*m* through cable R, upper winding of relay RA*p*, wire R*l* through cable R, front EY*a*3, EY*e*3, wire R*o* through cable R, front EK*o*1, back RD*d*1, ground on wire D*b*.

It is known that the energization of relay RA*p* characterizes the end of the operations involved in sending the dialing pulses to the outside circuit in the case of an area call. It will be noted in the present example that this relay pulls up upon the energization of relay RE*q*, thus eliminating the operations relative to the sending of dialing pulses corresponding to the resending of digits. It is known that the energization of relay RA*p* immediately brings about the release of the register. The calling subscriber is then connected to an operator, who tells him that the called subscriber is an absent subscriber.

Where the calling party is an absent subscriber, relays RA*o*, RA*k* and EC*m* pull up as soon as the register is connected to that subscriber. The energization of relay RA*o* is this time controlled by the application of a low negative polarity to discrimination wire A*c*1 from the calling subscriber's connector. The energization of translator-seizing relay EJ*q* is immediate, because front contact EC*m*4 completes the energizing circuit of this relay while the register has not yet received any dialing pulse from the calling subscriber. The seizure of the translator is effected like before. Route relay TK*c* pulls up over a circuit already described. This route relay does not however bring about the transfer of the calling subscriber to the previously-mentioned operator.

In effect, the translator is informed that the absent subscriber is a called or a calling subscriber by the fact that relay TT*a* is or is not pulled up. It is known that actually in the case of an absent called subscriber relay TT*a* pulls up owing to the ground applied to wire E*i* by front contact EF*b*4. On the other hand, this relay stays unoperated in the case of an absent calling subscriber, because relay EF*b* is not energized. Owing to this, translator relay TT*b* pulls up as in the case of an ordinary subscriber. In short, the sending of a ground over wire E*n* and the pulling up of relays TT*a* and TT*f* characterize an absent calling subscriber. To control the group-selecting operations that will allow transferring an absent calling subscriber to a special operator, use is made of the first three front contacts (TK*c*1 . . . TK*c*3) of route relay TK*c*, supplied by discrimination wire P1*b*. To do so, output terminal 11*b* is jumpered to the input terminal E*bc* supplying front contacts TK*c*1 . . . TK*c*3. The values provided in this case for the routing of the call are: $W=3$, $X=4$, $Y=1$.

It will now be assumed that the calling subscriber is a restricted-service subscriber and that he dials a number he is not entitled to call. This fact is characterized in the register by a strong negative to ground polarity applied to wire A*c*1 from that subscriber's connector. This strong polarity causes the two discrimination relays RA*o* and RA*n* to pull up. Relay RA*k* pulls up over a circuit already described.

The pulling up of relays RA*o* and RA*n* entails the pulling up of relay EC*n* through the grounding of wire D*f* by the decoding pyramid associated with the discrimination relays. This relay holds through the closing of front contact EC*n*2. A ground is applied to wire E*m* through the closing of front contact EC*n*1.

If the calling subscriber dials the number of a local call, the pulling up of relay EC*n* is inoperative.

If the calling subscriber dials the number of an area call to which he is not entitled, the translator is seized as is known and relay TT*e* pulls up due to the grounding of wire E*m*. Relay TT*f* stays unoperated owing to the opening of back contact TT*e*1.

The pulling up of relay TT*e* causes through the closing of its front contacts TT*e*3 and TT*e*4 the grounding of a certain number of discrimination wires.

In order to fix ideas it will be assumed that the calling party dials the number 828—25—70. It is known that upon the seizure of the translator, such a number causes the pulling up of route relay TK*h*. This relay cannot send the register the signals required for establishing the wanted connection, since the first three front contacts (TK*h*1 . . . Tk*h*3) are not supplied, owing to the falling back of relay TT*f* (front contact TT*f*3 open). To transfer the calling subscriber to an operator, provision has been made to use three front contacts (TK*h*7, TK*h*8, TK*h*9) supplied from discrimination wire P6*a*. This wire P6*a* is grounded due to the pulling up of relay TT*e* and the closing of front contact TT*e*4. A jumper is provided in allotter RT between the output terminal I6*a* associated with discrimination wire P6*a* and the input terminal E*dh* corresponding to the three front contacts TK*h*6 . . . TK*h*9. The three front contacts furnish the signals to the register in accordance with known methods, the signals being in this case:

$$W=1,\ X=6,\ Y=1$$

The calling subscriber is then transferred to an operator in accordance with a known method.

The case will now be discussed of a call coming from a toll circuit. The register is seized like in the case of an ordinary subscriber. The fact that the call is from a toll circuit is characterized in the register by the pulling up of discrimination relays RA*m* and RA*l*. (Sending of a strong positive polarity over wire A*c*1.) The pulling up of these relays entails the pulling up of relays RA*k* and EC*p* over circuits easy to trace. It will be assumed that the call from such a circuit is intended for a subscriber served by the exchange comprising the register forming the subject of the present discussion. In that case, the register receives from the incoming circuit only four digits, representing the numerical portion of the called subscriber's number. Since the register receives only four digits and these four digits represent the numerical portion of the called number, they must be registered by the registering relays associated with the digits M, C, D and U. To do so, the five wires C*a* . . . C*e* are immediately directed to registering relays ER*a*/*e* . . . EU*a*/*e*. For that purpose, the three front contacts EC*p*1 . . . EC*p*3 cause the energization of relays EI*cd*, EG*fg* and EG*ij*:

(1) Battery, resistance ER10, front EC*p*1, relay EI*cd*, ground over a circuit already described;

(2) Battery, resistance ER10, front EC*p*2, relay EG*fg*, ground over a circuit already described;

(3) Battery, resistance ER10, front EC*p*3, relay EG*ij*, ground over a circuit already described.

The connections between front contacts EC*p*1 . . . EC*p*3 and resistance ER10 are shown in dotted lines because they exist only where the register must be connected to an incoming circuit sending only the numerical portion of the called number. The closing of front contact EC*p*4 completes the energizing circuit of relay EF*f*, which pulls up. The front contact EC*p*4-relay EF*f* connection is shown in dotted lines for the same reason mentioned above. The closing of front contact EC*p*5 completes the energizing circuit of relay EC*o*, which pulls up: battery, relay EC*o*, front contact EC*p*5, ground on wire D*h*.

Relay EC*p* completes a holding circuit for itself through the closing of its front contact EC*p*6: battery, relay EC*p*, front contact EC*p*6, ground on wire *tg*.

The pulling up of relay EF*f* characterizes the fact that the register is not to be associated with a translator.

Relay EC*o* completes a holding circuit for itself through the closing of its front contact EC*o*2: battery, relay EC*o*, front contact EC*o*2, ground on wire *tg*.

The energizing circuit of relay RA*q* is completed by the closing of front contact EC*o*3: battery, resistance RR5, relay RA*q*, front contact RC*o*3, ground on wire D*b*.

The energization of relay RA*q* is inoperative.

In the present case, therefore, the register behaves as if it had already received the three digits of the code of the local call (965, energization of relay EF*f*). The following operations involved in the group- and line-selections will develop like before.

In the case of a circuit call intended for a satellite of the connecting office under consideration, the number of digits received exceeds four. It will be assumed that the present register is designed for example to receive 5-digit circuit calls intended for satellites. In that case, front contacts EC*p*1 and EC*p*2 are so connected to resistance ER10 that relays EI*cd* and EG*fg* pull up upon the energization of relay EC*p*. Further, a connection is provided between front contact EC*p*4 and wire E*p*, relay EF*f* being this time further controlled by said front contact.

Upon the reception of the first digit, relay EJ*q* pulls up, owing to the closing of front contact RJ1, in accordance with a known method. The translator is told that the call is coming from a circuit by the grounding of wire E*j* by front contact EC*o*1, the effect of this being to cause the pulling up of relay TT*c* and to prevent the energization of relay TT*f*. The pulling up of relay TT*c* grounds certain discrimination wires.

In the register the closing of front contact EC*p*4 grounds wire E*p*, which in the translator terminates at a terminal B*e* of allotter RT. This terminal is jumpered to one of terminals B10/99, thus making the 5-digit circuit call equal to an area call. It is well to note in fact that the first digit received in the case of a circuit call is registered at the same group of registering relays as the third digit of an ordinary area call. In the case of a call coming from a circuit, therefore, everything happens as if it were a question of an area call, where the first two digits of the called number would not be sent to the translator. In that case, none of terminals B10/99 would be grounded. This observation allows understanding why terminal E*p* is connected to one of output terminals B10/99. Things are thus brought back to the case of an area call and the translation can be had of the first digit received from the circuit, because that digit actually behaves like the third digit in the number of an area call. The translation of the first digit received, which is registered in the translator by the group of relays TB*a* . . . TB*e* and TF*a/j*, can be had in accordance with a known method from the B terminal chosen from among the 90 terminals B10/99. This translation entails the pulling up of the route relay, which thereupon sends the register the information required for the routing of the call.

The supply of the first 3 front contacts of the abovementioned route relay is provided by one of the discrimination wires grounded owing to the pulling up of relay TT*c*. The other groups of three front contacts can be used in the case of rerouting, for example.

The call-routing operations develop as already described. It will be noted however that there is no sending of metering pulses, since it is here a question of one circuit calling another. To meet this requirement, an additional contact of relay EC*o* is used. Contact EC*o*4 is connected in series with contact EL*k*1. Consequently, relay RA*p* pulls up upon the energization of relay EL*jk*. It is known that relay EL*jk* directs the control wires of the scanning relays in order to control the sending of metering pulses. Relay RA*p* controls the release of the register. The fact that the register is released upon the energization of relay EL*jk* therefore prevents the sending of metering pulses to the outgoing circuit. The release of the register by relay RA*p* is however delayed, because back contact RA*p*4 is short-circuited by front contact RA*q*2 of relay RA*q*. This relay RA*q* is short-circuited by front contact RA*p*2 and accordingly releases with a slight delay. During the moment that relays RA*p* and RA*q* are pulled up simultaneously, wire B*c*2 is grounded to modify the feeding bridges, because in the example here chosen the calling subscriber is a circuit: wire B*c*2, front RA*p*1, RA*q*1, ground.

When relay RA*q* releases, the ground is removed from wire B*c*2 and the short-circuit is removed from back contact RA*p*4, this causing the release of the register.

It may happen that in the case of long-distance toll calls an intermediate office will receive the full number of the called subscriber. Depending upon the scheme of the telephone system involved, said intermediate office must resend all or part of the number it has received. The register is so told by the application of a low positive polarity to discrimination wire A*c*1, the effect of this being to cause discrimination relay RA*m* to pull up over a circuit already described. Marginal relay RA*l* stays unoperated in that case. Relay RA*k* then pulls up in accordance with a method already described. Consequently, relay EC*o* is energized over the following circuit: battery, relay EC*o*, wire D*h* through cable D, back RA*l*1, RA*o*1, front RA*m*1, RA*k*1, ground.

The operation of relay EC*o* has already been described. Due to the register's receiving a full 7-digit number, its operation is approximately the same as if said number had been dialed by an ordinary subscriber. A translator is seized after the reception of the third code-digit.

The control of the group-selecting and pulse-resending operations is thereupon effected as previously described.

The case will now be considered of a call to special services. It has been arranged that these services should be rung by dialing numbers beginning with the digit 1. It will be assumed by way of example that a subscriber dials the number 14. Upon the reception of digit 1, registering relays EQ*a* and EQ*e* pull up, as well as relay EE*m*, whose energizing circuit has just been completed as follows: battery, relay EE*m*, front EO*e*3, EO*a*3, ground over a circuit already described.

The closing of front contact EE*m*3 prepares the energizing circuit of translator-seizing relay EJ*q*.

After the reception of the second digit, relay EG*fg* pulls up and completes the energizing circuit of relay EJ*q*, which pulls up: battery, relay EJ*q*, back EF*f*11, ED*p*4, ED*q*2, EE*o*1, front EE*m*3, EG*g*1, ground over a circuit already described.

The translator is thus seized upon the reception of the 2nd digit.

The reception of digit 1 at the translator causes the grounding of terminal B*a* over the following circuit: terminal B*a*, front contacts TE*k*2, TA*e*3, TA*a*3, ground.

A special relay (TK*a*) is provided for the routing of the call. This relay is supplied by terminal B*a* over a jumper connecting said terminal B*a* to terminal E*a*.

This relay, like the other route relays, comprises three groups of three front contacts. Its tenth front contact is used to send the auxiliary relays the signal relative to Y, namely, Y1, in the case of a call terminating at an operator's position. Thus, regardless of the special service called, the route relay automatically furnishes the special signal $Y=1$. The first contacts of each of the three-contact groups, namely, contacts TK*a*1, TK*a*4, TK*a*7, are intended to control the auxiliary relays TP*a/e* sending the signals concerning the value of W. The second front contacts (TK*a*2, TK*a*5, TK*a*8) control the auxiliary route-relays over their front contacts and in response to the second digit received of the called number furnish the signals relative to the value of X.

The third contacts (TK*a*3, TK*a*6, TK*a*9) are not used.

In the case of a call to number 14 for example by an ordinary subscriber, use is made of front contacts TK*a*4 and TK*a*5, supplied from discrimination wire P5*a*, which is grounded due to the closing of contact TT*f*5. To do so, a jumper is provided in allotter RT connecting the output terminal I5*a* associated with discrimination wire P5*a* to the input terminal E*ca* supplying front contacts TK*a*4 . . . TK*a*6.

The pulling up of this route relay immediately furnishes the translator the following elements: $W=1$, $Y=1$.

These elements are furnished by front contacts TK*a*4 and TKA10.

An auxiliary route-relay TN*a* controlled by front contact TK*a*5 is provided. To do so, the output terminal G5 associated with front contact TK$a$5 is jumpered to the input terminal N$a$ associated with relay TN$a$.

Front contacts TN$a$1/10 are connected to the ten outgoing wires K$a$1/10 of second-digit decoding pyramid D2C and to the ten output terminals G$a$1/10. These terminals are designed to control the auxiliary code-sending relays relative to the digit X in the group selection. In the example chosen it will be assumed that the value of X for the special service having the number 14 is: $X=4$.

A jumper is provided in allotter RT between terminals G$a$4 and H$x$4, its effect being to cause the pulling up of auxiliary relays TQ$e$ and TQ$c$: battery, middle winding of relay TQ$e$, lower winding of relay TQ$c$, wire X$a$4 through cable X, terminal H$x$4 connected to terminal G$a$4, front TN$a$4, wire K$a$4 grounded by second-digit decoding contact pyramid D2C.

The register having received the information required for the group selection, it controls the establishment of the connection.

It will now be assumed that a subscriber dials a non-existent number. It will be assumed that 931—75—70 is such a number.

It is known that the reception of the code 931 by the translator requires knowing the fourth digit of the number. When the register calls the translator in a second time, after the reception of the fourth digit (the digit 7 in the example chosen), route relay TK$h$ and metering relay TN$e$ pull up. To characterize the fact that 9317 corresponds to a non-existent number, terminal I$e$ of allotter RT is grounded. This is done by jumpering the output terminal F$e$7 associated with front contact TN$e$7 to terminal I$e$. The grounding of this terminal has the effect of causing the pulling up of relay EL$q$ (Fig. 6): battery, left-hand winding of relay EL$q$, wire E$q$ through cable E and translator connector CT, terminal I$e$ grounded.

The switching into operating position of directing contact EL$q$1 removes the ground from code-sending wires E$aa/e$, E$ba/e$, E$ca/e$, E$ea/e$ and transfers it to wire E$f$. The closing of front contact EL$q$2 completes the energization circuit of relay EF$c$, which pulls up: battery, left-hand winding of relay EF$c$, wire $ha$ across Figs. 6 and 7, front EL$q$2, ground on wire E$q$.

Relay EL$q$ completes a holding circuit for itself through the closing of its front contact EL$q$3: battery, right-hand winding of relay EL$q$, front EL$q$3, ground on wire $tg$.

The removal of the ground from the above-mentioned wires E$aa/e$ . . . entails the release of the digit-receiving relays of the translator and hence the release of the two route and metering relays previously pulled up. The pulling up of relay EF$c$ will cause in accordance with a known method the cancellation of the group selection that was brought about by the pulling up of route relay TK$h$ (it will be recalled that auxiliary relay TN$e$ controls only the tolls).

The grounding of wire E$f$ by front EL$q$1 tells the translator that the number dialed by the subscriber leads to a non-existent combination. This wire E$f$ terminates at a terminal B$d$ in allotter RT. To transfer the calling subscriber to an operator, a special route-relay (TK$d$) is controlled from terminal B$d$. For this purpose, a jumper connects output terminal B$d$ to input terminal E$d$ in allotter RT. Consequently, route relay TK$d$ pulls up upon the grounding of wire E$f$. The first three front contacts (TK$d$1 . . . TK$d$3) of route relay TK$d$ are used to send the register information that will enable it to control the group-selecting operations that are to connect the calling subscriber to an operator. The first three front contacts of route relay TK$d$ are supplied from discriminating wire P1$a$ by means of a jumper provided between output terminal I1$a$ and input terminal E$bd$.

This route relay furnishes the register the following information:

$W=3,\ X=7,\ Y=1$

The group selection is thereupon effected in accordance with a known method.

The case of a national call will now be described. It is known that in order to make such a call the calling subscriber dials a special number, which will be assumed to be the number 16 by way of example.

Immediately thereafter, following the reception of a special tone, the subscriber dials an 8-digit number.

When a subscriber dials the number 16, relay EE$m$ pulls up in accordance with a known method (this pulling up is caused because the first digit dialed is the digit 1). Relay EE$n$ pulls up following the reception of digit 6: battery, relay EE$n$, front EE$m$2, EP$c$5, EP$b$5, EG$g$3, EE$m$1, EO$e$3, EO$a$3, ground over a circuit already described.

Relay EE$n$ completes a holding circuit for itself by closing its front contact EE$n$1: battery, relay EE$n$, front EE$n$1, ground on wire $tg$.

The switching into operating position of make-break contact EE$n$2 prepares the energizing circuit of translator relay TD$k$. Contact EE$n$3 prepares the dialing-tone sending circuit (second sending of dialing tone). The closing of front contact EE$n$ short-circuits back contact EH$e$2 in order to allow the registering of eight digits. The opening of back contact EE$n$5 prepares the release of relay EE$m$. The opening of back contact EE$n$6 breaks the holding circuit of relays EI$cd$ and EG$fg$, as well as the holding circuit of registering relays EO$a$, EO$e$, EP$b$, EP$c$, which are pulled up owing to the reception of the number 16.

The release of these relays entails the release of relay EE$m$.

The closing of back contact EI$d$4 completes again the dialing-tone sending circuit to the calling subscriber's loop. This circuit, which is already known, will not be described. In the present case, the registering relays are unoperated and the calling subscriber can dial the 8-digit number of the called subscriber. The registering of that number is done like before. Upon the reception of the first digit, relay EH$h$ pulls up as is known and through the closing of its front contact EH$h$3 completes the energizing circuit of relay EE$o$, which pulls up in turn: battery, relay EE$o$, front EH$h$3, EE$n$1, ground on wire $tg$.

The pulling up of relay EE$o$ prepares the energizing circuit of translator-seizing relay EJ$q$ through the closing of its front contact EE$o$1. Front contact EE$o$2 completes a holding circuit for relay EE$o$. The holding circuit of relays EI$cd$ and EG$fg$ is prepared by the closing of front contact EE$o$3. The energizing circuit of relay RC$f$ is prepared by the closing of front contact EE$o$4. The opening of back contact EE$o$6 will allow directing the control wires of the scanning relays to front contacts EV$a$2/$e$2.

After the reception of the number's second digit, relay EG$fg$ pulls up and completes the energizing circuit of relay EJ$q$: battery, relay EJ$q$, back EF$f$11, ED$p$4, ED$q$2, front EE$o$1, EG$g$4, ground over a circuit already described.

The translator is seized in accordance with the usual methods. Upon such seizure, relay TD$k$ pulls up, thus telling the translator that the call to be put through is a national call: battery, relay TD$k$, wire E$k$ through cable E and translator connector CT, front EE$n$2, ground.

For a national call, the subscriber number can begin with the digit 1. Consequently, the quantity of combinations obtainable with the number's first two digits is 100.

Ten relays TD$a/j$ have been provided performing a function identical with that of the nine relays TE$b/j$ discussed with reference to area calls. These relays are supplied through front contacts TD$k$2/11 by the ten outgoing wires J$a$1 . . . J$a$10 coming from the first-digit decoding contact pyramid.

These ten relays each have ten front contacts or a total of 100 front contacts, referenced TD*a*/*j*/2/11. Each outgoing wire of second-digit decoding contact pyramid D2C is multipled to 10 front contacts of a predetermined rank of relays TD*a*/*j*. Thus, wire K*a*1 is multipled to front contacts TD*a*2, TD*b*2 . . . TD*j*2. One hundred outgoing wires are thus obtained, terminating at 100 output terminals (referenced A*oo*/99) of allotter RT.

The control of the route relays is identical with that previously described with reference to area calls.

As regards the register, it is well to explain that relay EE*m* does not pull up if the calling subscriber's number begins with the digit 1. In fact, owing to the pulling up of relay EE*n*, back contact EE*n*5 is open. Similarly, relay EF*f* cannot be energized where the calling subscriber dials a number beginning with 965.

The chain of registering relays comprises five additional relays (EV*a*/*e*) intended to register the number's eighth digit. It often happens that during the registering of the digits of a number for an area call the holding circuit of the counting relays of counter NR is broken upon the energization of relay EH*de* through the opening of back contact EH*e*2, that is, after the registering of the number's seventh digit.

In the present case, contact EH*e*2 is inoperative, being short-circuited by EH*e*2 and the two contacts in series EE*n*4 and EH*g*2. It is only after the reception of the eighth digit of a number for a national call that relay EH*g* pulls up and opens the holding circuit of the counting relays of counter NR.

As regards the sending of numerical pulses to the outgoing circuit, it will be noted however that, owing to the opening of back contact EC*o*4, relay EL*jk* does not pull up at the same instant as relay EL*gh*, thus allowing the sending of the pulse trains corresponding to the number's eighth digit.

It may happen that, because of the geographical location of the system, traffic outgoing from one exchange to some other exchange is heavy as compared with traffic outgoing to all the other terminating exchanges to which such originating exchange has access. These considerations further in no way affect the local traffic of the particular exchange involved, which, for readily understandable reasons, generally far exceeds the outgoing traffic. The numbers for calls to the above-mentioned distant exchange obviously begin with the most diverse digits, comprised between 2 and 0 (the digit 1 being reserved for special services). If all the numbers beginning with a given first digit are considered, it is possible to group them into 3 categories in accordance with the destination:

(1) A category of numbers involving only calls intended for the distant exchange with which the traffic is the heaviest;

(2) A category of numbers giving access to any distant exchange;

(3) A category of numbers not giving access to the distant exchange with which the traffic is the heaviest.

From the foregoing it can be seen that upon the reception of the first digit of a number comprised in the first category mentioned above it is possible to determine the route signals relative to such a call without the aid of a translator. On the other hand, the determination of the tolls requires the seizure of a translator after the register has received the code of the number of the wanted connection. It follows from this that, if the information required for determining the proper route is determined in the register upon the reception of the first digit of the called number, considerable time is saved in the routing of the call involved.

It will be assumed for example that all calls whose number begins with the digit 2 meet that requirement. The register comprises a relay (EF*g*) whose winding is connected to the output of the first-digit decoding contact pyramid.

Upon the reception of the first digit (digit 2 in the example chosen) relay EF*g* pulls up: battery, relay EF*g*, front EO*e*4, EO*b*3, ground over a circuit already described.

Over its front contacts EF*g*1 . . . EF*g*6, relay EF*g* completes energizing circuits for six of the code relays EW*a*/*e*, EX*a*/*e*, EY*a*/*e*. Front contacts EF*g*1/2, EF*g*3/4, EF*g*5/6 are connected to wires E*wa*/*e*, E*xa*/*e*, E*ya*/*e* by connections shown in dotted lines because they can be modified in accordance with operating requirements. Front contact EF*g*7 controls the starting of the timing device. Front contact EF*g*8 short-circuits front contact ED*p*2 and thereby causes the pulling up of the relay EF*jk* starting the group-selecting operations. A ground is applied to wire I*u* towards fault register ED by the closing of front contact EF*g*9.

The translator is seized following the reception of the number's third digit. A tolls relay pulls up and sends the tolls to the register. The connection is thereupon established like before.

It may happen that the calling subscriber dials a non-existent number. Upon the reception of the number's first digit, the register controls the seizure of a translator like described before. Upon its seizure, after reception of the number's third digit, the translator causes the pulling up of relay EL*q* (Fig. 6) in accordance with a method already described. This relay cancels, like previously described, the selections already made and further, through the opening of its back contact EL*q*4, causes the release of relay EF*g*. Things are thus back to the case previously described.

It has already been shown several times that the building-up time of the group-selecting, line-selecting and other operations is controlled by a timing device. If the building-up time of any of these operations is abnormal, time relay RD*hi* pulls up. Through its front contact RD*i*1, it completes the energizing circuit of relay RD*k*, which pulls up: battery, relay RD*k*, front RD*i*1, back RD*j*5, ground on wire D*b*.

The closing of front contacts RD*k*1 . . . RD*k*3 brings the register into calling position, for the purpose of connecting it to a fault register. Front contact RD*k*4 holds relay RA*cd* and hence the register in case the calling subscriber should hang up.

Fault register ED for example is connected by means not shown to the register forming the subject of the present description. It is told of the nature of the fault appearing in the main register by testing the polarity applied to wires I*d* . . . I*x*. This testing allows in fact determining the moment at which the fault involved occurred. For example, if the group-selecting operations are slow in being performed, relay EF*e* does not pull up hence relay EF*jk* remains unoperated. When the fault register is seized, the fact that it verifies the grounding of wire I*s* tells the fault register that relay EF*jk* is still pulled up and that the fault occurred in the group-selecting operations.

It may happen that the scanning relays will operate improperly and that the number of these relays pulled up during the sending of the pulse train for a given digit will be other than two. In that case, the control-contact pyramid of these relays causes the energization of relay RD*l*, which pulls up.

Over its front contact RD*l*1, relay RD*l* completes the energizing circuit of relay RD*k*, which pulls up: battery, relay RD*k*, back EF*b*3, front RD*l*1, back RD*j*5, ground on wire D*b*.

The closing of front contact RD*l*2 completes the energizing circuit of relay RD*o*, which pulls up: battery, relay RD*o*, front RD*l*2, RA*d*4, back RC*f*5, EF*c*2, ground.

Relay RD*l* completes a holding circuit for itself through the closing of its front contact RD*l*3; battery, relay RD*l*, front RD*l*3, back RD*h*1, ground on wire D*b*.

Relay RD*o* opens the loop towards the originating connector at RD*o*1. Front contact RD*o*2 short-circuits back contact RC*f*1, this preventing the premature release of the register. The energizing circuit of relay RC*f* is completed by the closing of front contact RD*o*3; battery, relay RC*f*, front RD*o*3, ground on wire D*b*.

The opening of contact RC*f*1 prepares the release of the register. A ground is applied to wire I*n* towards fault register ED by the closing of front contact RC*f*2. The timing device is started by the closing of front contact RC*f*3. Relay RC*f* completes a holding circuit for itself over wire *tg* by the closing of its front contact RC*f*4. The ground is broken on test wire B*t*2 by the opening of back contact RC*f*5.

If the originating connector releases before relay RD*hi* pulls up, relay RD*o* falls back and releases the register through the opening of its front contact RD*o*2. Otherwise, relay RD*hi* pulls up and causes the seizure of a fault register in accordance with a known method.

To complete this description, the case will be considered where a calling subscriber fails to dial any number after having removed his handset or else dials an incomplete number.

It is known that upon removing his handset the subscriber is connected to the register and that relay RC*e* remains unoperated so long as the subscriber fails to dial. Likewise, at the end of each dialing-pulse train, relay RC*e* falls back until the reception of the next train.

When this relay is in unoperated position, it prepares over its front contact RC*e*3 the holding circuit of relay RC*i*. Cam RK1 sends a ground periodically over wire *k*1. If relay RC*e* is in unoperated position when wire *k*1 is grounded, relay RC*i* pulls up and holds through the closing of its front contact RC*i*1, which completes the following holding circuit for it: battery, right-hand winding of relay RC*i*, front RC*i*1, back RC*e*3, wire D*a* through cable D, back EH*e*2, ground on wire *tg*.

At RC*i*2, relay RC*i* prepares the energizing circuit of relay RC*j*. If at the end of a certain period of time the subscriber has not dialed or has stopped dialing, relay RC*i* is still pulled up at the instant when a second cam (RK2) sends a ground over wire *k*2, the effect of this being to cause relay RC*j* to pull up: battery, upper winding of relay RC*j*, front RC*i*2, wire *k*2, cam RK2, ground.

Relay RC*j* completes a holding circuit for itself through the closing of its front contact RC*j*1: battery, lower winding of relay RC*j*, front RC*j*1, RA*c*1, ground.

Relay RC*j* grounds wire E*o* via its front contact RC*j*4. Translator-seizing relay EJ*q* is energized by the closing of front contact RC*j*5: battery, relay EJ*q*, back EF*f*11, ED*p*4, ED*q*2, EE*o*1, EE*m*3, front RC*j*5, ground over a circuit already described.

The translator is seized in accordance with known methods. Terminal B*b* of allotter RT is grounded due to the closing of front contact RC*j*4. A route relay (TK*b*) is provided to transfer a faulty subscriber to an operator. To do so, a jumper is provided in allotter RT between output terminal B*b* and input terminal E*b*.

The first three front contacts (TK*b*1 . . . TK*b*3) of route relay TK*b* are used to send the register signals that will bring about the transfer of a faulty subscriber to an operator. It will be assumed that these signals are as follows: $W=3$, $X=6$, $Y=1$.

The three contacts TK*b*1 . . . TK*b*3 of relay TK*b* are supplied from discrimination wire P1*a* through a jumper provided in allotter RT between the output terminal I1*a* associated with discrimination wire P1*a* and the input terminal E*bb* supplying the three front contacts TK*b*1 . . . TK*b*3.

The transfer of a faulty subscriber to an operator is achieved in accordance with a known method.

It is quite obvious that the foregoing descriptions have been given only as non-limitative examples and that numerous modifications can be made without departing from the scope of the invention.

Thus, for example, the devices registering the numbers dialed or the digits translated could be made up of vacuum tubes or rotary switches.

The relay chains described can be replaced with other chains of different design but performing the same functions.

The numbering scheme used is given only as an example and can be changed at will in accordance with operating requirements.

The codes used for the fast sending of information between the various equipments can obviously be different from those used in the course of the present description.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A telephone system comprising a local exchange, a plurality of lines in said exchange, a plurality of trunks leading to other exchanges, a plurality of registers, means for seizing a register and connecting it to a line in response to a call originating on that line, means in said register for registering a predetermined number of digits, a plurality of translators, means in said register responsive to the registration of said predetermined number of digits for seizing one of said translators and for transmitting said registered digits to said translator, means in said translator responsive to the digits transmitted thereto from said register and, operable if said transmitted digits are sufficient for the determination of the routing of the call for producing the selective combinations required for completing the connection of the calling line to a trunk and operable if supplementary digits are necessary for such determination for transmitting a signal back to said register, means in said register responsive to said signal for releasing said translator, means in said register responsive to the registration of said necessary supplementary digits for again seizing one of said translators and transmitting said predetermined digits and said supplementary digits thereto, a plurality of partial number circuits adapted to receive calls from other exchanges, means in each partial number circuit responsive to an incoming call for seizing a register and transmitting a special signal to said register, means in each register responsive to said special signal for disconnecting the registering means corresponding to the digits not included in a partial number, whereby the transmitted digits are registered in the registering means corresponding to said digits and said register will control the routing and ringing operations without requiring the intervention of a translator.

2. A telephone system, as defined in claim 1, further comprising a plurality of complete number circuits adapted to receive incoming calls, means in each complete number circuit responsive to a call therein for seizing a register and transmitting a special signal thereto characterizing the nature of the circuit, and means in each register responsive to said special signal, for preparing it for the reception and registration of a predetermined number of digits.

3. A telephone system, as defined in claim 1, in which each register is adapted to receive a toll-access signal, further comprising means in each register responsive to the receipt of a toll-access signal for releasing the registering means used for registering the toll-access signal and preparing said means for receiving the complete signal for characterizing the called subscriber within the national network, means in each register, in response to the receipt of a predetermined number of digits, for thereupon seizing a translator and transmitting to it a special signal, means in each translator, responsive to said special signal for preparing said translator to control the translations required for the routing of national calls, whereby the same translators may be used for national and regional calls.

4. A telephone system, as defined in claim 1, in which the digits of a special service call include a first digit common to all special service calls and a second digit denoting the category of the calling subscriber, and in which each translator comprises two routing relays, one for translating said first digit and the other for translating said second digit, said translator further comprising means controlled by said relays for transmitting the two translated digits to said register, whereby the call may be routed in a direction determined by the category of the calling subscriber.

5. A telephone system, as defined in claim 1, in which lines assigned to absentee subscribers are provided with means adapted to transmit a signal to the associated register when a connection to such line is completed, further comprising an operator's circuit, means in each register responsive to said signal for causing the release of the connection to said line, the seizure of a translator and the transmission of said signal thereto, means in each seized translator responsive to said signal for transmitting another signal to said register, and means in each register responsive to said other signal for causing the calling line to be connected to said operator's circuit.

6. A telephone system, as defined in claim 5, in which each line assigned to an absentee subscriber is provided with means, responsive to a call originating on said line, for transmitting the first mentioned signal to a seized register, whereby said register will seize a translator and said translator will cause said register to connect the calling line to the operator's circuit regardless of the number dialled.

7. A telephone system, as defined in claim 1, further comprising means in each register responsive to the receipt of the first digit of a number corresponding to a given direction for controlling the routing of the call to a trunk leading to another exchange, means for subsequently comparing the seized trunk with that corresponding to the selective combinations produced by a seized translator after the receipt of the necessary digits, and means operated by said comparing means for releasing the partial connection to said first seized trunk if it is not the same as the trunk selected by said translator.

8. A telephone system comprising an exchange, a plurality of partial number circuits adapted to receive calls from other exchanges, a plurality of registers, means in each partial number circuit responsive to an incoming call for seizing a register and transmitting a special signal to said register, means in each register responsive to said special signal for disconnecting the registering means corresponding to the digits not included in a partial number, whereby the transmitted digits are registered in the registering means corresponding to said digits and said register will control the routing and ringing operations without requiring the intervention of a translator.

9. A telephone system, as defined in claim 8, further comprising a plurality of complete number circuits in the exchange adapted to receive incoming calls, means in each complete number circuit responsive to a call therein for seizing a register and transmitting a special signal thereto characterizing the nature of said circuit, and means in each register, responsive to said special signal, for preparing said register for the reception and registration of a predetermined number of digits.

10. A telephone system comprising a national network including an exchange, a plurality of lines in said exchange, a plurality of registers each register adapted to receive a toll-access signal from a calling line, a plurality of translators, means in each register responsive to the receipt of a toll-access signal for releasing the registering means used for registering the toll-access signal and preparing said means for receiving the complete signal for characterizing the called subscriber within said national network, means in each register, in response to the receipt of a predetermined number of digits, for thereupon seizing a translator and transmitting to it a special signal, means in each translator responsive to said special signal for preparing said translator to control the translations required for the routing of national calls, whereby the same translators may be used for national and regional calls.

11. A telephone system comprising an exchange adapted to handle special service calls, the digits of a special service call including a first digit, common to all special service calls, and a second digit denoting the category of the calling line, a plurality of lines, a plurality of registers, a plurality of translators, each translator comprising two routing relays, one for translating said first digit, common to all said special services, and the other for translating said second digit, denoting the category of the calling line, means controlled by said relays for transmitting the two translated digits to said register, whereby the call may be routed in a direction determined by the category of the calling line.

12. A telephone system comprising an exchange, a plurality of lines in said exchange some of which may be assigned to absentee subscribers, a plurality of registers, a plurality of translators, an operator's circuit, means connected to each absentee subscriber line for transmitting a signal to the associated register when a connection to such line is completed, means in each register responsive to said signal for causing the release of the connection to said line, the seizure of a translator, and the transmission of said signal thereto, means in each seized translator responsive to said signal for transmitting another signal to said register, and means in each register responsive to said other signal for causing the calling line to be connected to said operator's circuit.

13. A telephone system, as defined in claim 12, in which each line assigned to an absentee subscriber comprises means, responsive to a call originating on said line, for transmitting the first mentioned signal to a seized register, whereby said register will seize a translator and said translator will cause said register to connect the calling line to the operator's circuit regardless of the number dialled.

14. A telephone system comprising an exchange, a plurality of lines in said exchange, a plurality of trunks, a plurality of registers, a plurality of translators, means in each register responsive to the receipt of a first digit of a number corresponding to a given direction for controlling the routing of the call to a trunk corresponding to said direction, means in each register, responsive to the receipt of a predetermined number of digits, for seizing a translator and transmitting said digits to said translator, means in said translator, responsive to the digits transmitted thereto from said register and operable if said transmitted digits are sufficient for the determination of the routing of the call for producing the selective combinations required for completing the connection of the calling line to a trunk corresponding to the direction represented by the received digits, means for subsequently comparing the seized trunk with that corresponding to the selective combinations produced by said translator, and means operated by said comparing means for releasing the partial connection to said first seized trunk if it is not the same as the trunk selected by said translator.

References Cited in the file of this patent

UNITED STATES PATENTS

| | | |
|---|---|---|
| 2,597,209 | Walsh | May 20, 1952 |
| 2,631,195 | Ostline | Mar. 10, 1953 |
| 2,678,353 | Ostline | May 11, 1954 |
| 2,770,676 | Gohorel | Nov. 13, 1956 |